United States Patent
Gulzar et al.

(10) Patent No.: US 12,461,548 B2
(45) Date of Patent: Nov. 4, 2025

(54) METHODS AND SYSTEMS FOR SOLAR PHOTOVOLTAIC AUTOMATIC VOLTAGE REGULATION UNDER EXTREME WEATHER CONDITIONS

(71) Applicants: KING FAHD UNIVERSITY OF PETROLEUM AND MINERALS, Dhahran (SA); Saudi Data and Artificial Intelligence Authority (SDAIA), Riyadh (SA)

(72) Inventors: Muhammad Majid Gulzar, Dhahran (SA); Muhammad Khalid, Dhahran (SA)

(73) Assignees: KING FAHD UNIVERSITY OF PETROLEUM AND MINERALS, Dhahran (SA); Saudi Data and Artificial Intelligence Authority (SDAIA), Riyadh (SA)

( * ) Notice: Subject to any disclaimer, the term of this patent is extended or adjusted under 35 U.S.C. 154(b) by 196 days.

(21) Appl. No.: 18/545,724

(22) Filed: Dec. 19, 2023

(65) Prior Publication Data

US 2025/0199557 A1    Jun. 19, 2025

(51) Int. Cl.
*G05F 1/70* (2006.01)
*G05F 1/67* (2006.01)

(52) U.S. Cl.
CPC . *G05F 1/67* (2013.01); *G05F 1/70* (2013.01)

(58) Field of Classification Search
CPC .................................... G05F 1/67; G05F 1/70
See application file for complete search history.

(56) References Cited

U.S. PATENT DOCUMENTS 11,101,742 B2 * 8/2021 Vavilpalli ............. H02J 7/0048
2012/0075898 A1   3/2012 Sigamani et al.
(Continued)

FOREIGN PATENT DOCUMENTS

CN         113359938 A      9/2021

OTHER PUBLICATIONS

Ibrahim et al. ; Optimizing Step-Size of Perturb & Observe and Incremental Conductance MPPT Techniques Using PSO for Grid-Tied PV System ; IEEE Access, vol. 11 ; Feb. 6, 2023 ; 13 Pages.
(Continued)

*Primary Examiner* — Adolf D Berhane
(74) *Attorney, Agent, or Firm* — Oblon, McClelland, Maier & Neustadt, L.L.P.

(57) ABSTRACT

A device, method, and non-transitory computer readable medium for a finite-time sliding mode maximum power point tracking (MPPT) control system for a photovoltaic (PV) array includes a PV array configured to generate a current $I_{pv}$, a pulse width modulator (PWM) connected to receive the current $I_{PV}$ and a voltage. The PWM is configured to execute a perturb and observe (P&O) algorithm and generate a maximum power point signal. The maximum power point signal is configured to modulate DC voltage $V_{dc}$ according to a duty cycle D defined by the P&O algorithm. The MPPT control system includes a finite time sliding mode controller (FTSMC) configured to receive the $I_{PV}$ and a voltage and generate a reactive power control signal $U_q$. The FTSMC includes a particle swarm optimization to determine and apply optimum gain parameters to FTSMC to generate reactive power control signal $U_q$ and minimize voltage error signals for each phase.

20 Claims, 32 Drawing Sheets

(56) References Cited

U.S. PATENT DOCUMENTS

2023/0047077 A1    2/2023  Abianeh et al.
2023/0216308 A1*  7/2023  Khan ........................ H02J 7/34
                                                      320/108

OTHER PUBLICATIONS

Ali et al. ; Perturb & Observe based Adaptive Sliding Mode MPPT Control of Solar Photovoltaic System ; IEEE Xplore ; Jun. 2020 ; 7 Pages.

Avila et al. ; Improved particle swarm optimization based MPPT for PV systems under Partial Shading Conditions ; IEEE Southern Power Electronics Conference ; Dec. 4-7, 2017 ; Abstract Only ; 1 Page.

* cited by examiner

METHODS AND SYSTEMS FOR SOLAR PHOTOVOLTAIC AUTOMATIC VOLTAGE REGULATION UNDER EXTREME WEATHER CONDITIONS

STATEMENT REGARDING PRIOR DISCLOSURE BY THE INVENTORS

Aspects of this technology are described in an article titled "Modified Finite Time Sliding Mode Controller for Automatic Voltage Regulation under Fast-Changing Atmospheric Conditions in Grid-Connected Solar Energy Systems", published in International Journal Of Intelligent Systems, Vol. 2023, incorporated herein by reference in its entirety.

STATEMENT OF ACKNOWLEDGEMENT

The inventor(s) acknowledge the financial support provided by the Center of Renewable Energy and Power Systems at King Fahd University of Petroleum and Minerals (KFUPM), Riyadh, Saudi Arabia through Project No. INRE2106 and by the SDAIA-KFUPM Joint Research Center for Artificial Intelligence (JRC-AI) through Project No. JRC-AI-RFP-08.

BACKGROUND

Technical Field

The present disclosure is directed to an automatic voltage regulator, and in particular to systems and methods solar photovoltaic automatic voltage regulation under extreme weather conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to climate change and increasing pollution, there has been a shift in focus towards renewable energy. The depletion of levels of fossil fuels, a need for carbon reduction, and prospects of developing a new innovative technology sector in renewable energy have led to an increased interest in reclamation of solar energy. Over the last couple of decades, demand for solar electric power systems has steadily increased, particularly since production costs have been reduced and conversion efficiency has increased. As a result, global energy investments are shifting towards sustainable energy resources and renewable energy sources are becoming preferred choices for clean energy production. Solar electric power systems are based on photovoltaic (PV) technology which converts solar energy to electricity. The PV technology includes implementing networked PV cells (PV generator), which are basic components of the PV technology. A photovoltaic array creates an electric field responsive to incident sunlight, resulting in the generation of an electrical current, which is DC converted and stored in a battery or used directly as a power source. However, the electricity generated is dependent on atmospheric conditions, such as temperature and irradiance, leading to low efficiency, and non-linearity due to fluctuating levels of solar radiation. To offset the challenges, maximum power point tracking (MPPT) controllers are used. The MPPT controllers continuously adjust the operating points of PV generators so that the maximum power is transferred to the load. MPPT controllers are classified into a direct controller and an indirect controller based on design and implementation. Direct controllers include perturb and observe (P & O), incremental conductance (I & C), and hill-climbing algorithms. In implementations of direct controllers, maximum power is generated in two steps. Parameters of the controller are optimized in first step, and in the second step, one of the direct power tracking techniques is implemented. Indirect controllers include genetic algorithms, artificial neural networks, fuzzy logic and particle swarm optimization (PSO).

Conventionally, direct controllers with fixed iteration have shown satisfactory performance. However, choosing a fixed step size is a major challenge. Short step sizes lead to good performance, but also lead to significant response time. A long step size increases oscillations around the MPP and results in a waste of accessible energy. Over a period of time, MPPT algorithms have been introduced with varying step sizes. To improve tracking accuracy in techniques like the P&O and incremental conductance method, the step sizes are modified according to the characteristics of the PV panel. However, such conventional solutions have not achieved the accuracy required to stable operations.

Accordingly, it is one object of the present disclosure to provide methods and systems for solar photovoltaic automatic voltage regulation under extreme weather conditions, which determines the optimal sliding mode controller (SMC) gains used in perturb and observe algorithms based on a particle swarm optimization algorithm.

SUMMARY

In an exemplary embodiment, a finite-time sliding mode maximum power point tracking (MPPT) control system for a photovoltaic (PV) array is described. The MPPT for the PV array includes a PV array having a positive terminal and a negative terminal, wherein the photovoltaic array is configured to generate a current $I_{pv}$ at the positive terminal, a boost converter including a first capacitor 252 in parallel with the PV array and an inductor having a first end connected to the positive terminal, and a metal oxide silicon field effect transistor (MOSFET) having a source terminal connected to a second end of the inductor and a drain terminal connected to the negative terminal. The body terminal of the MOSFET is configured to generate a DC voltage $V_{dc}$ when the MOSFET is switched ON. The MPPT for the PV array includes a pulse width modulator (PWM) 208 connected to receive the current $I_{PV}$ and a voltage across the first capacitor 252 at a set of PWM input terminals. The PWM 208 includes a PWM processor configured to execute a perturb and observe (P&O) algorithm and generate a maximum power point signal at a PWM output terminal, and the PWM output terminal is connected to a gate of the MOSFET. The maximum power point signal is configured to modulate the DC voltage $V_{dc}$ according to a duty cycle D defined by the P&O algorithm. The MPPT for PV array also includes a second capacitor in parallel with the MOSFET, wherein the second capacitor is configured to charge during a positive phase of the duty cycle D to the voltage $V_{dc}$ and discharge during a negative phase of the duty cycle D, an inverter in parallel with the second capacitor, wherein the inverter is configured to generate three phase voltage signals, a point of common coupling (PCC) connected to the inverter to receive the three phase voltage signals, an electrical grid connected to the PCC, wherein the electrical grid is configured to convert the three phase voltage signals to three phase current signals and calculate three phase voltage error signals by subtracting a grid voltage at each phase from a reference voltage signal, a first direct to quadrature transformer configured to receive the three phase current signals and convert the three phase current signals to direct current signals and quadrature current signals, and a second direct to quadrature transformer configured to receive the three phase voltage error signals and convert the three phase voltage error signals to direct voltage error signals and quadrature voltage error signals. The MPPT for PV array further includes a DC voltage controller configured to receive the direct current signals, the quadrature current signals, the direct voltage error signals and the quadrature voltage error signals and generate a direct power control signal $U_d$, a finite time sliding mode controller (FTSMC) having at a set of FTSMC input terminals configured to receive the current $I_{Pv}$ and a voltage across the second capacitor and generate a reactive power control signal $U_q$, wherein the FTSMC includes a memory having program instructions for performing a particle swarm optimization and at least one FTSMC processor configured to execute the particle swarm optimization to determine optimum gain parameters of the FTSMC during an offline mode of the FTSMC and to apply the optimum gain parameters to the FTSMC to generate the reactive power control signal $U_q$ during an online mode, and a voltage source controller configured to receive the reactive power control signal $U_q$ and the direct power control signal $U_d$ and generate a set of timing signals configured to operate the inverter. The finite-time sliding mode MPPT control system is configured to minimize the voltage error signals for each phase.

In another exemplary embodiment, a finite-time sliding mode maximum power point tracking (MPPT) control method for a photovoltaic (PV) array is described. The method includes generating, by a PV array having a positive terminal and a negative terminal, a current $I_{pv}$ at the positive terminal, connecting a first capacitor in parallel with the PV array, connecting an inductor having a first end to the positive terminal, generating, by a body terminal of a metal oxide silicon field effect transistor (MOSFET) having a source terminal connected to a second end of the inductor and a drain terminal connected to the negative terminal, a DC voltage $V_{dc}$ when the MOSFET is switched ON, receiving, at a set of PWM input terminals of a pulse width modulator (PWM), the current $I_{PV}$ and a voltage across the first capacitor, executing, by a PWM processor of the PWM, a perturb and observe (P&O) algorithm and generating a maximum power point signal at a PWM output terminal, connecting the PWM output terminal to a gate of the MOSFET, modulating, by the maximum power point signal, the DC voltage $V_{dc}$ according to a duty cycle D defined by the P&O algorithm, connecting a second capacitor in parallel with the MOSFET, wherein the second capacitor is configured to charge during a positive phase of the duty cycle D to the voltage $V_{dc}$ and discharge during a negative phase of the duty cycle D, generating three phase voltage signals by connecting an inverter in parallel with the second capacitor, receiving, at a point of common coupling (PCC) connected to the inverter, the three phase voltage signals, converting, by an electrical grid connected to the PCC, the three phase voltage signals to three phase current signals, calculating, by the electrical grid, three phase voltage error signals by subtracting a grid voltage at each phase from a reference voltage signal, converting, by a first direct to quadrature transformer configured to receive the three phase current signals, the three phase current signals to direct current signals and the quadrature current signals, converting, by a second direct to quadrature transformer configured to receive the three phase voltage error signals, the three phase voltage error signals to direct voltage error signals and quadrature voltage error signals, generating, by a DC voltage controller configured to receive the direct current signals, the quadrature current signals, the direct voltage error signals and the quadrature voltage error signals, a direct power control signal $U_d$, receiving, by a finite time sliding mode controller (FTSMC), the current $I_{PV}$ and a voltage across the second capacitor, the FTSMC including a memory having program instructions for performing a particle swarm optimization and at least one FTSMC processor configured to execute the particle swarm optimization, and determining, by executing the particle swarm optimization, optimum gain parameters of the FTSMC during an offline mode of the FTSMC and applying the optimum gain parameters to the FTSMC to generate the reactive power control signal $U_q$ during an online mode. In addition, the method includes generating, by the FTSMC, a reactive power control signal $U_q$, receiving, by a voltage source controller, the reactive power control signal $U_q$ and the direct power control signal $U_d$, generating, by the voltage source controller, a set of timing signals configured to operate the inverter, and minimizing, by the finite-time sliding mode MPPT control system the voltage error signals for each phase.

In another exemplary embodiment, a non-transitory computer readable medium having instructions stored therein that, when executed by one or more processors, cause the one or more processors to perform a method for controlling an output of a photovoltaic (PV) array is described. The method includes generating, by the PV array having a positive terminal and a negative terminal, a current $I_{pv}$ at the positive terminal, connecting a first capacitor in parallel with the PV array, connecting an inductor having a first end to the positive terminal, generating, by a body terminal of a metal oxide silicon field effect transistor (MOSFET) having a source terminal connected to a second end of the inductor and a drain terminal connected to the negative terminal, a DC voltage $V_{dc}$ when the MOSFET is switched ON, receiving, at a set of PWM input terminals of a pulse width modulator (PWM), the current $I_{PV}$ and a voltage across the first capacitor, executing a perturb and observe (P&O) algorithm and generating a maximum power point signal at a PWM output terminal, connecting the PWM output terminal to a gate of the MOSFET, modulating, by the maximum power point signal, the DC voltage $V_{dc}$ according to a duty cycle D defined by the P&O algorithm, connecting a second capacitor in parallel with the MOSFET, wherein the second capacitor is configured to charge during a positive phase of the duty cycle D to the voltage $V_{dc}$ and discharge during a negative phase of the duty cycle D, generating three phase voltage signals by connecting an inverter in parallel with the second capacitor, receiving, at a point of common coupling (PCC) connected to the inverter, the three phase voltage signals, converting, by an electrical grid connected to the PCC, the three phase voltage signals to three phase current signals, calculating, by the electrical grid, three phase voltage error signals by subtracting a grid voltage at each phase from a reference voltage signal, converting, by a first direct to quadrature transformer configured to receive the three phase current signals, the three phase current signals to direct current signals and the quadrature current signals, converting, by a second direct to quadrature transformer configured to receive the three phase voltage error signals, the three phase voltage error signals to direct voltage error signals and quadrature voltage error signals and generating, by a DC voltage controller configured to receive the direct current signals, the quadrature current signals, the direct voltage error signals and the quadrature voltage error signals, a direct power control signal $U_d$. The method also includes receiving, by a finite time sliding mode controller (FTSMC), the current $I_{PV}$ and a voltage across the second capacitor, performing a particle swarm optimization, determining, by executing the particle swarm optimization, optimum gain parameters of the FTSMC during an offline mode of the FTSMC and applying the optimum gain parameters to the FTSMC to generate the reactive power control signal $U_q$ during an online mode, generating, by the FTSMC, a reactive power control signal $U_q$, and receiving, by a voltage source controller, the reactive power control signal $U_q$ and the direct power control signal $U_d$, generating, by the voltage source controller, a set of timing signals configured to operate the inverter, and minimizing, by the finite-time sliding mode MPPT control system the voltage error signals for each phase.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
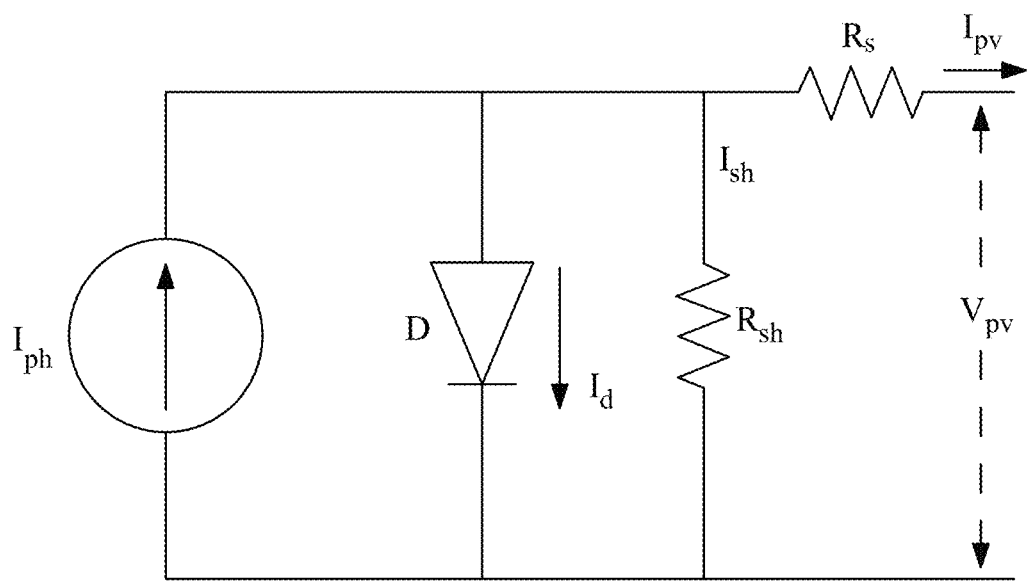
FIG. 1 shows a practical model with a single diode considered to be the equivalent circuit of a photovoltaic (PV) cell.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system, device, and method for a finite-time sliding mode maximum power point tracking (MPPT) controller for a photovoltaic (PV) array. The MPPT controller uses a particle swarm optimization (PSO) algorithm that optimizes parameters in finite time sliding mode. The PSO algorithm is utilized to define the parameters of the MPPT controller. The MPPT controller is configured to obtain optimum values of gains for a finite time sliding mode controller (FTSMC) in real-time operation, which boosts power quality performance and makes the PV-based three-phase grid-connected inverter system more stable. The control design of the MPPT controller forces a step size to slide on a surface known as a sliding surface. Efficiency of the MPPT controller is observed by employing a boost converter connected to a PV model. Simulation results validated the efficiency of the MPPT controller to track the MPP under changes in weather conditions. As a result, the MPPT controller reduced DC link voltage fluctuation with a smooth flow of power by stabilizing the frequency of the grid-connected PV inverter in a shorter time.

PV cells are the basic blocks of a photovoltaic (PV) system. These cells are connected in series and/or parallel to assemble a PV module. One or more PV modules are used to form a PV array. An ideal model for the PV cell does not show series and shunt resistances while the actual model shows those resistances. In some implementations, the PV cell reflects traits of a diode in the absence of sunlight, and the conversion of energy takes place only in the presence of sunlight. As a result of the erratic nature of the PV cell, current generation by the PV cells is unreliable. Additionally, arriving at a point of stability makes it challenging to rely on PV-based energy systems. The output voltage of any individual unit is low. To obtain the desired output current $I_{pv}$ function of the PV array 202 in realistic applications, the PV cells are combined in series $N_s$ and parallel $N_p$. Equation (1) represents an equation for calculating the PV current $I_{pv}$ given by:

$$I_{pv} = N_p[I_{ph} - I_{rs}(\exp^{\alpha V_{pv}} - 1)], \quad (1)$$

where $\alpha = q/KTAn_s$, $V_{pv}$ is the voltage at the output terminal, $\alpha$ is an ideality factor of a diode equation, $q=1.602\times10^{-19}$ C is a charge on an electron, k is the Boltzmann constant ($1.38\times10^{-23}$ J/K), ng is the number of PV cells, $I_{ph}$ is the photocurrent generated by solar irradiance which can be expressed as:

$$I_{ph} = 0.01 \times G \times [I_{sc} + k_i(T^* - T)], \quad (2)$$

where G=solar insolation; $I_{sc}$=short circuit current of the PV cell, the short circuit current temperature coefficient $k_i$=0.015 is defined for a PV module, T* equals the temperature at standard test condition (STC). $I_{rs}$ represents the reverse saturation current, $I_{pv}$ is the yield current of the PV array, and T is the temperature in the kelvin of PV the cell. Variation in the saturation current ($I_{rs}$) of the PV cell with temperature is given by the following equation:

$$I_{rs} = I_{rr}\left(\frac{T}{T^*}\right)^2 \times \exp\left[\frac{q \times E_9}{k \times a}\left(\frac{1}{T} - \frac{1}{T^*}\right)\right], \quad (3)$$

where $E_g$ represents the band gap energy of semiconductor material of the PV cell. A grid-connected PV inverter system 200 of the present disclosure is described below.

Figure 2:
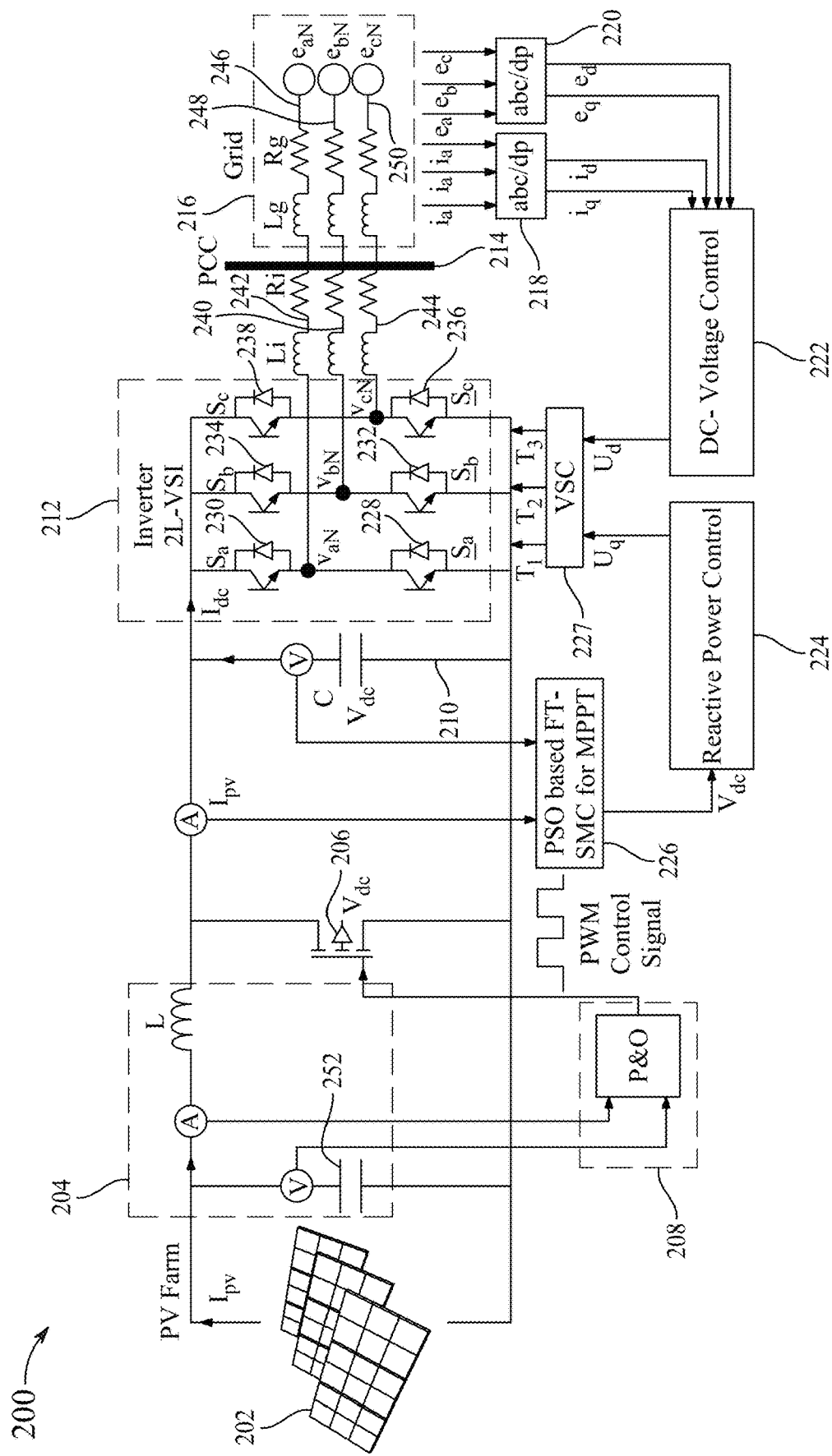
FIG. 2 shows a dynamic model of a grid-connected PV inverter system for a feedback control, according to certain embodiments.

FIG. 2 shows a dynamic model of a grid-connected PV inverter 212 system for the feedback control, according to certain embodiments. The grid-connected PV inverter 212 system includes a finite-time sliding mode maximum power point tracking (MPPT) controller 2600. The grid-connected PV inverter 212 system includes a PV array 202, a boost converter 204, a metal oxide silicon field effect transistor (MOSFET) 206, a pulse width modulator (PWM) 208, a second capacitor 210, an inverter 212, a point of common coupling (PCC 214) 214, an electrical grid 216, a first direct to quadrature transformer 218, a second direct to quadrature transformer 220, a DC voltage controller 222, a reactive power control 224, a FTSMC 226, and a voltage source controller 227.

The PV array 202, often referred to as a solar array, is a network of solar panels connected together to generate electricity from sunlight. The PV array 202 includes multiple solar panels which are connected in series or parallel. The PV array 202 may be installed in large PV farms, on rooftops, mounted on the ground, or integrated into building structures and the like. The PV array 202 includes a positive terminal and a negative terminal and is configured to generate a current $I_{pv}$ at the positive terminal. The boost converter 204 includes a first capacitor 252 in parallel with the PV array 202 and an inductor L having a first end connected to the positive terminal. A MOSFET 206 includes a source terminal connected to a second end of the inductor and a drain terminal connected to the negative terminal. The body terminal of the MOSFET 206 is configured to generate a direct current (DC) voltage $V_{dc}$ when the MOSFET 206 is switched ON.

The PWM 208 is connected to receive the current $I_{PV}$ and a voltage V across the first capacitor 252 at a set of PWM input terminals. The PWM 208 includes a PWM processor configured to execute a perturb and observe (P&O) algorithm and generate a maximum power point signal at a PWM output terminal. The PWM output terminal is connected to a gate of the MOSFET 206. The maximum power point signal is configured to modulate the DC voltage $V_{dc}$ according to a duty cycle D defined by the P&O algorithm. A second capacitor 210 is connected in parallel with the MOSFET 206. The second capacitor 210 is configured to charge during a positive phase of the duty cycle D to the voltage $V_{dc}$ and discharge during a negative phase of the duty cycle D.

The inverter 212 is connected in parallel with the second capacitor 210. The inverter 212 is configured to generate three phase voltage signals. A point of common coupling (PCC) 214 connected to the inverter 212 is configured to receive the three phase voltage signals. The electrical grid 216 is connected to the PCC 214. The electrical grid 216 is configured to convert the three phase voltage signals to three phase current signals and calculate three phase voltage error signals by subtracting a grid voltage at each phase from a reference voltage signal. A first direct to quadrature transformer 218 is configured to receive the three phase current signals and convert the three phase current signals to direct current signals and quadrature current signals. A second direct to quadrature transformer 218 is configured to receive the three phase voltage error signals and convert the three phase voltage error signals to direct voltage error signals and quadrature voltage error signals. The DC voltage controller 222 is configured to receive the direct current signals, the quadrature current signals, the direct voltage error signals and the quadrature voltage error signals and generate a direct power control signal $U_d$. A finite time sliding mode controller (FTSMC 226) includes a set of FTSMC input terminals configured to receive the current $I_{PV}$, as measured by an ammeter A and a voltage V across the second capacitor 210 and generate a reactive power control 224 signal $U_q$. The FTSMC 226 includes a memory having program instructions for performing a particle swarm optimization and at least one FTSMC 226 processor configured to execute the particle swarm optimization to determine optimum gain parameters of the FTSMC 226 during an offline mode 650 of the FTSMC 226 and to apply the optimum gain parameters to the FTSMC 226 to generate a reactive power control signal $U_q$ during an online mode. The voltage source controller 227 is configured to receive the reactive power control 224 signal $U_q$ and the direct power control signal $U_d$ and generate a set of timing signals configured to operate the inverter 212. The finite-time sliding mode MPPT control system is configured to minimize the voltage error signals for each phase.

Referring to the inverter 212, the inverter 212 includes a first NPN bipolar transistor 230, a second NPN bipolar transistor 228, a third NPN bipolar transistor 234, a fourth NPN bipolar transistor 232, a fifth NPN bipolar transistor 238 and a sixth NPN bipolar transistor 236. The first NPN bipolar transistor 230 is connected at a collector terminal to the positive terminal of the second capacitor 210 and at an emitter terminal to a collector terminal of the second NPN bipolar transistor 228. The emitter terminal of the second NPN bipolar transistor 228 is connected to the negative terminal. A base terminal (also referred to as a gate) of the first NPN bipolar transistor 230 and a base terminal of the second NPN bipolar transistor 228 are connected to receive a first timing signal $T_1$ of the set of timing signals. The third NPN bipolar transistor 234 is connected at a collector terminal to a positive terminal of the second capacitor 210 and at an emitter terminal to a collector terminal of a fourth NPN bipolar transistor 232. An emitter terminal of the fourth NPN bipolar transistor 232 is connected to the negative terminal. A base terminal of the third NPN bipolar transistor 234 and a base terminal of the fourth NPN bipolar transistor 232 are connected to receive a second timing signal $T_2$ of the set of timing signals. The fifth NPN bipolar transistor 238 is connected at a collector terminal to the positive terminal of the second capacitor 210 and at an emitter terminal to a collector terminal of a sixth NPN bipolar transistor 236. An emitter terminal of the sixth NPN bipolar transistor 236 is connected to the negative terminal. A base terminal of the fifth NPN bipolar transistor 238 and a base terminal of the sixth NPN bipolar transistor 236 are connected to receive a third timing signal $T_3$ of the set of timing signals. Each of the first NPN bipolar transistor 230, the second NPN bipolar transistor 228, the third NPN bipolar transistor 234, the fourth NPN bipolar transistor 232, the fifth NPN bipolar transistor 238 and the sixth NPN bipolar transistor 236 includes a reverse biased diode connected between its collector terminal and emitter terminal.

The inverter 212 has three phase inverter outputs including a first phase inverter output transmission line 242, a second phase inverter output transmission line 240 and a third phase inverter output transmission line 244. The first phase inverter output transmission line 242 includes a first output inductor in series with a first output resistor. The first phase inverter output transmission line 242 is connected between the emitter terminal of the first NPN bipolar transistor 230 and the collector terminal of the second NPN bipolar transistor 228. The first phase inverter output transmission line 242 is connected to a first phase port of the PCC 214. A second phase inverter output transmission line 240 includes a second output inductor in series with a second output resistor. The second phase inverter output transmission line 240 is connected between the emitter terminal of the third NPN bipolar transistor 234 and the collector terminal of the fourth NPN bipolar transistor 232. The second phase inverter output transmission line 240 is connected to a second phase port of the PCC 214. The third phase inverter output transmission line 244 includes a third output inductor with a third output resistor. The third phase inverter output transmission line 244 is connected between the emitter terminal of the fifth NPN bipolar transistor 238 and the collector terminal of the sixth NPN bipolar transistor 236. The third phase inverter 212 output transmission line is connected to a third phase port of the PCC 214.

The electrical grid 216 includes a first phase grid transmission line 246 connected to the first phase port of the PCC 214. The first phase grid transmission line 246 includes a first grid inductor in series with a first grid resistor. The grid inductors are generally referred to as Lg and the grid resistors are generally referred to as $R_g$. The first phase grid voltage is a voltage across the first grid resistor. A second phase grid transmission line 248 is connected to the second phase port of the PCC 214. The second phase grid transmission line 248 includes a second grid inductor in series with a second grid resistor. The second phase grid voltage is a voltage across the second grid resistor. A third phase grid transmission line 250 is connected to the third phase port of the PCC 214. The third phase grid transmission line 250 includes a third grid inductor in series with a third grid resistor. The third phase grid voltage is a voltage across the third grid resistor.

In implementations, the FTSMC 226 is configured in offline mode 650 to generate a plurality of potential sets of gain parameters of the FTSMC 226. In offline mode 650, the FTSMC 226 initializes the plurality of sets of potential gain parameters as a population of the particle swarm optimization algorithm and optimizes each of the sets of potential gain parameters using the particle swarm optimization algorithm. Further, the FTSMC 226 evaluates an integrated absolute error (IAE) function for each optimized set of potential gain parameters based on the difference between the voltage across the second capacitor 210 and the grid voltage. The FTSMC 226 determines the optimized set of potential gain parameters which generates the smallest IAE. The optimized set of potential gain parameters which generates the smallest IAE as the optimized gain parameters of the FTSMC 226 is stored in the memory 2602 of the FTSMC 226. In an implementation, the FTSMC 226 may instructions stored therein or may be coupled to a non-transitory computer readable medium instructions stored therein, which when executed by FTSMC 226 to control an output of a photovoltaic (PV) array.

The data sheet of a representative MPPT is shown in Table 1 while the characteristic curves in FIG. 3 show the different levels of irradiance level and temperature.

TABLE 1

Data Sheet of PV module

| | |
|---|---|
| Maximum power | 43.68 w |
| Parallel Strings | 5 |
| Open circuit voltage | 21.90 V |
| Voltage at maximum power point at STC | 0.8 V |
| Short circuit current | 1.00 A |

TABLE 1-continued

Data Sheet of PV module

| | |
|---|---|
| Current at maximum power point | 2.55 A |
| Cell reverse saturation current | 1.2e–7 A |
| Temperature coefficient of $V_{OC}$ | –0.36099 |
| Temperature coefficient of $I_{SC}(k_i)$ | 0.015 |
| Diode ideality factor | 0.32183 |

Figure 3A:
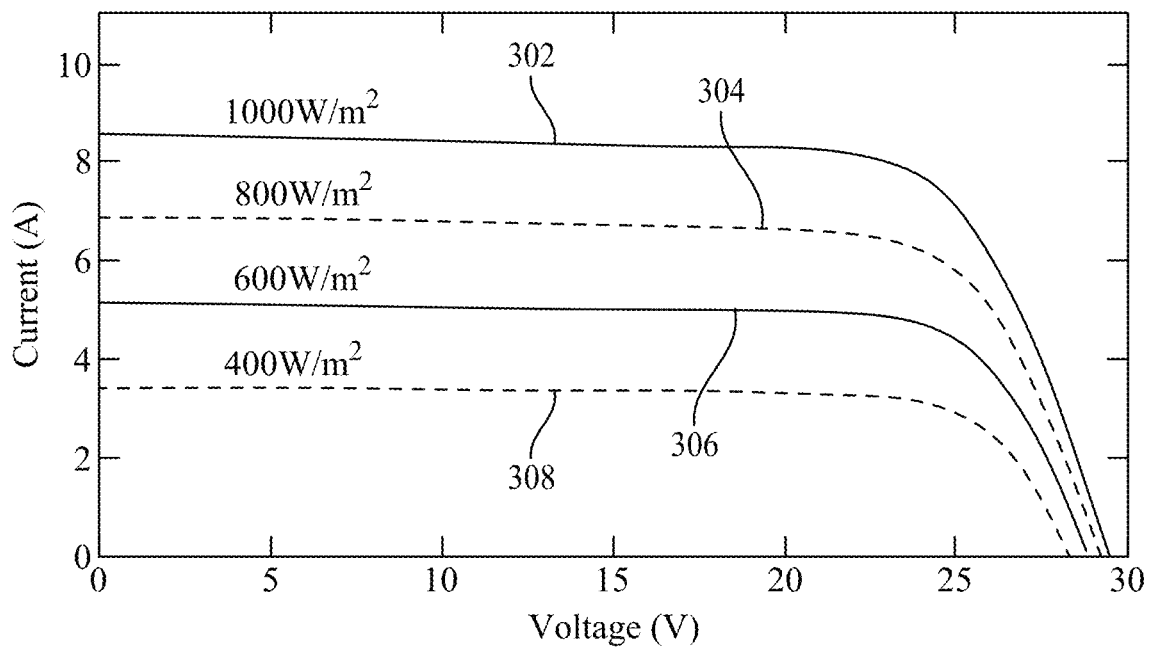
FIG. 3A shows an effect of irradiance levels on current and voltage, according to certain embodiments.
Figure 3B:
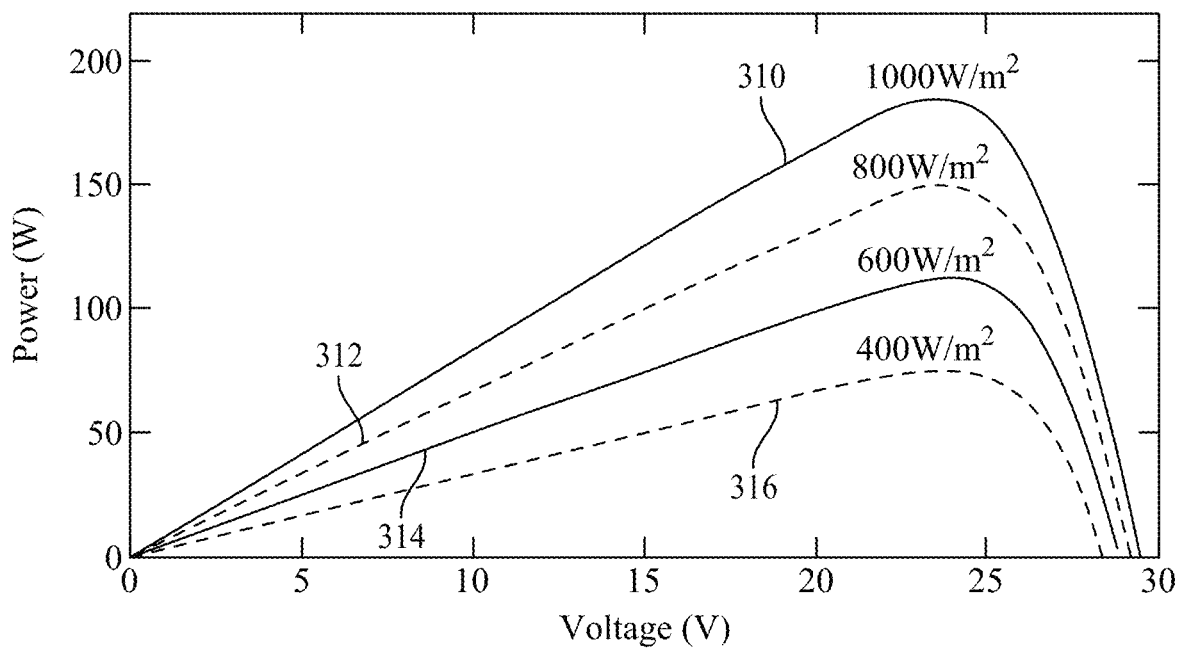
FIG. 3B shows an effect of irradiance levels on power and voltage, according to certain embodiments.
Figure 3C:
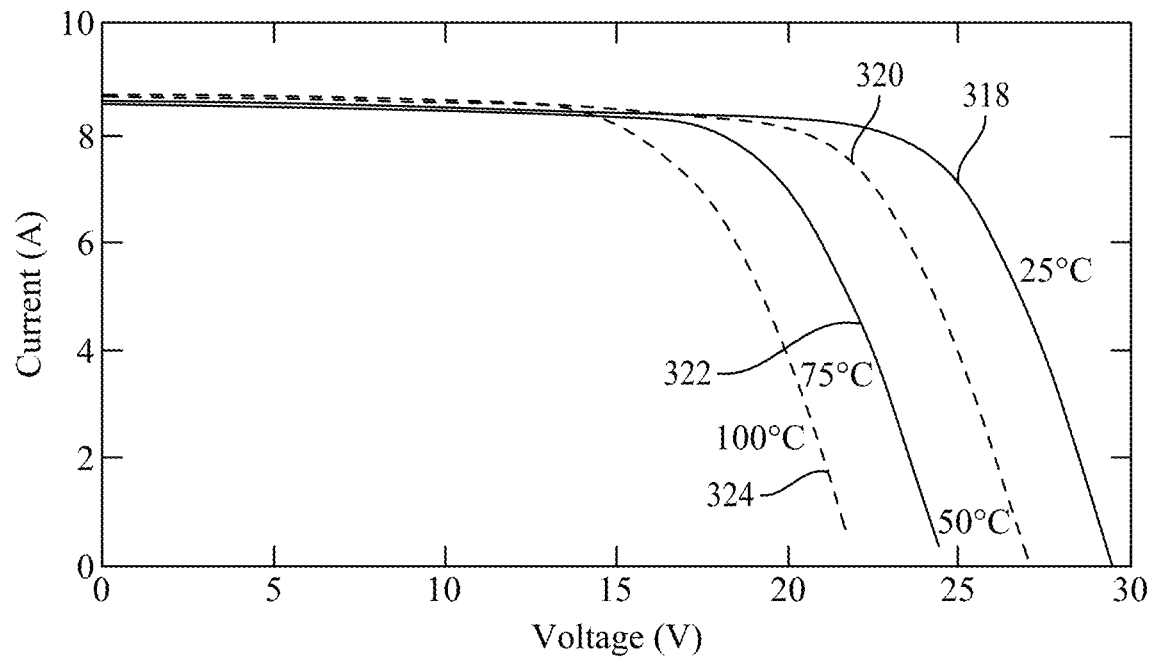
FIG. 3C shows an effect of temperature levels on current and voltage, according to certain embodiments.
Figure 3D:
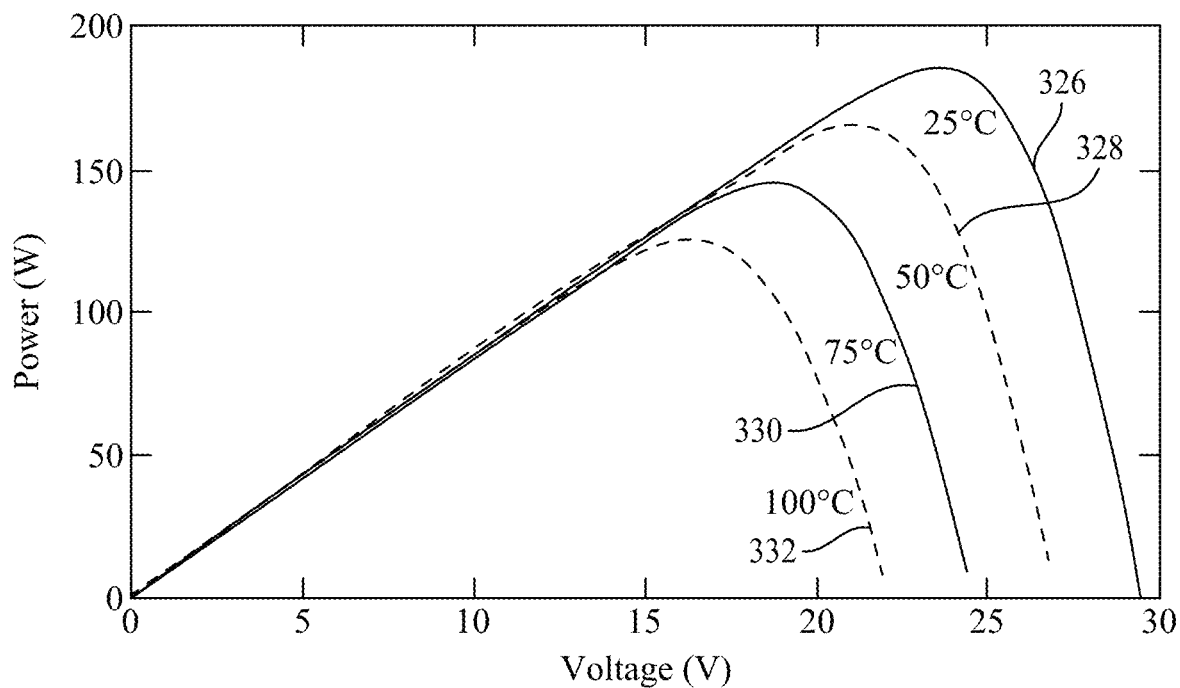
FIG. 3D shows an effect of temperature level on power and voltage, according to certain embodiments.

Inconsistent variations in solar insolation and temperature have a considerable effect on the voltage and current of the PV array 202. FIG. 3A-FIG. 3D show the effect of different levels of irradiance level and temperature tracked using MPPT using perturb and observe (P&O) algorithm. FIG. 3A shows curve 302 to curve 308 representing varying current and voltage for different irradiance levels from 400 W/m² to 1000 W/m². Curve 302 shows varying current and voltage levels for a 1000 W/m² irradiation. Similarly, curve 304 to curve 308 show varying current and voltage levels for 800 W/m² irradiation, 600 W/m² irradiation, and 400 W/m² irradiation, respectively. FIG. 3B shows curve 310 to curve 316 representing varying power and voltage levels for different irradiance levels. Curve 310 shows a varying power for a 1000 W/m² irradiation. Similarly, curves 312 to 316 show varying power for 800 W/m² irradiation, 600 W/m² irradiation, and 308 400 W/m² irradiation, respectively. FIG. 3C shows curve 318 to curve 324 representing varying current and voltage for different temperatures. Curve 318 shows a varying current and voltage for irradiation at a temperature 25° C. Similarly, curve 320—curve 324 show varying current and voltage for temperatures of 50° C., 75° C. and 100° C., respectively. FIG. 3D shows curve 326 to curve 332 representing varying power and voltage for different temperatures. Curve 326 shows a varying current and voltage for a 25° C. irradiation. Similarly, curve 328 to curve 332 show varying current and voltage for 50° C., 75° C. and 100° C., respectively.

To track maximum power from the PV array 202, a perturb and observe (P&O) algorithm is used together with the boost converter 204. The P&O algorithm is used due to its simplicity and ease of implementation. A disturbance in output voltages of the PV panels 202 is based on the P&O. The P&O is a continual process of disturbing the voltages until concurrence of the operating point occurs at MPP. This P&O compares the power as well as voltages of time (K) with a time (K–1) and anticipates a time to approximate the MPP. A small change in voltage causes an increase in the power of the PV panel. The perturbations generated by the P&O algorithm are provided in Table 2 below.

TABLE 2

Scheme of P&O algorithm

| Perturbation | ΔP | Resulting Perturbation |
|---|---|---|
| +Ve | +Ve | +Ve |
| +Ve | –Ve | –Ve |
| –Ve | +Ve | –Ve |
| –Ve | –Ve | +Ve |

According to the data shown in Table 2, if the alteration is positive, perturbation in voltage is pursued along the same direction. Negative power indicates that MPP is distant and disruption is depreciated to achieve MPP. The output voltages $V_{pv}$ can be increased up to 500 V with the variation of duty cycle D of pulse width modulation (PWM) devices in a boost converter 204. The DC link assists in reducing the voltage ripple and stabilizes the voltages at the DC side of the inverter 212. The boost converter 204 can be mathematically expressed by:

$$V_{dc} = \frac{V_{pv}}{1-D}. \tag{4}$$

In the present disclosure, a model was generated using the MATLAB script editor, while standard test conditions (G=1000 W/m² and T=25° C.) were used to generate power of 1.04 p.u and $V_{pv}$=0.8 p.u. The results showed the maximum power point depicted higher efficiency with fewer oscillations.

A mathematical model of the MPPT controller is now described. Unmodeled dynamics cause external disturbances in the grid. Conventionally, nonlinear controllers were implemented to identify and manage the effects of the disturbances. The sliding mode controller (SMC) is a type of nonlinear control. The approach associated with SMC is to engage the system trajectory (whether the voltage is increasing or decreasing) on a sliding surface (region of permissible operation). Control inputs are used to keep motion trajectories on a predefined surface. In addition, robustness and finite-time convergence make the SMC a preferred choice. The control inputs can be classified into two phases including an approaching phase and a sliding phase. The approaching phase is known as an initial phase, where the system trajectory approaches a desired state. A nonlinear switching system contingent on time is given by:

$$\dot{x} = f(x \cdot t) + g(x \cdot t). \tag{5}$$

$$y = h(x \cdot t). \tag{6}$$

The state variable is represented by x while f and g represent smooth vector fields in the same plane, while u represents the discontinuous control exertion. One aspect involves efforts to diminish the error of the output variable $e_y=y-y_{ref}$ to zero. Σ(x) is defined as a certain scaler function of system state tracking error "e" with its higher derivatives of $e^{(1)}, e^{(2)}, \ldots e^{(k)}$:

$$\sigma(x) = f\left(e^{(1)}, e^{(2)}, \ldots e^{(k)}\right). \tag{7}$$

By considering the linear combination of subsequent types:

$$\sigma = e^k + \sum_{i=0}^{k-1} c_i e^i. \tag{8}$$

In the sliding phase, the system is subjected to the sliding surface in finite time. The sliding phase is not eternal, and inconsistency in switching causes a chattering phenomenon. In control systems and signal processing, "chattering" refers to a phenomenon characterized by rapid and excessive switching or oscillations around a desired setpoint or control target. This phenomenon is often undesirable as it can lead to instability, increased wear and tear on mechanical components, and inefficient system operation. The chattering phenomenon is a major obstacle in higher-order techniques based on SMC. As a result, degradation in performance may occur. Chattering-free sliding mode characteristics can be achieved by a Lyapunov-based finite time sliding mode controller (FTSMC). The Lyapunov-based finite-time sliding mode controller is a type of control system that utilizes the principles of sliding mode control and Lyapunov stability theory to achieve stable and fast convergence to the desired state in a finite amount of time. In some aspects, gains of FTSMC drive control laws. Consequently, an optimized sliding surface is utilized to propel the variable step size of the algorithm of MPPT controller. SMC provides accurate performance in the existence of uncertainties. The selection of the sliding surface s(x) is an important aspect and state trajectories are dependent based on equation (9):

$$s(x)=0. \tag{9}$$

The chattering phenomenon is undesirable in this control. To converge V(t) to the equilibrium point in a definite time, there is a restriction given by:

$$\dot{V}(t) + \beta V(t) + \alpha V^\gamma(t)) \le 0, \forall\, t > t_0. \tag{10}$$

While V(t) is a continuous definite function, convergence of time takes place as follows:

$$t_{\mathit{fl}} \le t_o + \frac{1}{\beta(1+\gamma)} \ln \frac{\beta V^{1-\gamma} t_o + \alpha}{\alpha}, \tag{11}$$

$$\alpha > 0,\ \beta > 0,\ \text{and}\ 0 < \gamma < 1.$$

The PSO is based on swarm intelligence. The PSO is popular due to ease of implementation, and simple rules are sufficient to model the swarm behavior. In general, following three rules are deployed for the PSO:
1. Step away from an adjacent agent;
2. Go toward the destination; and
3. Go to the center of the swarm.

Simple vectors may be used to explain the behavior of the individual agent. The PSO may be explained by assuming birds flocking in two-dimensional space (x, y). While ($V_x$ and $V_y$) represent the velocities of the axis. The position of the agent is revamped by perceiving the information about the position as well as the velocity of the agent. The advancement of bird flocking is performed by a defined function. The individual agent realizes its best value ($P_{best}$) as well as its x,y position. The aforementioned information is analogous to a particular value of individual agents as well as in the group. Individual agent endeavors to adapt their position by utilizing the information including:
1. The topical current locale (x,y) as well as velocities ($V_x$, $V_y$).
2. The distance between locales $P_{best}$.
3. The distance between locale position $g_{best}$.

The velocity of an individual agent can be reformed by using an adherent set of equations.

$$V_i(t+1) = V_i(t) + c_1 rand_1(p_i - s_i(t)) + c_2 rand_2(p_g - S_i(t)), \tag{12}$$

$$s_i(t+1) = s_i t + V_i(t+1), \tag{13}$$

where $v_i t$ represents the velocity of the agent i at iteration t; $rand_1$ and $rand_2$ show random numbers amongst 0 and 1;

Locales of agent i at iteration t is shown as ($s_i(t)$); and $P_i$ shows $P_{best}$ of an agent I and $p_g$ shows $P_{best}$ of a group.

In the PSO algorithm, the agents represent the candidate solutions, and the swarm represents the population of agents. The velocity represents the change in the agent's position, and $g_{best}$ represents the best solution found by the swarm. The reactive power control value $U_q$ is generated by the sliding mode controller, as it is designed by using PSO algorithm to optimize its parameters.

The PSO algorithm and the grid-connected solar energy systems are indirectly related, as the PSO algorithm is used to optimize the sliding mode controller, which in turn regulates the voltage of the system. The parameters of the sliding mode controller, such as the gains and the sliding surface, are optimized using the PSO algorithm to achieve better voltage regulation performance.

Figure 4:
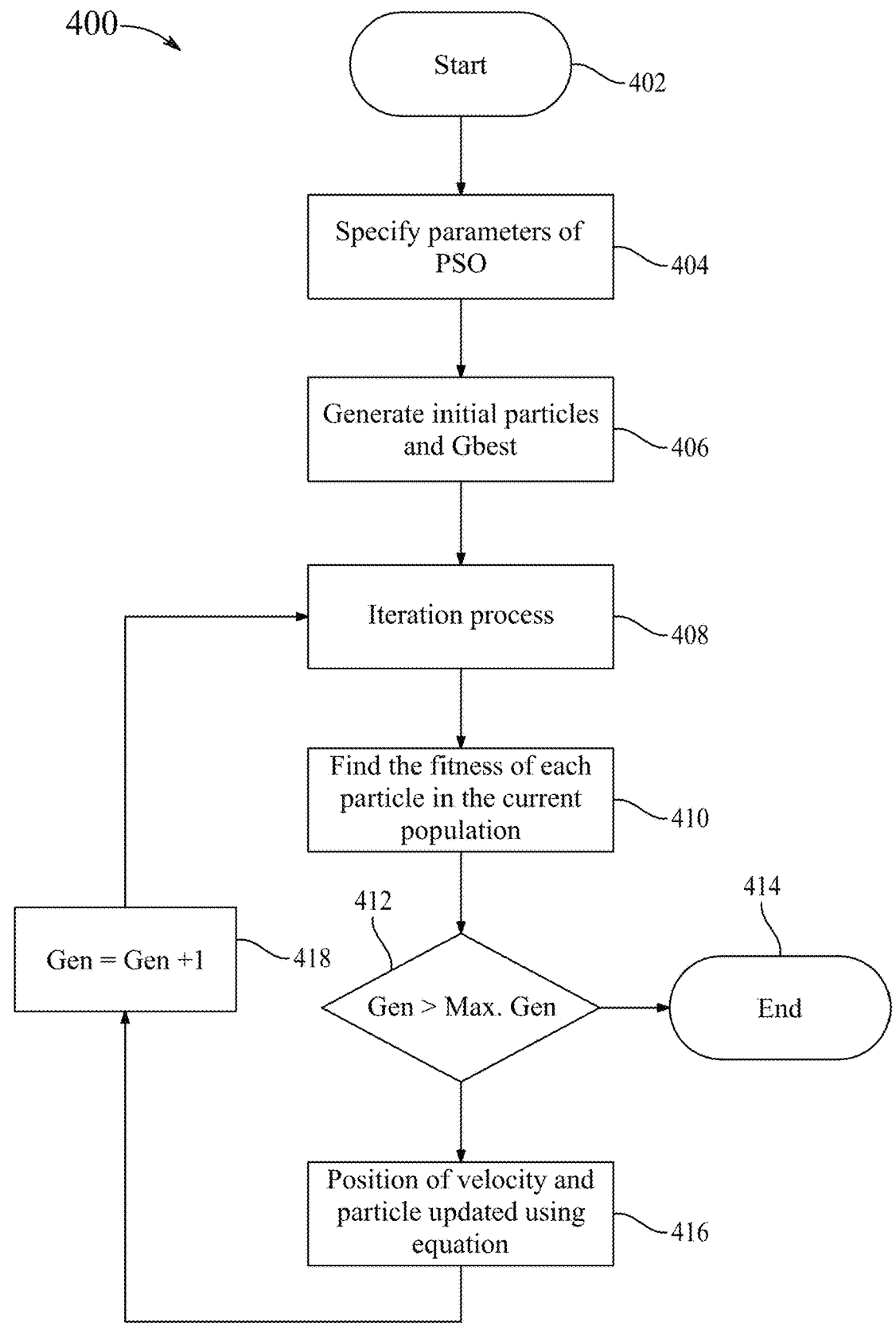
FIG. 4 shows algorithmic rules for particle swarm optimization (PSO) to achieve defined parameters of sliding mode controller (SMC) implementation, according to certain embodiments.

FIG. 4 shows algorithmic rules for PSO to achieve defined parameters of the SMC implementation of PSO-SMC variable step size P&O-MPPT.

The process beings at step 402. In step 404, parameters of the PSO are specified. Step 406 includes generating initial particles and $g_{best}$. Step 408 is a point in iteration process. Step 410 includes finding the fitness of each particle in a current population. Step 412 is an evaluation step in which it is determined whether Gen is greater than the Max. Gen. If the evaluation returns true, then the process comes to an end at step 414. Otherwise, in step 416, the position of velocity and particle of velocity are updated using the equation. The process is moved at step 412, where Gen is incremented by 1 and moved to the iteration process at 408 is continued until the process comes to an end at step 418.

Implementation of PSO-SMC variable step size is described below. The sliding surface is defined by a function of discrepancy in voltage and current.

$$x = K_a \cdot dI + K_b \cdot dV + K_c \cdot \text{perturbation}. \tag{14}$$

A first-order SMC is characterized by:

$$\sigma = \frac{dx}{dt} + K_d \cdot x. \tag{15}$$

By using the control law, a PWM ratio D is driven by SMC.

$$D = K_e \cdot \text{sgn}(\sigma). \tag{16}$$

Figure 5:
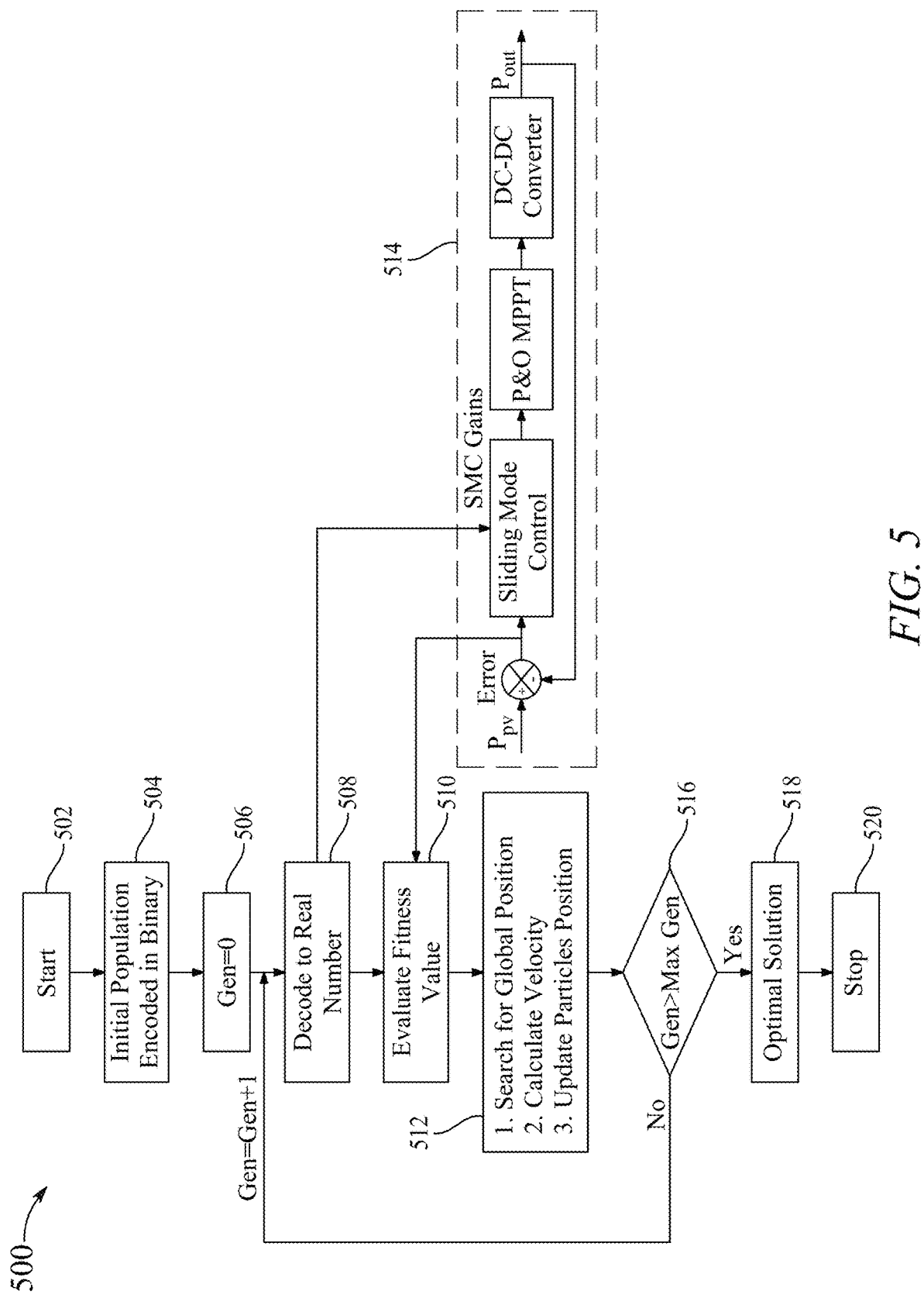
FIG. 5 shows steps for optimization of SMC gains for the PSO, according to certain embodiments.
Figure 6:
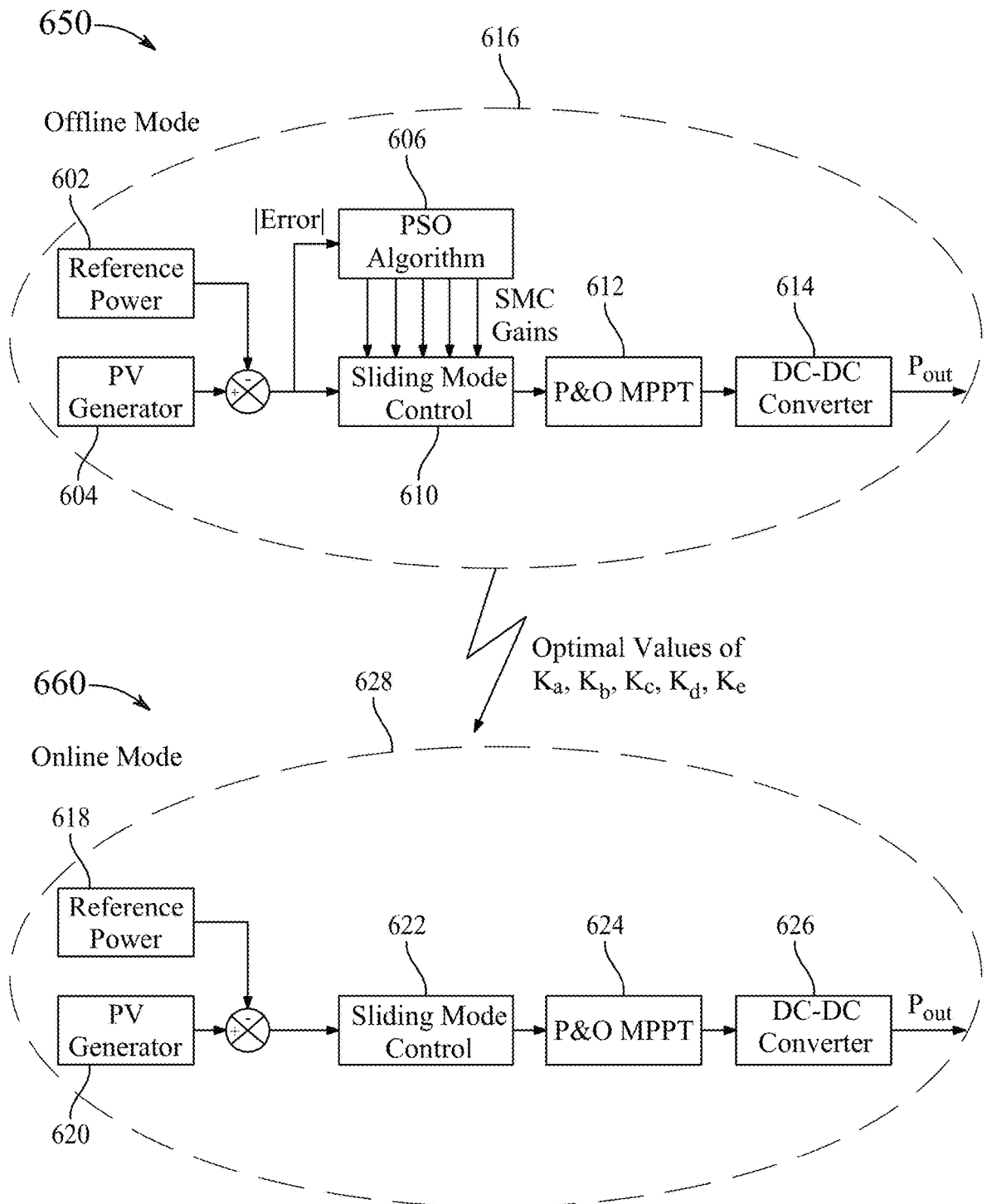
FIG. 6 shows a configuration of a finite time sliding mode controller (FTSMC) in an offline mode and an online mode, according to certain embodiments.

Gains of SMC ($K_a$, $K_b$, $K_c$, $K_d$) are optimized by utilizing the PSO algorithm as shown in FIG. 5 and the online mode and offline mode of the FTSMC 226 is depicted in FIG. 6.

FIG. 5 shows steps for optimization of SMC gains by the PSO. Step 502 initiates a process for optimization of SMC gains by the PSO. In step 504, the initial population is encoded in binary. In step 506, Gen is set to 0. In step 508, the encoded numbers are decoded into a real number. In step 510, a fitness value is evaluated using input from $P_{pv}$ and error. Also, the output of step 508 is provided to step 514 that determines $P_{out}$. In step 514, the output of step 508 is provided to the sliding mode control which also receives $P_{pv}$ and $P_{out}$ (feedback) as inputs to determine P&O MPPT, which is provided by the DC-DC converter to generate $P_{out}$. In step 512, a global position is searched, the velocity is calculated and particle positions are updated. In step 516, Gen is compared to Max Gen to determine if Gen is greater than Max Gen. If the result of the comparison is true, in 518, the optimal solution is determined. In step 520, the process is completed.

The integrated absolute error (IAE) measure is utilized as an objective function (ε) in equation (17).

$$IAE = \int |\varepsilon| dt \tag{17}$$

The FTSMC 226 is configured in an offline mode and an online mode as shown in FIG. 6. The offline mode is shown in 650 of FIG. 6. In the offline mode 650, a plurality of potential sets of gain parameters of the FTSMC 226 are generated using PC generator. The plurality of sets of potential gain parameters are initialized as a population of the PSO algorithm 606 using reference power 602. Each of the sets of potential gain parameters is optimized using the PSO algorithm 606. The IAE function for each optimized set of potential gain parameters is evaluated based on the difference between the voltage across the second capacitor 210 and the grid voltage. The optimized set of potential gain parameters which generates the smallest IAE are determined. The optimized gain parameters are characterized as the set $\{K_a, K_b, K_c, K_d, K_e\}$, where:

$K_a$ equals the gain of a discrepancy in the current,
$K_b$ equals the gain of a discrepancy in the voltage,
$K_c$ equals a gain of a perturbation of the current $I_{pv}$ output by the PV array 202,
$K_d$ equals a gain of a sliding surface x, and
$K_e$ equals a gain of a sign of a first order sliding mode control σ.

The sliding mode surface x is defined by: $x=K_a \cdot dI + K_b \cdot dV + K_c$. perturbation. The first order sliding mode control o is characterized by: $σ=dx/dt+K_d \cdot x$. The duty cycle D is characterized by: $D=K_e \cdot sgn(σ)$. The optimized set of potential gain parameters which generates the smallest IAS is stored in the memory of the FTSMC controller as the optimized gain parameters of the FTSMC controller. Various sets of gains of the controller are being tested by using offline mode. Conversely, optimal gains of the controller are used to track the MPP. It can be done by the variation in step size of the P & O MPPT algorithm. In online mode, the gain parameters of the FTSMC controller are updated with the optimized gain parameters. The online mode 660 includes receiving input from reference power 618 and the PC generator 620 and performing sliding control using sliding mode control 22 where the gain parameters are updated with the optimal values. The P&O MPPT 624 and DC-DC converter 626 process to generate $P_{out}$.

A model of voltage source control (VSC) is now described. The PWM approach is implemented in a three-phase bidirectional DC-AC IGBT-based VSC. Conversion can be of one or two steps. In one-step conversion, the output power of PV is directly connected to VSC as an input. While in two-stage conversion, the duty cycle of $V_{pv}$ is calculated. Advancement in the stability edge is the focal point of study by dint of the dynamic model of VSC. Components of current for instantaneous d-q axis are utilized for P-Q control. For this purpose in an example, a phase-locked loop (PLL) is utilized. A photovoltaic system is connected with a distribution system via VSC and an assimilate of impedance $R_i+jω_eL_i$, $ω_e$ shows angular frequency. $R_g+jω_eL_g$ reflects impedance among points of common coupling. If there is an RLC load at PCC, then $V_{iabc}$ is given by:

$$V_{iabc} = L_i p i_{abc} + R_i i_{abc} + V_{sabc}. \tag{18}$$

where $V_{iabc}$ is the voltage in abc coordinates, $L_i$ is the inductance in the system, $I_{abc}$ is the current in abc coordinates, $R_i$ is the resistance of the system, $V_{sabc}$ is the voltage source in abc coordinates and p is the differential operator d/dt.

The dynamic model of the VSC in the abc frame of reference is expressed in (18). Accordingly, the transformation from the abc frame of reference to the d-q reference frame is given in (19).

$$p i_{id} = \frac{-R_i}{Li} i_{id} + ω_e i_{iq} + \frac{(V_{id} - V_{sd})}{L_i}, \tag{19}$$

$$p i_{iq} = \frac{-R_i}{Li} i_{iq} + ω_e i_{id} + \frac{(V_{iq} - V_{sq})}{L_i}, \tag{20}$$

$$V_{id} = \frac{mV_{dc} \cos δ}{\sqrt{2}}, V_{iq} = \frac{mV_{dc} \sin δ}{\sqrt{2}}, \tag{21}$$

p=d/dt is the differential operator, $i_{id}$ is the current component in the d-axis, $ω_e$ is the angular frequency, $i_{iq}$ is the current component in the q axis, $V_{id}$ is the voltage component in the d axis and $V_{sd}$ is the voltage source component in the d axis, while m presents the modulation index and δ shows the firing angles for the VSC. In equation 20, $i_{id}$ is the current component in the d-axis, $V_{sq}$ is the voltage source component in the q axis. in equation (21), $V_{dc}$ is the DC link voltage, δ is the firing angle for the VSC, and $V_{iq}$ is the q-axis voltage component in dq coordinates.

The second derivative of the DC link capacitor voltage is given by:

$$\frac{1}{c} \frac{\partial V_{dc}^2}{dt^2} = P_{pv} - P_{dc} \text{ and } P_{dc} = P_t + P_{loss}. \tag{22}$$

The firing angle α is measured from the zero crossing of the voltage of the timing signals.

Equation (22) shows the dynamics of DC link capacitor voltages. $P_{dc}$ is the power supplied to VSC, $P_{loss}$ represents power losses in the system and $P_t$ represents the active power from the inverter bus. If the power losses are ignored, then $P_{dc}=P_t$. The PLL based d-q current model is derived in terms of the active and reactive power relationship to attain less complex VSC dynamics, and to avoid unnecessary PLL angular frequency calculation at start up. At PCC 214, active and reactive power in the d-q frame of reference is written as, $$P_i = \left(\frac{3}{2}\right)(V_{sd}V_{id} + V_{sq}i_{iq}), Q_i = \left(\frac{3}{2}\right)(V_{sq}i_{id} - V_{sd}i_{iq}). \tag{23}$$

In the d-q reference frame, the spontaneous current at the PCC 214 is written as:

$$i_{id} = \frac{2}{3}\left(\frac{P_i V_{sd} + Q_i V_{sq}}{V_s^2}\right), \quad i_{iq} = \frac{2}{3}\left(\frac{P_i V_{sq} + Q_i V_{sd}}{V_s^2}\right). \quad (24)$$

and $$V_s^2 = V_{sd}^2 + V_{sq}^2$$

Voltage components $V_{sd}$, $V_{sq}$ active and reactive powers $P_i$ and $Q_i$ are given by:

$$V_{sd} = \left(\frac{1}{\sqrt{3}}\right)(V_{sb} - V_{SC}), \; i_{id} = \left(f\frac{1}{\sqrt{3}}\right)(i_{ib} - i_{ic}). \quad (25)$$

$$V_{sq} = \left(\frac{2}{3}\right)V_{sa} - \left(\frac{1}{3}\right)(V_{sb} + V_{SC}), \; i_{iq} = \left(\frac{2}{3}\right)i_{ia} - \left(\frac{1}{3}\right)(i_{ib} + i_{ic}). \quad (26)$$

$$P_i = \frac{3}{2}(V_{sd}i_{id} + V_{sq}i_{iq}) = (V_{sa}i_a + V_{sb}i_{ib} + V_{sc}i_{ic}). \quad (27)$$

$$Q_i = \frac{3}{2}(V_{sq}i_{id} - V_{sd}i_{iq}) = \frac{1}{\sqrt{3}}[V_{sa}(i_{ib} - i_{ic}) + V_{sb}(i_{ic} - i_{ia}) + V_{sc}(i_{ia} - i_{ib})]. \quad (29)$$

By placing the values of $1_{id}$ and $1_{iq}$ from (24) the following expressions are derived:

$$\frac{\partial P_i}{\partial r} = \frac{-R_i P_i}{L_i} - \omega_e Q_i + \frac{3}{2L_i}[(V_{sd}V_{id} + V_{sq}V_{iq}) - (V_{sd}^2 + V_{sq}^2)]. \quad (29)$$

$$\frac{\partial Q_i}{\partial r} = \frac{-R_i Q_i}{L_i} + \omega_e P_i + \frac{3}{2L_i}[(V_{sq}V_{id} - V_{sq}V_{iq})]. \quad (30)$$

$$\frac{\partial V_{dc}}{\partial r} = \frac{1}{CV_{dc}}(P_{pv} - P_{dc}). \quad (31)$$

$P_{dc}$ shows the active power of VSC. This can be modified by ignoring power losses defined by:

$$P_{dc} = P_i.$$

$P_i$ is the active power of VSC at dc-side. Equation (31) can be rewritten as:

$$\frac{\partial V_{dc}}{\partial t} = \frac{1}{CV_{dc}}(P_{pv} - P_i). \quad (32)$$

Equations (29), (30), and (32) are used for the dynamic model of the VSC based grid-connected PV system. The operating frequency is achieved during system dynamic operation by a droop control strategy.

$$f - f_o = -R_{droop}(P_i - P_{pv}).$$

Figure 7A:
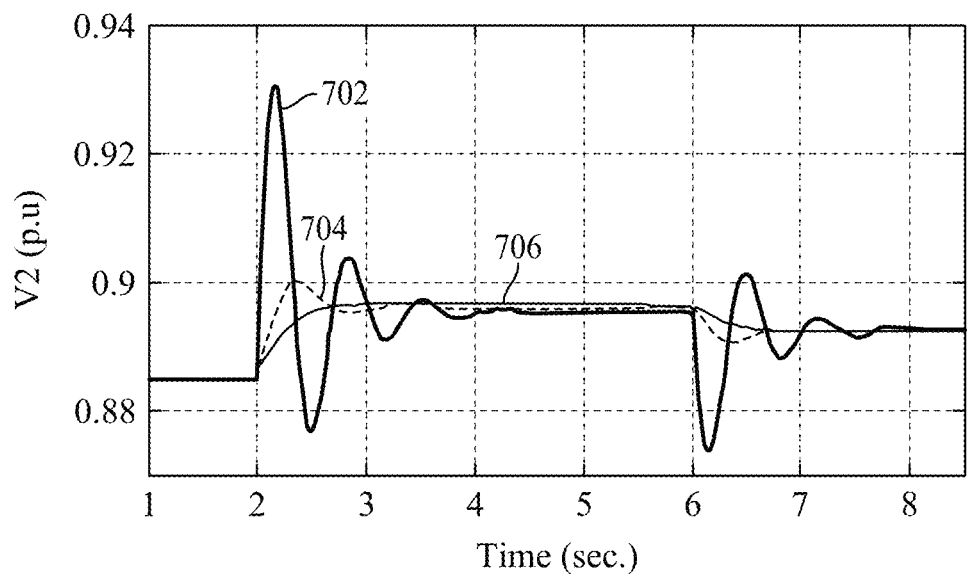
FIG. 7A shows the comparison of the effectiveness of FTSMC voltage control over conventional control techniques, according to certain embodiments.
Figure 7B:
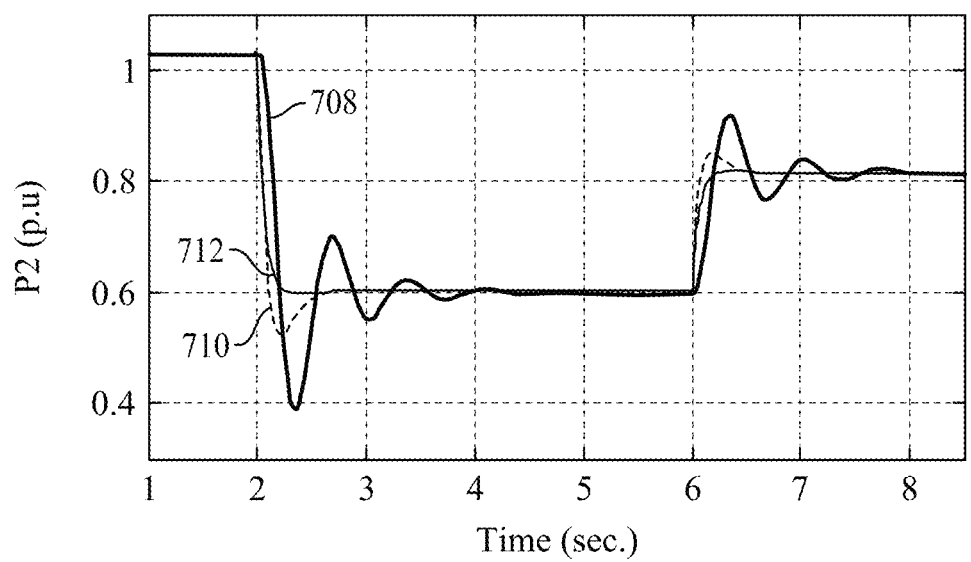
FIG. 7B shows the comparison of the effectiveness of FTSMC active power control for the conventional P&O control techniques, according to certain embodiments.
Figure 7C:
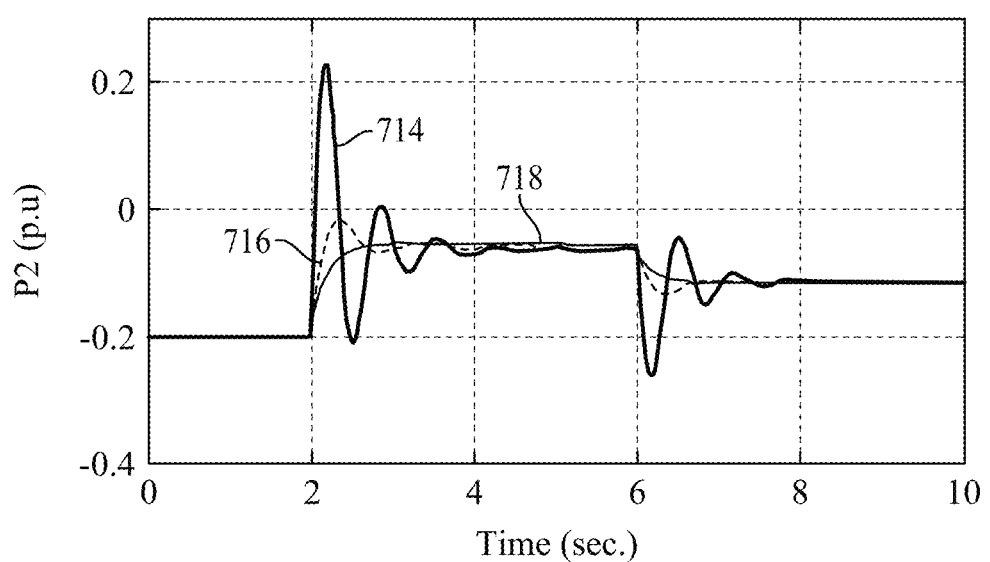
FIG. 7C shows the comparison of the effectiveness of FTSMC reactive power control over conventional P&O control techniques, according to certain embodiments.

FIG. 7A-FIG. 7C show the effectiveness of the FTSMC 226 control over conventional control techniques. In addition, the FTSMC 226 was found more stable and less prone to oscillating characteristics. FIG. 7A shows a response curve 706 of FTSMC against the conventional P&O (curve 702) and sliding control (curve 704). FIG. 7B shows a response curve 712 of FTSMC against the conventional P&O (curve 708) and sliding control curve (curve 710). FIG. 7C shows a response curve 718 of FTSMC 226 against the conventional P&O (curve 714) and sliding control (curve 716).

Finite time SMC for the VSC is described now. The dynamic model for nonlinear control for the VSC is expressed in (19)-(21). The local frame of reference is chosen to simplify the analysis for VSC. Subsequently, $V_{sd} = V_s$ and $V_{sq} = 0$. Therefore, power flow to the converter becomes simply $P_1 = V_s i_{id}$, $Q1 = -V_s i_{iq}$. By implementing the aforementioned transformation, equations (19)-(21) become:

$$\frac{\partial P_i}{\partial t} = \frac{-R_i P_i}{L_e} - \omega_e Q_i + \frac{3}{2L_i}[(V_s U_d V_{dc} - V_s^2)]. \quad (33)$$

$$\frac{\partial Q_i}{\partial t} = \frac{-R_i Q_i}{L_e} + \omega_e P_i + \frac{3}{2L_i}[(-V_s U_q V_{dc})]. \quad (34)$$

where $$U_d = \frac{m\cos\delta}{\sqrt{2}}, \quad U_q = \frac{m\sin\delta}{\sqrt{2}}. \quad (35)$$

Figure 8:
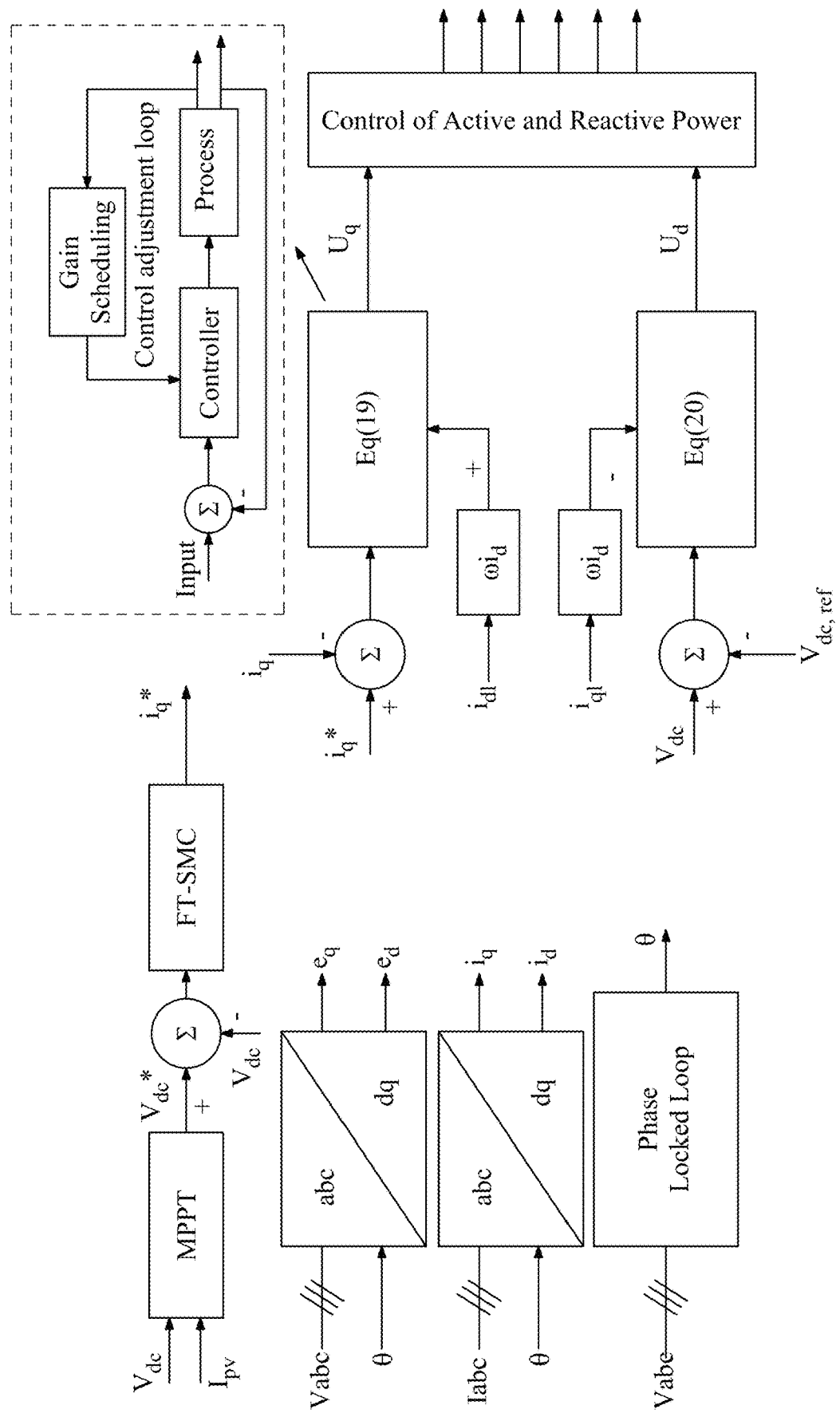
FIG. 8 is a block diagram of VSC control of a PV system, according to certain embodiments.

The block diagram of the grid-connected PV system is shown in FIG. 8, which shows the input $V_{dc}$ and $I_{pv}$ provided to MPPT which produces $V_{dc}^*$, which is fed to the FTSMC along with $V_{dc}$ to generate $i_q^*$. FIG. 8 also shows an implementation of Equation (19) (as well as a circuit) using Equation (20) to generate $U_q$ and $U_d$ which is fed to control of active and reactive power. "U" is a control input or variable that represents the input to the control system (the VSC). This variable is used to influence the behavior of the control system in order to achieve desired control objectives.

FIG. 8a shows the components of the phase locked loop (PLL) abc/dq. The overview of the complete model and its feedback control architecture is depicted in FIG. 9.

Figure 9:
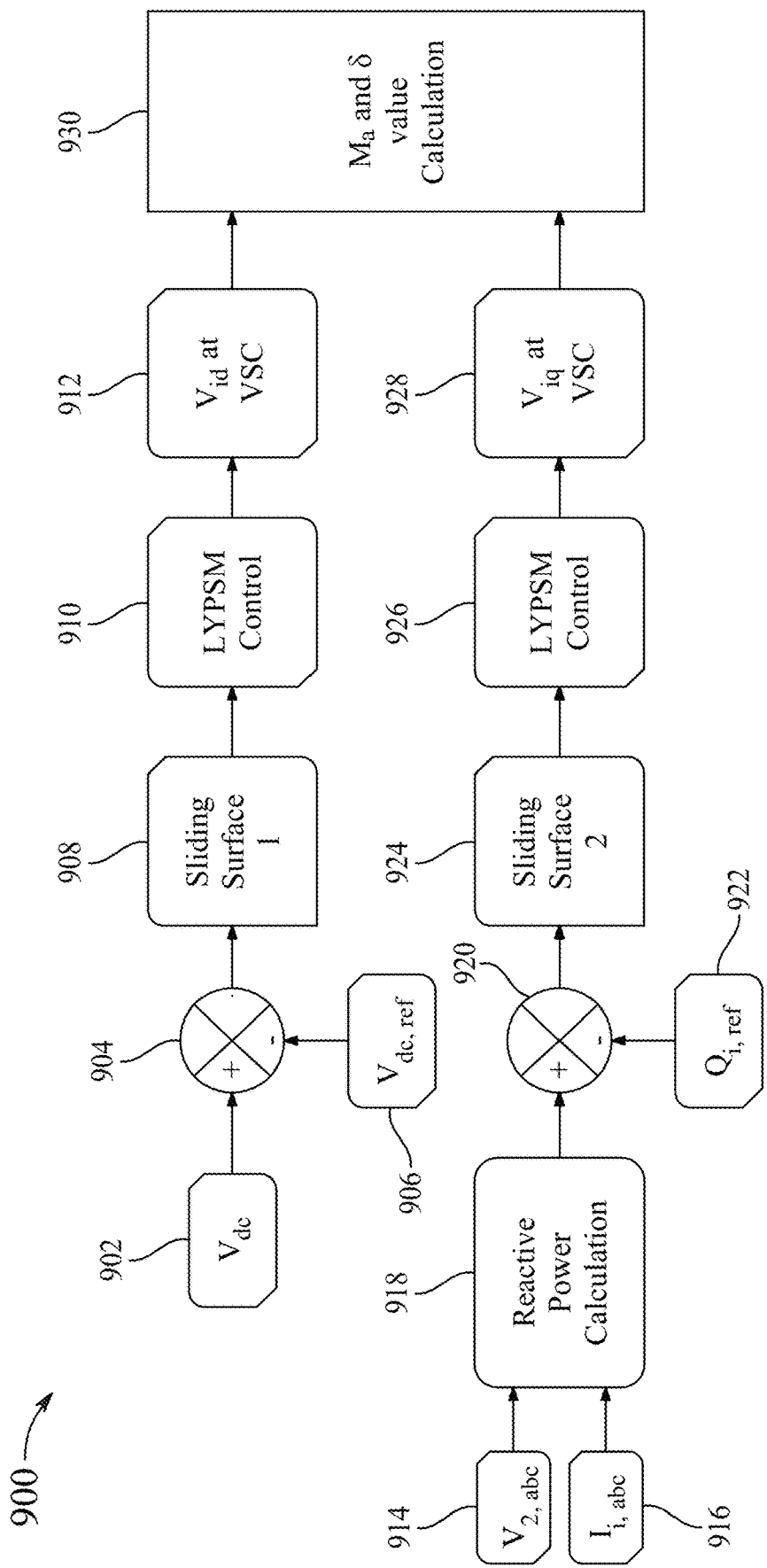
FIG. 9 is a block diagram of the Q-V control for the generation of the PV system, according to certain embodiments.

FIG. 9 shows the feedback control architecture of the PLL calculation of the Ma and 8 values. $V_{dc}$ is received as input along with the reference signal $V_{dc}$ 902. The input is processed using an adder 904 and provided to sliding surface 1 908, and LYPSM control 910, (Lyapunov sliding mode) which generates $V_{id}$ at the VSC. Also, $V_{2,abc}$ 914 and $I_{i,abc}$ 916 are provided for reactive power calculation 918 which is combined by adder 920 with the reference signal $Q_{i,ref}$, and the output of adder 920 is provided to sliding surface 2 924 and the LYPSM control 926 which generates $V_{iq}$ at the VSC. The $V_{id}$ and $V_{iq}$ are used in $M_a$ and $\delta$ values calculation.

The control phenomenon is accomplished by reactive power control and DC voltage control. DC voltage control is explained through equations (37)-(40). A DC error signal is calculated in equation (38) by utilizing the difference between the reference voltage signal and DC voltages. DQ transformation makes the computational process simpler. Using this transformation, three-phase instantaneous voltages and currents are transformed into a DQ frame of reference. The control process becomes more convenient as well. The feedback PI controller offers a reliable control solution.

The controller for active and reactive power is now described. The active and reactive flow of power can be controlled by two output states (Q and $V_{dc}$). FIG. 9 shows reactive and active power is modulated by AC and DC voltages respectively. The following equations are calculated to accomplish targeted control of the MPPT.

$$u_d = \frac{3V_s^2 + 2R_i P_{iref} + 2\omega_e L_i Q_{iref}}{3V_s V_{dcref}}. \tag{36}$$

$$u_q = \frac{-2R_i Q_{iref} + 2\omega_e L_i P_{iref}}{3V_s V_{dcref}}. \tag{37}$$

The MPPT controls the DC-link voltage. Control of reactive power is considered an alternate control variable. Q-V control helps to accomplish reactive power control. The sliding surface is designed in a later stage. Multilevel DC-link voltage control is developed to extract maximum power from each array of the PV.

Voltage control of the DC-link is described. The sliding surface is accomplished after Q-V control. It is established by the Q and $V_{dc}$ error following the Lyapunov direct stability theorem ($y_1 = V_{dc}$, $y_2 = Q$) which shows output states. The error on the PV side is expressed as:

$$e_{DC} = V_{dc} - V_{dcref} \tag{38}$$

$V_{dc} = (P_{pv} - P_{iref})/CV_{dc}$ hence, $P_{iref} = P_{pv}$. The sliding surface for the DC voltage error is given as follows:

$$\dot{e}_{DC} = \frac{1}{CV_{dc}}(P_{pv} - P_i) - \dot{V}_{dcref}. \tag{39}$$

$$\sigma_{dc} = e_{DC} + K_{dc}|e_{DC}|^{\frac{q}{p}}\text{sign}(e_{DC}),\ K_{dc} > 0,\ q < p. \tag{40}$$

where q and p are positive odd integers. After differentiation and then substitution of the values in (40), $$\dot{\sigma}_{DC} = a_1 - a_2 U_d. \tag{41}$$

where, $$a_1 = (P_{pv} - P_i)K_{dc}\left(\frac{q}{p}\right)|e_{DC}|^{\frac{q}{p}-1}\text{sign}(e_{DC}) +$$

$$\frac{1}{CV_{dc}}\left(\frac{R_i P_i}{L_i} + \omega_e Q_i + \frac{3}{2L_i}V_s^2\right)$$

$$a_2 = \frac{3V_s}{2L_i C}$$

Reactive power control is now described. The reactive power error is given by:

$$e_Q = y_2 - y_{2ref} = Q_i - Q_{iref}. \tag{42}$$

By taking the derivative, the equation can be written as:

$$\dot{e}_Q = \frac{-R_i Q_i}{L_i} + \omega_e P_i + \frac{U_p}{L_i} - \dot{Q}_{iref}. \tag{43}$$

The sliding surface for the reactive power is given by:

$$\sigma_Q = \int_0^t \left(K_{1Q}e_Q + K_{2Q}e_Q^{\frac{q}{p}}\right)\partial t + e_Q,\ K_{1Q} > 0,\ K_{2Q} > 0. \tag{44}$$

$$\dot{\sigma}_Q = \left(K_{1Q}e_Q + K_{2Q}e_Q^{\frac{q}{p}}\right) -$$

$$\frac{R_i Q_i}{L_i} + \omega_e P_i + \frac{3}{2L_e}[-V_s U_q V_{dc}] - \dot{Q}_{iref} = a_a - a_4 U_q. \tag{45}$$

where, $$a_3 = \left(K_{1Q}e_q + K_{2Q}e_Q^{\frac{q}{p}}\right) - \frac{R_i Q_i}{L_i} + \omega_e P_i - \dot{Q}_{iref}$$

$$a_4 = \frac{3}{2L_e}V_s V_{dc}$$

and where $K_{1Q}$ and $K_{2Q}$ control the convergence rate of tracking dynamics. The VSC interface is accomplished by a positive definite Lyapunov function using the equation given in (45).

$$V = \frac{1}{2}\sigma_{DC}^2 + \frac{1}{2}\sigma_Q^2. \tag{46}$$

$$\dot{V} = a_1\sigma_{DC} - a_2\sigma_{DC}U_d + a_3\sigma_Q - a_4\sigma_Q U_q. \tag{47}$$

$$U_d = \frac{a_1 + K_1\sigma_{Dc} + K_2|\sigma|^\lambda\text{sign}(\sigma_{DC})}{a_2},\ K_1 > 0,\ K_2 > 0,\ 0 < \lambda < 1. \tag{48}$$

$$U_q = \frac{a_3 + K_3\sigma_Q + K_4|\sigma|^\lambda\text{sign}(\sigma_Q)}{a_4},\ K_3 > 0,\ K_4 > 0,\ 0 < \lambda < 1. \tag{49}$$

If $\dot{V} < 0$, then adherence to VSC control can be expected. Control quantities are described in equations (47) to (49). The sigma function is implemented to track the dynamics of control. The sign function controls the function of hard switching. Chatter free FTSMC utilizes the tanh function. A Sat function is described as, $\text{sat}(\sigma_{DC}) = \text{sign}(\sigma_{DC})$ if $|\sigma_{DC}| \geq 1/\sigma_{DC}$ and alike to $\sigma_{DC}$. The "Sat" function refers to the saturation function. In the context of control systems, the saturation function limits the output of a controller within a specified range. Mathematically, the saturation function can be defined as follows:

If $|x| \geq a$, then $\text{Sat}(x) = \text{sign}(x)*a$

If $|x| < a$, then $\text{Sat}(x) = x$, where x is the input to the saturation function, a is the saturation limit, sign (x) returns the sign of x (i.e., +1 for positive x and −1 for negative x.

In the present disclosure, the saturation function limits the output of the controller within a specific range, ensuring that the control signal does not exceed desired bounds.

Implementation of a real-time controller can be accomplished with the aid of the values derived in equation (49).

$$\tanh(\sigma_{DC}) = \begin{cases} \text{sign}(\sigma_{DC}) & \text{if } \sigma_{DC} \geq 1 \\ \sigma_{DC}|\sigma_{DC}| + 2\sigma_{DC} & \text{if } \sigma_{DC} < 1 \end{cases}. \tag{50}$$

Finite time control can be accomplished with the gains $K_1$, $K_2$, $K_3$ and $K_4$.

$$\begin{array}{l} K_1 = K_{1nom}|\sigma_{DC}|,\ K_2 = K_{2nom}|\sigma_{DC}| \\ K_3 = K_{3nom}|\sigma_Q|,\ K_4 = K_{4nom}|\sigma_Q| \end{array}. \tag{51}$$

The power-frequency characteristics are given by:

$$f - f_0 = R_{droop}(P_i - P_{pv}), \quad (52)$$

where, $f_0$=nominal frequency. By utilizing the Lyapunov function in equation (46), robustness and convergence can be accomplished.

Robustness of the Lyapunov sliding mode control (LYPSMC) is described now. Replacing values of $U_d$ and $U_q$ in equation (48) as well as in equation (49) results in:

$$\sigma_{Dc}^{\cdot} = \frac{1}{CV_{dc}L_i}\left(-K_1\sigma_{Dc} - K_2|\sigma_{Dc}|^{\frac{q}{p}}\text{sign}(\sigma_{Dc})\right) +$$

$$K_{dc}\text{sign}(e_{DC})|e_{DC}|^{\frac{q}{p}}\ln(e_{DC})\frac{d}{dt}\left(\frac{q}{p}\right)\sigma_{Dc}$$

$$\sigma_Q^{\cdot} = -K_3\sigma_Q - K_4|\sigma_Q|^{\frac{q}{p}}\text{sign}(\sigma_Q) + K_{2Q}(e_Q)^{\frac{q}{p}}\ln(e_Q)\frac{d}{dt}\left(\frac{q}{p}\right)$$

Applying the two solutions from equation (46) yields:

$$\dot{V} = \frac{1}{CV_{dc}L_i}\left(-K_1\sigma_{Dc}^2 - K_2|\sigma_{Dc}|^{\frac{q}{p}+1}\text{sign}(\sigma_{Dc})\right) +$$

$$K_{dc}\text{sign}(e_{DC})|e_{DC}|^{\frac{q}{p}}\ln(e_{DC})\frac{d}{dt}\left(\frac{q}{p}\right)\sigma_{Dc} -$$

$$K_3\sigma_Q^2 - K_4|\sigma_Q|^{\frac{q}{p}+1}\text{sign}(\sigma_Q) + K_{2Q}(e_Q)^{\frac{q}{p}}\ln(e_Q)\frac{d}{dt}\left(\frac{q}{p}\sigma_Q\right)$$

where $K_{dc}\text{sign}(e_{DC})|e_{DC}|^{\frac{q}{p}}\ln(e_{DC})\frac{d}{dt}\left(\frac{q}{p}\right)\sigma_{Dc}$ and $$K_{2Q}(e_Q)^{\frac{q}{p}}\ln(e_Q)\frac{d}{dt}\left(\frac{q}{p}\sigma_Q\right)$$

are negligible values. Therefore, the derivative of V is given by:

$$\dot{V} = \frac{1}{CV_{dc}L_i}\left(-K_1\sigma_{Dc}^2 - K_2|\sigma_{Dc}|^{\frac{q}{p}+1}\text{sign}(\sigma_{Dc})\right) -$$

$$K_3\sigma_Q^2 - K_4|\sigma_Q|^{\frac{q}{p}+1}\text{sign}(\sigma_Q) \leq 0$$

The derivative of the Lyapunov function becomes zero far from the limit. It assists to converge tracking errors at the sliding surface.

Convergence of the LYPSMC is explained herein. From equation (40), when tracking error is very close to the origin for convergence de urged convergence in finite time can be achieved, given by:

$$\frac{e_{\dot{D}C}}{K_{dc}|e_{DC}|^{\frac{q}{p}}\text{sign}(e_{DC})} = -1. \quad (53)$$

Applying the convergence limit in the integration results in:

$$\int_0^{\Delta e_{DC}} \frac{e_{\dot{D}C}}{K_{dc}|e_{DC}|^{\frac{q}{p}}\text{sign}(e_{DC})}\Delta e_{DC} = \int_0^{\Delta t_o} -1\partial t. \quad (54)$$

-continued $$\Delta t_o = \frac{e_{\dot{D}C}}{K_{dc}|e_{DC}|^{\frac{q}{p}}\text{sign}(e_{DC})}\Delta e_{DC}. \quad (55)$$

The FTSMC was simulated and the simulation is explained. The PV-based array, as well as IGBT-based VSC, are utilized in a MATLAB simulation. The datasheet of the PV module is provided in Table 2. The PV panel was operated at variable temperature and irradiance levels. The PSO algorithm was utilized to tune the SMC. The PSO algorithm drove the step size which is required by the P&O algorithm. The duty cycle of the DC-DC converter was driven by the PSO algorithm. At the final stage, the resistive load was powered by a DC-DC converter. Parameters of the PSO algorithm are initialized by simulation. Tables 3 and 4 provide a brief description of grid parameters and PSO parameters, respectively.

TABLE 3

Grid Parameters

| | |
|---|---|
| Switching frequency | 5 khz |
| DC link capacitor | 100 µF |
| Angular frequency (ω) | 314.15 rad/sec |
| Resistance $R_i$ (VSC to PCC) | 15 mΩ |
| Inductance $L_i$ (VSC to PCC) | 0.63 mH |
| $R_g$ (PCC to grid) | 10 mΩ |
| $L_g$ (PCC to grid) | 0.5 mH |
| Line to line voltages | 25 kV |
| System (grid) frequency | 60 Hz |
| Grid side load | 30 MW, 2 MVar |
| Non-linear load | 1.5 MW, 150 KVar |

TABLE 4

Description of PSO Parameters.

| Description | Parameters |
|---|---|
| Population size | 20 |
| Maximum iteration | 50 |
| $c_1$ | 2 |
| $c_2$ | 2 |

The gains of SMC are defined in Table 5.

TABLE 5

Gains of SMC

| Gains | Values |
|---|---|
| $K_a$ | 3.3823 |
| $K_b$ | −9.1374 |
| $K_c^*$ | 11.17730 |
| $K_d$ | −9.9481 |
| $K_e$ | 0.0165 |

Implementation of a PSO-based finite-time sliding mode controller was accomplished with a small population size. The population size refers to the number of candidate solutions (or individuals) in the population used in the Particle Swarm Optimization (PSO) algorithm. The population size represents the number of potential solutions being evaluated by the PSO algorithm to optimize the parameters of the sliding mode controller. The elements of the population set in the PSO algorithm typically consist of the candidate solutions, also known as particles. Each particle represents a potential solution in the search space, and the population set comprises all the particles being evaluated. The position and velocity of each particle are updated iteratively based on its own best-known position and the best-known position of the entire swarm ($g_{best}$), as well as the influence of random parameters and the cognitive and social components of the algorithm. In summary, the population size in the PSO algorithm represents the number of candidate solutions being evaluated, and the population set consists of these individual particles, each representing a potential solution in the search space.

Figure 10:
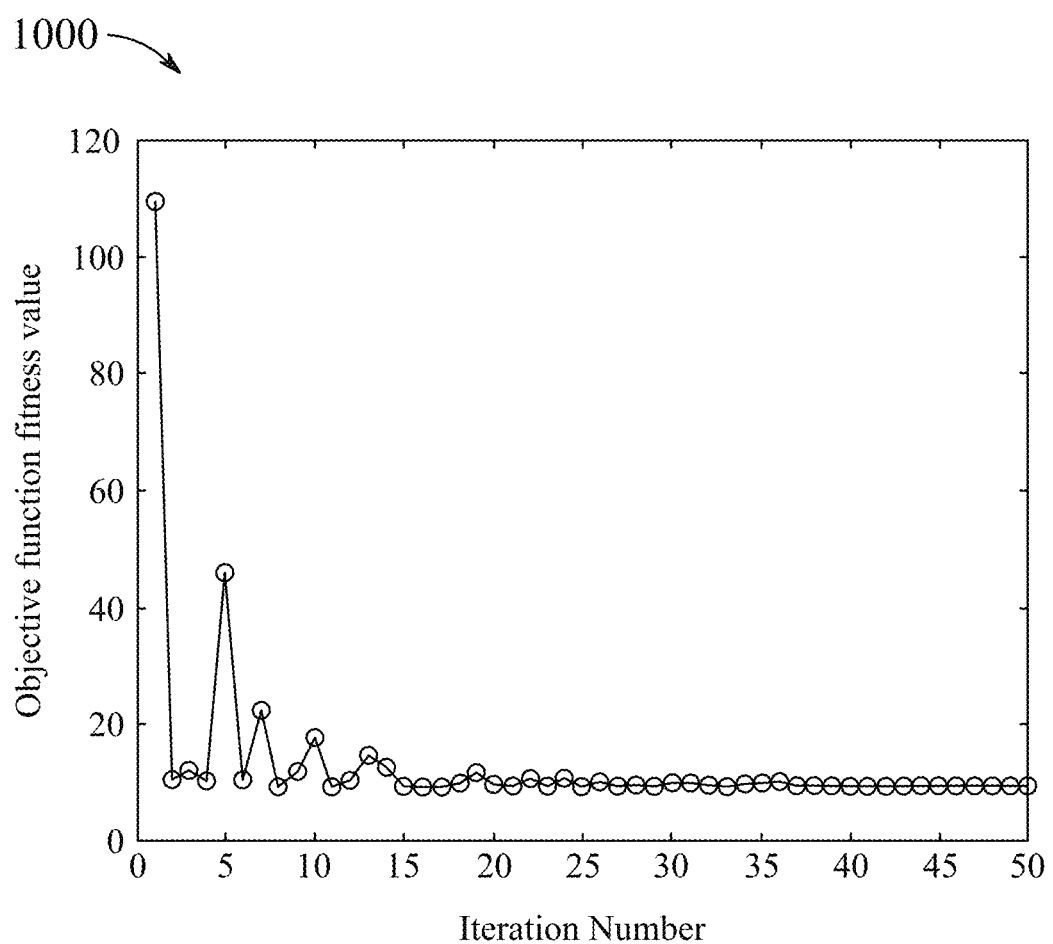
FIG. 10 shows an evolution of objective function fitness values, according to certain embodiments.

The initial population size was set to be 20 with a maximum of fifty generations (G=50). The objective function fitness value is displayed in FIG. 10 which shows that as iteration number increases, the objective function fitness value stabilizes. A nonlinear load of 1.5 MW, 150 KVAR (Kilovolt-Ampere Reactive) was used, which provided the DC link stabilization along with controller efficiency. It is clear from FIG. 10 that the convergence rate is very rapid, particularly above iteration 25. Furthermore, the analysis consists of two considerations:
1. Standard tests: These comprise three different cases of hard, middle, and soft insolation.
2. Robustness: This reflects the disclosed algorithm for three cases. (a) Variable irradiation level at a constant temperature. (b) Alteration in temperature with fixed traditional level. (c) Alteration in both temperature and irradiance level.

Standard Tests:
1. Hard insolation variation case: Quick variation in immense alteration in irradiance level (400 W/m$^2$).
2. Middle insolation variation case: Quick variation in immense alteration in irradiance level (200 W/m$^2$).
3. Soft variation case: Linear irradiation alteration.

Figure 11:
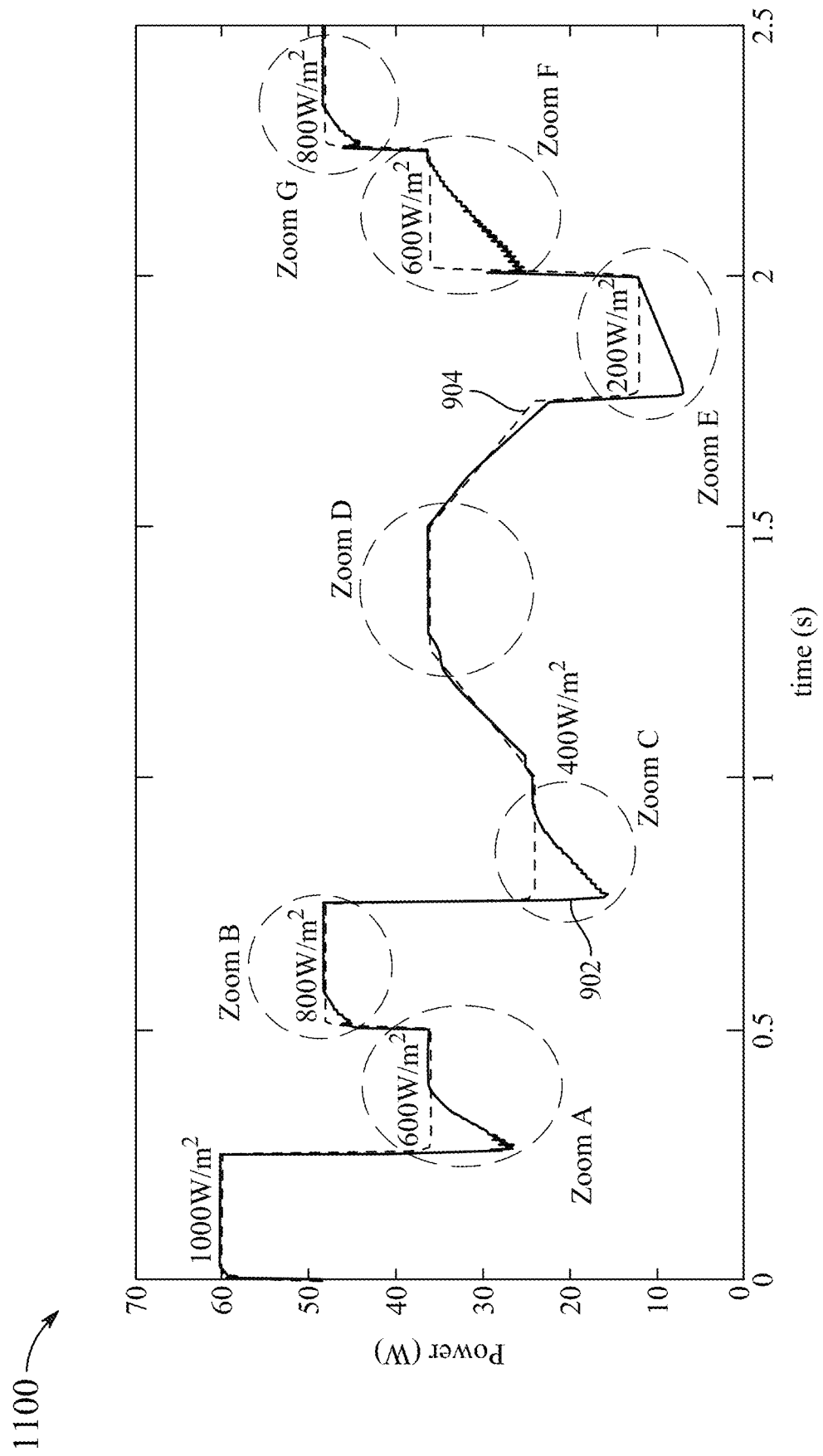
FIG. 11 shows the power evolution of P&O maximum power point tracking (MPPT) controllers and hard insolation at different points in time, according to certain embodiments.

After optimization of the controller gains (the K values), the controller was used in the online mode to drive the variable step size of the P&O MPPT algorithm. These tests included the standard tests and the robustness tests. In the standard tests, different case studies stimulated hard insolation, middle insolation, and soft insolation. Hard insolation variation is basically abrupt fast and large insolation variation (400 W/m$^2$), where middle insulation variation (200 W/m$^2$) and soft variation are linked with linear insulation variation (gradual and soft insulation, respectively). FIG. 11 displays various points of interest. Zoom point A, zoom point C, and zoom point F display overshoot (curve 1102 representing P&O, while curve 1104 represents PSO) caused by hard insulation level.

Figure 12:
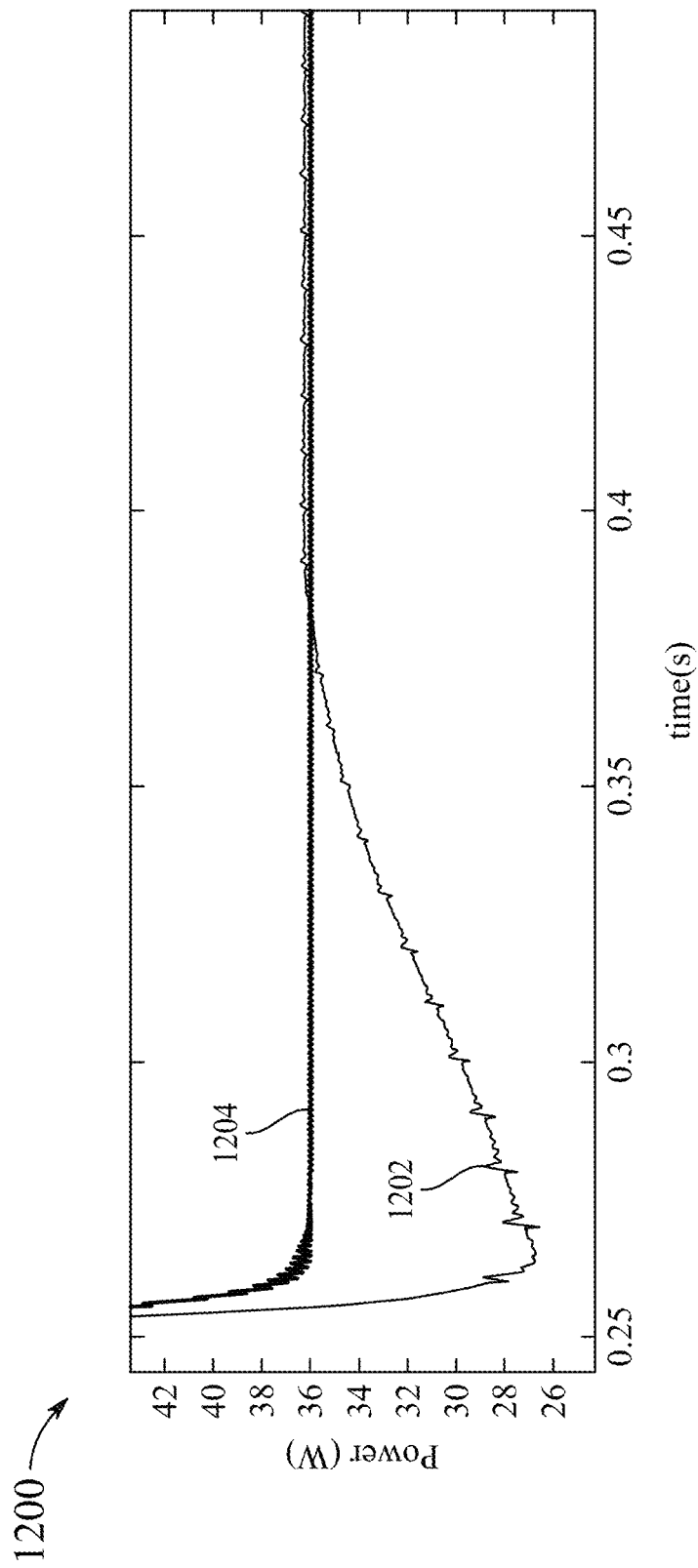
FIG. 12 shows a hard insolation case for zoom A, according to certain embodiments.

As shown in FIG. 12, zoom point A with curve 1204 represents P&O, while curve 1202 represents PSO, respectively.

Figure 13:
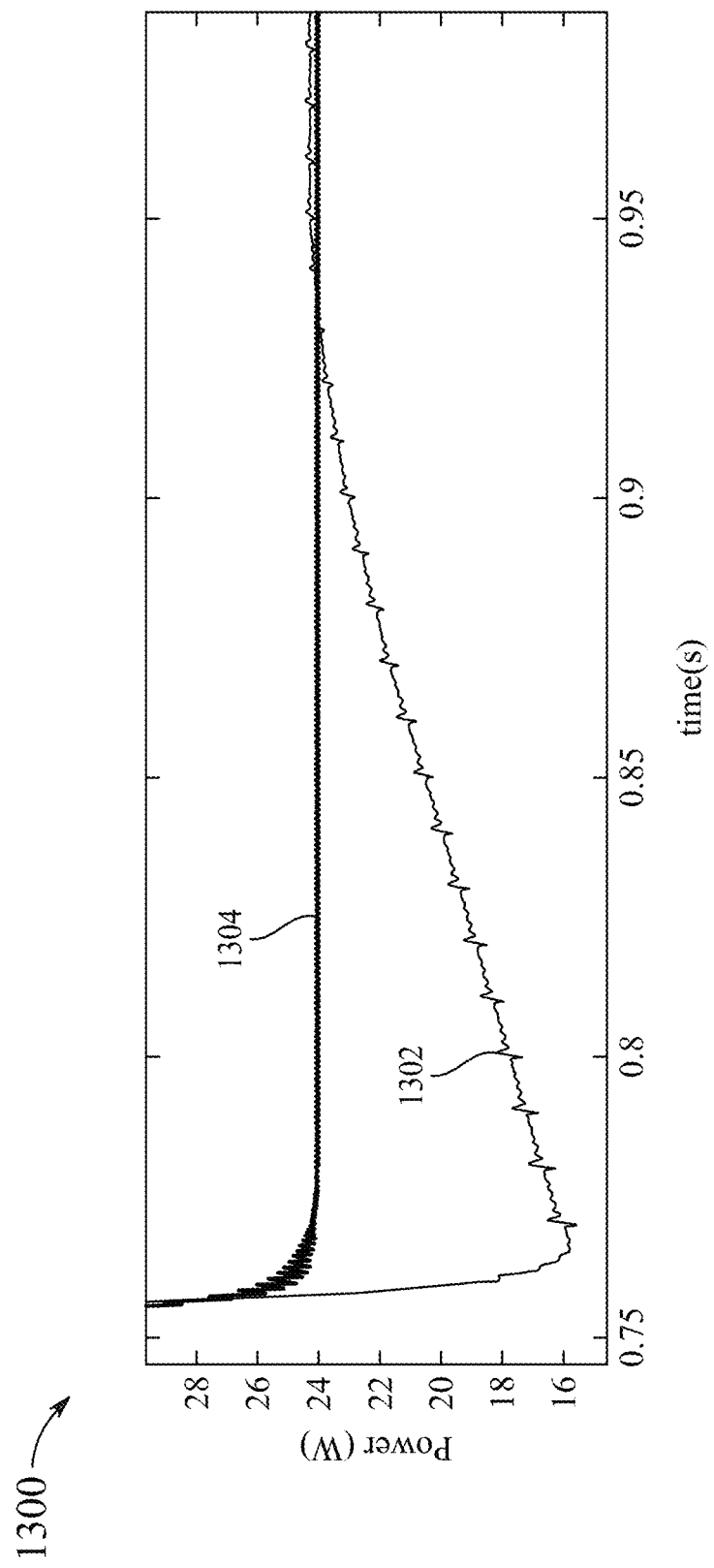
FIG. 13 shows a hard insolation case for zoom C, according to certain embodiments.
Figure 14:
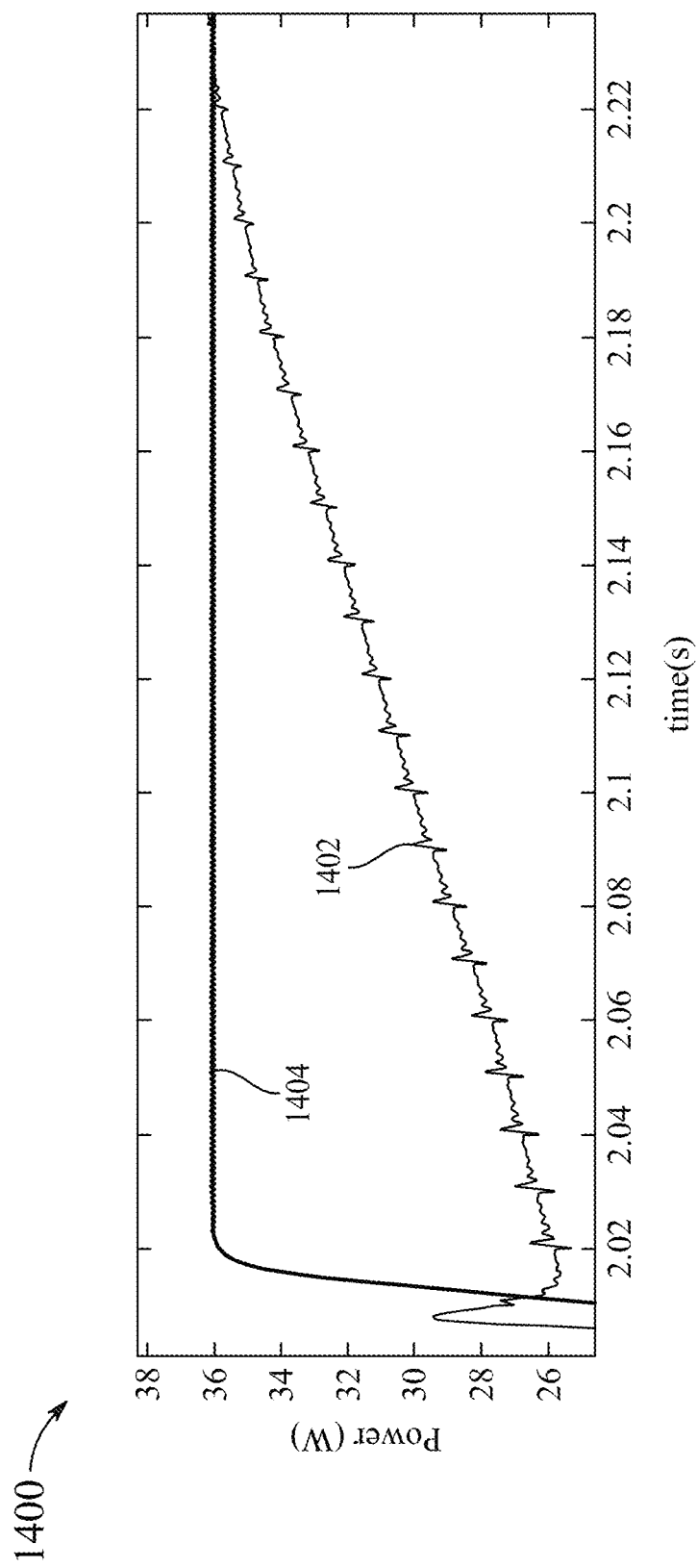
FIG. 14 shows a hard insolation case for zoom F, according to certain embodiments.

FIG. 13 shows zoom point C with curve 1302 representing P&O, while curve 1304 represents PSO caused by hard insulation. FIG. 14 shows zoom point F with curve 1402 representing P&O, while curve 1404 represents PSO caused by hard insulation.

Figure 15:
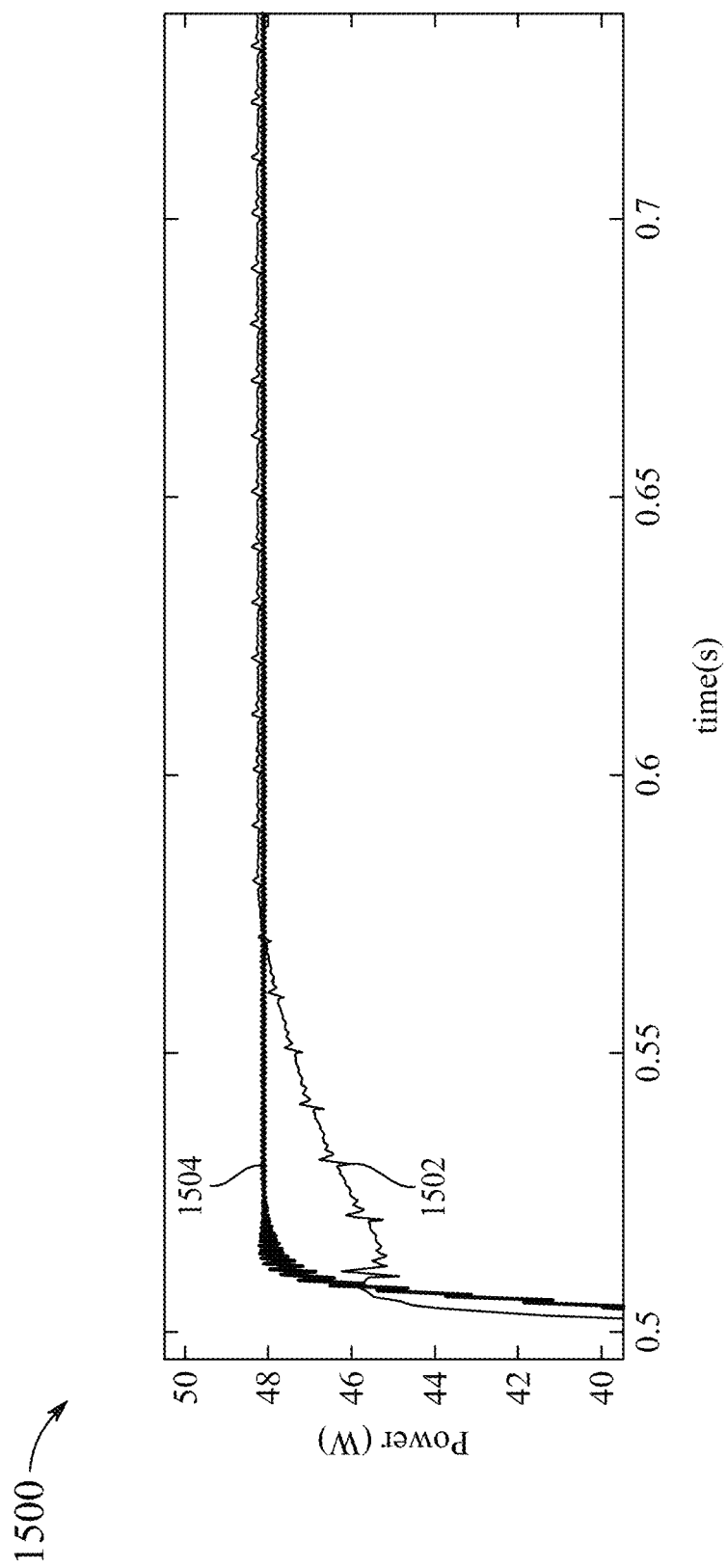
FIG. 15 shows a middle insolation case for zoom B, according to certain embodiments.

Zoom point B, zoom point E, and zoom point G show medium insulation which is also presented in FIG. 15 (zoom point B with curve 1502 representing P&O, while curve 1504 represents PSO).

Figure 16:
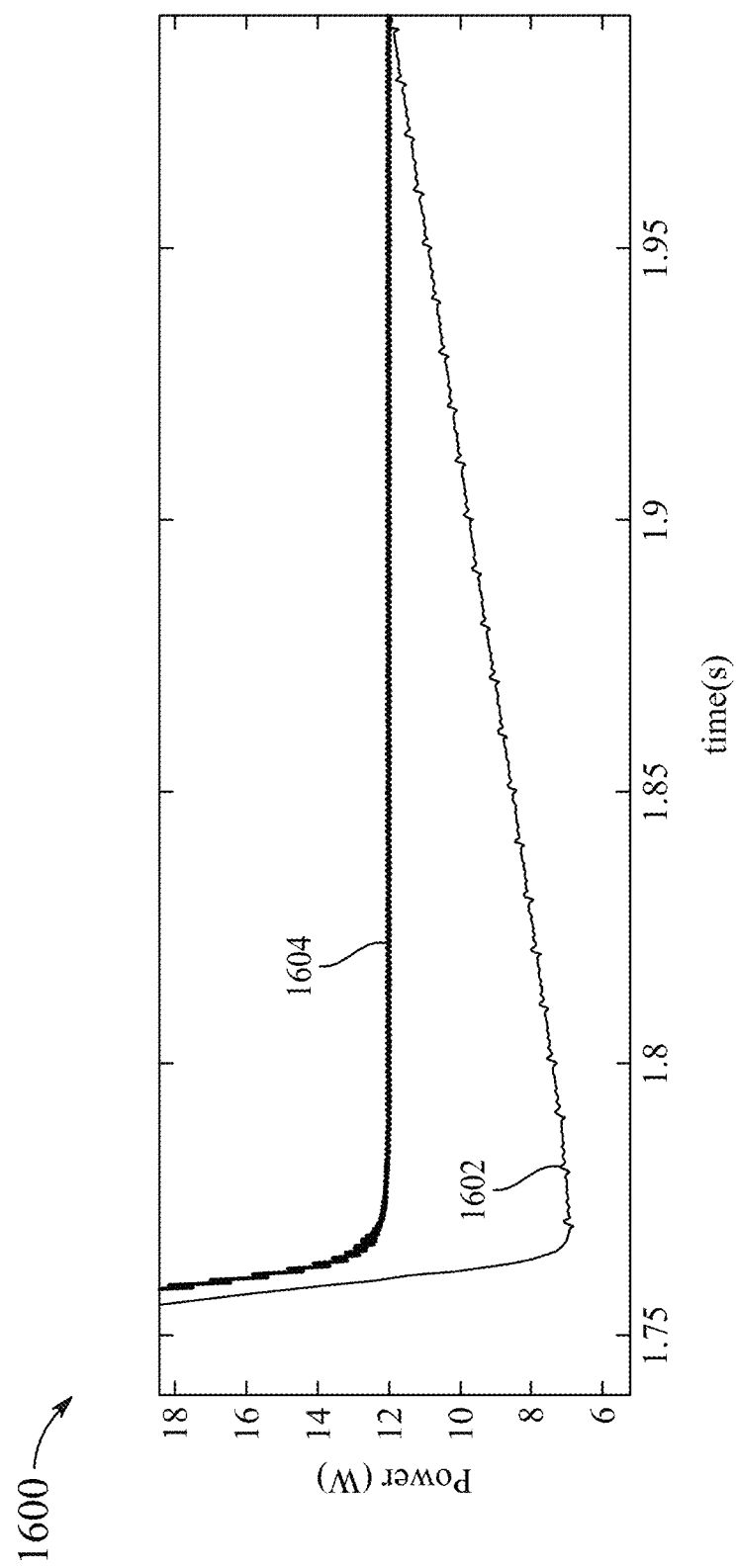
FIG. 16 shows a middle insolation case for zoom E, according to certain embodiments.
Figure 17:
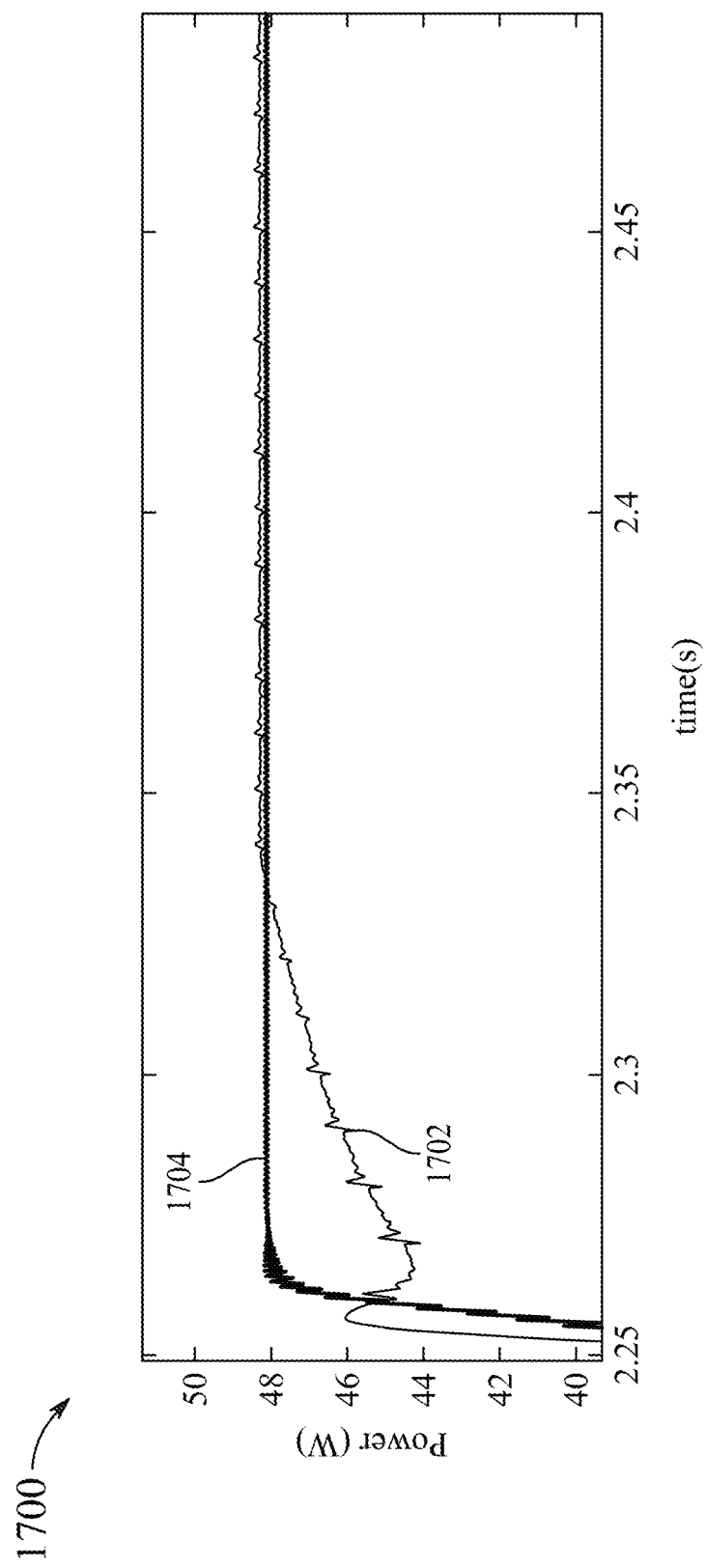
FIG. 17 shows a middle insolation case for zoom G, according to certain embodiments.
Figure 18:
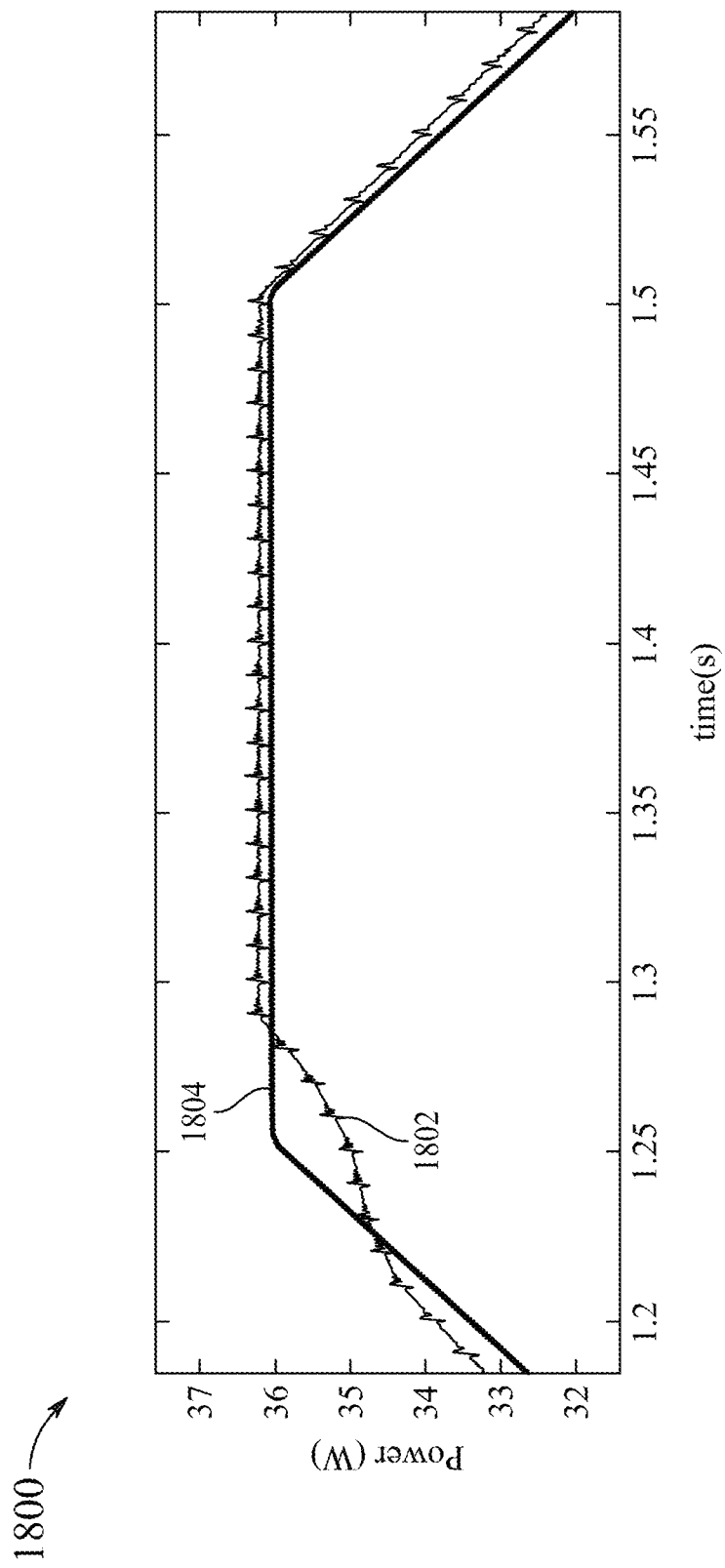
FIG. 18 shows a soft insolation case for zoom D, according to certain embodiments.
Figure 19A:
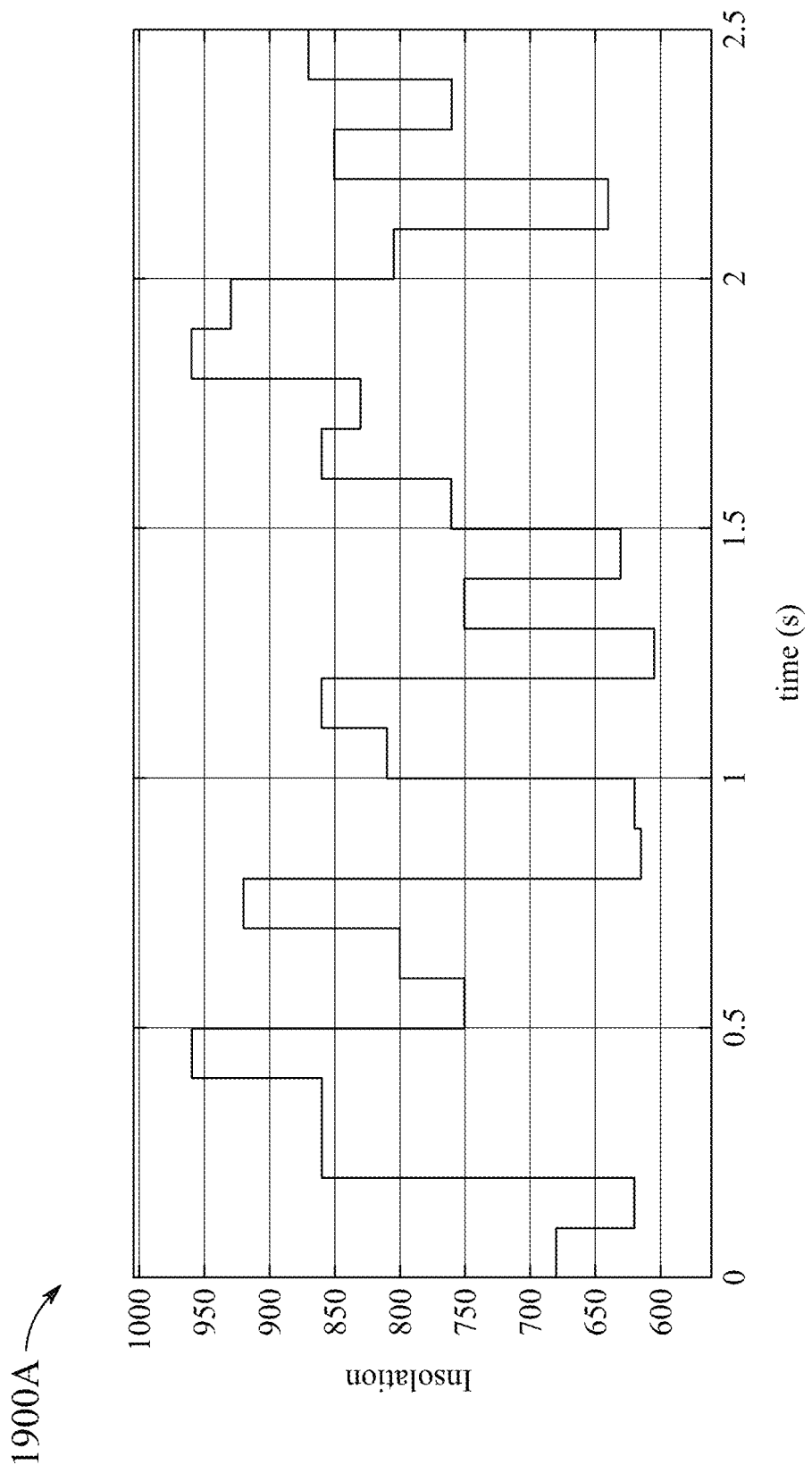
FIG. 19A shows the robustness of the FTSMC during a change in temperature, according to certain embodiments.
Figure 19B:
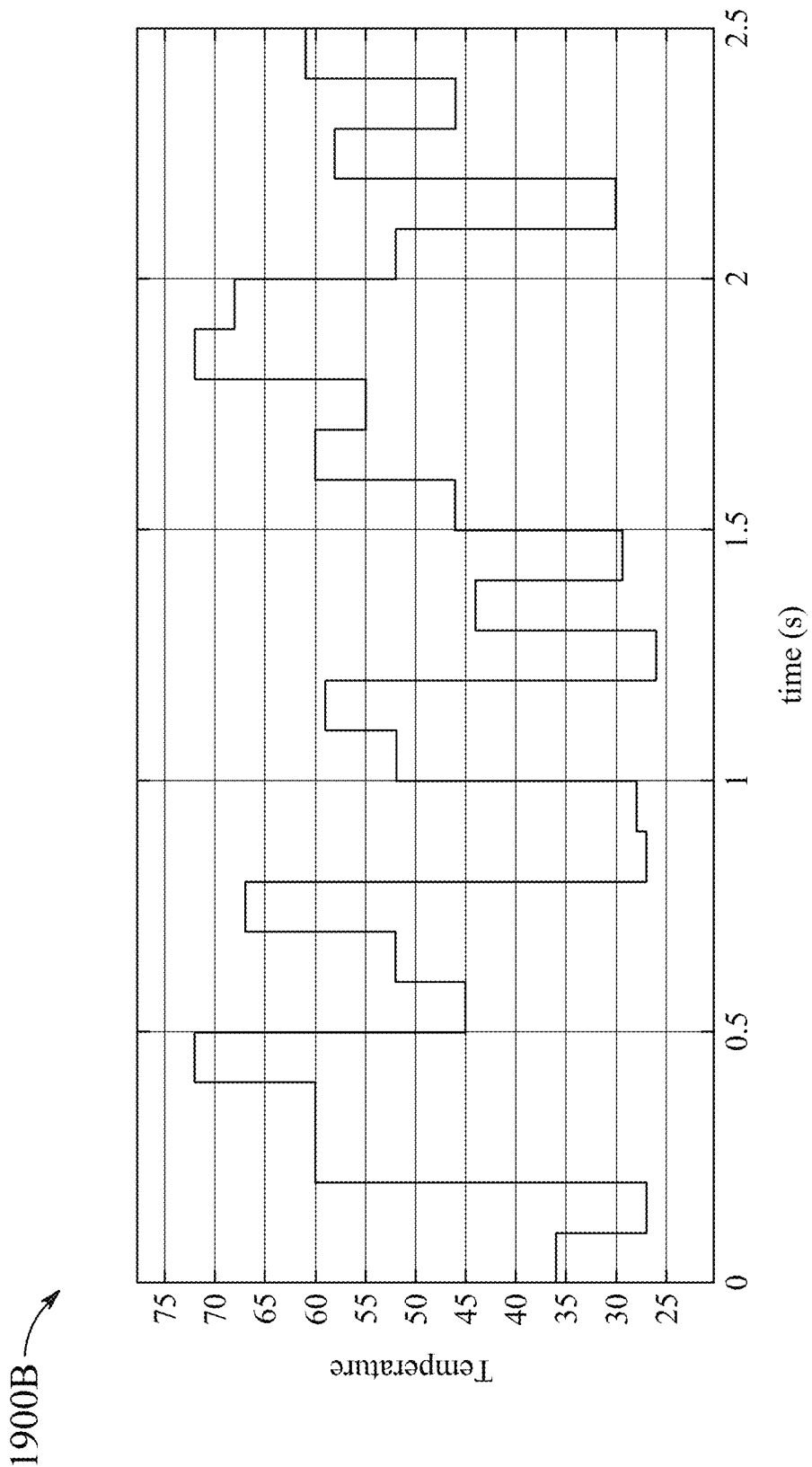
FIG. 19B shows the robustness of the FTSMC during a change in insolation level, according to certain embodiments.

FIG. 16 shows zoom point E with curve 1602 representing P&O control, while curve 1604 represents PSO control and FIG. 17 shows zoom point G with curve 1702 representing P&O control, while curve 1704 represents PSO control, respectively. Zoom point D depicts soft insolation variation (also shown in FIG. 18, zoom point D with curve 1802 representing P&O control, while curve 1804 represents PSO control).

Case of hard insolation: In this case, the irradiance level fluctuated (around 400 W/m$^2$) and caused a negligible change in power (between 0.09 W to 0.28 W) for the SMC based controller. whereas the classical controller (which follows the conventional P&O algorithm) showed a significant change in power (from 8.31 W to 11.73 W). The FTSMC controller of the present disclosure reflects a significant improvement in terms of response time under a rapid change in atmospheric conditions (between 40 ms and 50 ms) against (between 133 ms and 221 ms) for P & O MPPT control. Moreover, no ripple or oscillations were generated around the MPP while the conventional controller showed oscillation between 0.029 to 0.27 W. As a result of hard insolation variation, the change in power is minimal in the case of the PSO-SMC. The FTSMC controller shows notable improvement in response time during the change in atmospheric conditions. It also manifested consistent steady-state operation with zero oscillation around the maximum power point as compared to classical perturb and observe algorithms at 0.06 to 0.1 W.

Case of middle insolation: middle insolation is higher or lower than 200 w/m$^2$. Variation in power manifests from 0.006 to 0.11. Results shown in FIG. 19A, FIG. 19B, FIG. 20 and FIG. 24 reflect a major improvement in the response time of the FTSMC of the disclosure. This controller also displayed no ripple in steady state error while the conventional controller oscillates around 0.1 W.

Case of soft insolation: Based on the observations shown in FIG. 18, the variation in soft insolation shows no ripple in a steady state. It also manifests the properties of low response time as well as low overshoot. The FTSMC reflects an overshoot of 1.43 W with a response time of 38 ms with a ripple around 0.16 W. Therefore, based on the results shown in FIG. 11-FIG. 18 using particular insolation variation schemes (hard, middle, and soft), it can be observed that the presented PSO-SMC variable step size P&O MPPT controller demonstrates good performance with low overshoot, low response time, and no ripple in the steady state compared with the conventional fixed step size. Table 6 presents the important points by summarizing the standard tests in tabular form and Table 7 depicts the comparison of both algorithms.

TABLE 6

Standard Test Results

| Insolation Variation | Point | Response Time | | Overshoot | | Ripple | |
|---|---|---|---|---|---|---|---|
| | | P&O | PSOSMC | P&O | PSOSMC | P&O | PSOSMC |
| Hard | A | 133 | 41 | 10.36 | 0.28 | 0.11 | No |
| | C | 197 | 52 | 8.73 | 0.24 | 0.06 | No |
| | F | 221 | 41 | 11.73 | 0.28 | 0.08 | No |
| Middle | B | 72.8 | 31 | 3.72 | 0.11 | 0.16 | No |
| | E | 234 | 52 | 5.34 | 0.09 | 0.17 | No |
| | G | 83.2 | 49 | 4.67 | 0.11 | 0.16 | No |
| Soft | D | 39 | 0 | 1.43 | 0 | 0.16 | No |

TABLE 7

Performance comparison of both algorithms

| | |
|---|---|
| Hard Insulation Variation | P&O/PSOSMC Performances at point A:<br>Response time: $\dfrac{133}{40\,(ms)}$<br><br>Overshoot: 10.35/0.28 (W)<br><br>Ripple: $\dfrac{0.11}{0\,(W)}$<br><br>P&O/PSOSMC Performances at point C:<br>Response time: $\dfrac{197}{52\,(ms)}$<br><br>Overshoot: $\dfrac{8.73}{0.24\,(W)}$<br><br>Ripple: $\dfrac{0.06}{0\,(W)}$<br><br>P&O/PSOSMC Performance at point F:<br>Response time: $\dfrac{221}{41\,(ms)}$<br><br>Overshoot: $\dfrac{11.73}{0.28\,(W)}$<br><br>Ripple: $\dfrac{0.08}{0\,(W)}$ |
| Middle Insulation Variation | P&O/PSOSMC Performance at point B:<br>Response time: $\dfrac{72.8}{31\,(ms)}$<br><br>Overshoot: $\dfrac{3.72}{0.11\,(W)}$<br><br>Ripple: $\dfrac{0.16}{0\,(W)}$<br><br>P&O/PSOSMC Performance at Point E:<br>Response time: $\dfrac{234}{52\,(ms)}$<br><br>Overshoot: $\dfrac{5.34}{0.09\,(W)}$<br><br>Ripple: $\dfrac{0.17}{0\,(W)}$<br><br>P&O/PSOSMC Performance at Point G<br>Response time: $\dfrac{83.2}{49\,(ms)}$<br><br>Overshoot: 4.67/0.11 (W)<br><br>Ripple: $\dfrac{0.16}{0\,(W)}$ |
| Soft Insulation Variation | P&O/PSOSMC Performance at point D<br>Response time: $\dfrac{39}{0(ms)}$<br><br>Overshoot: $\dfrac{1.43}{0(W)}$<br><br>Ripple: 0.16/0 (W) |
| Summed-up betterments | Response time: <53 ms) instead of 39-234 (ms)<br>Overshoot: <0.29(W) instead of 3.72-11.73 (W)<br>Ripples: 0 instead of 0.06-0.17(W) |

Figure 20:
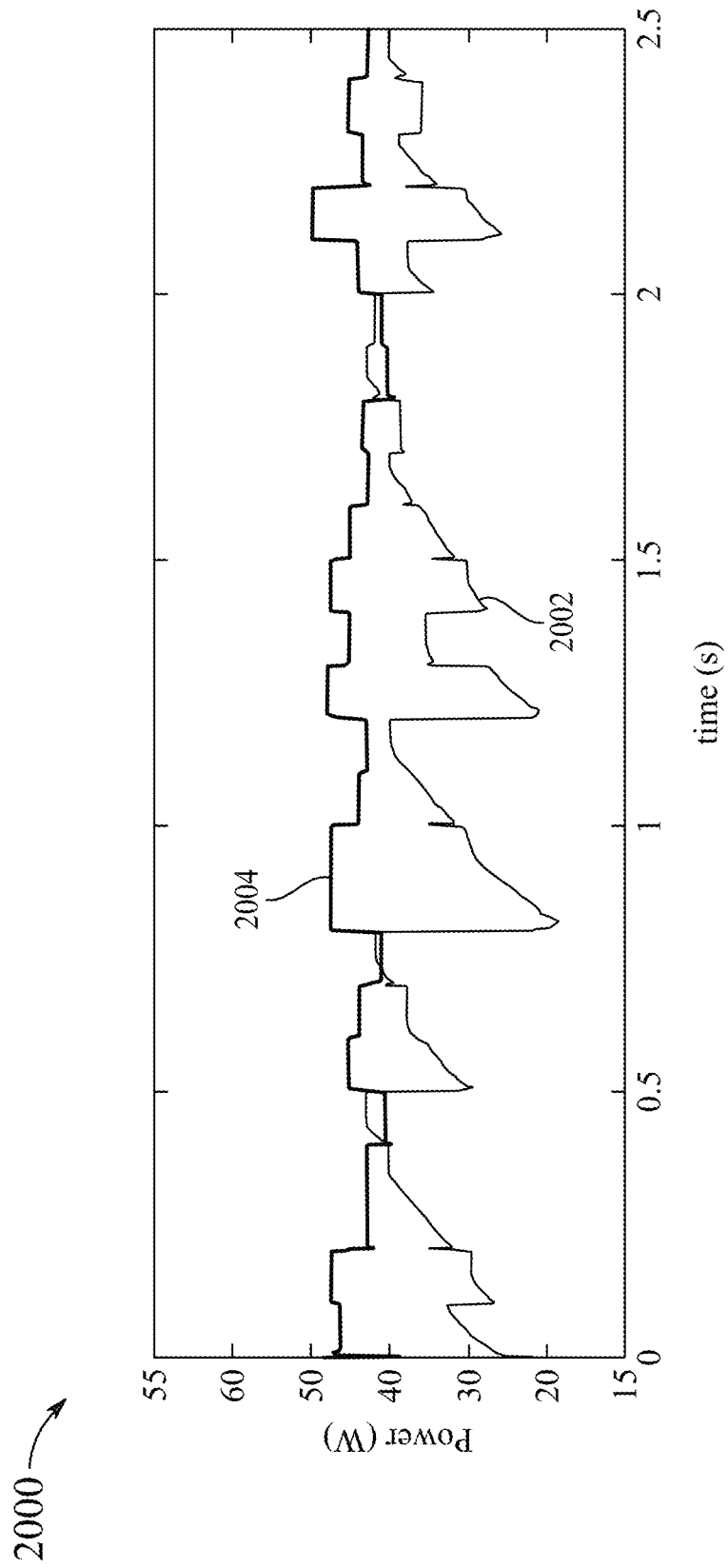
FIG. 20 shows the robustness of the FTSMC during changes in temperature and insolation level, according to certain embodiments.
Figure 21:
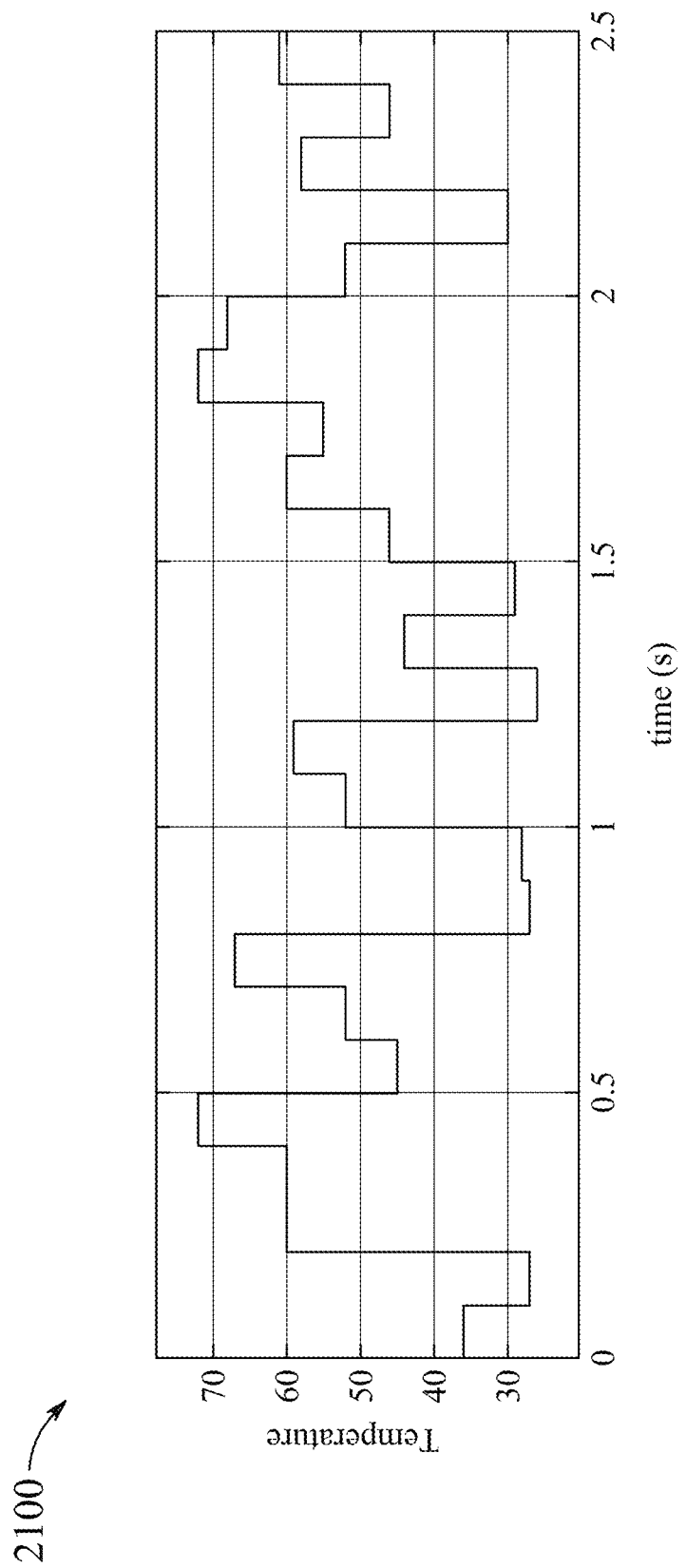
FIG. 21 shows the robustness of the FTSMC at random insolation, according to certain embodiments.
Figure 22:
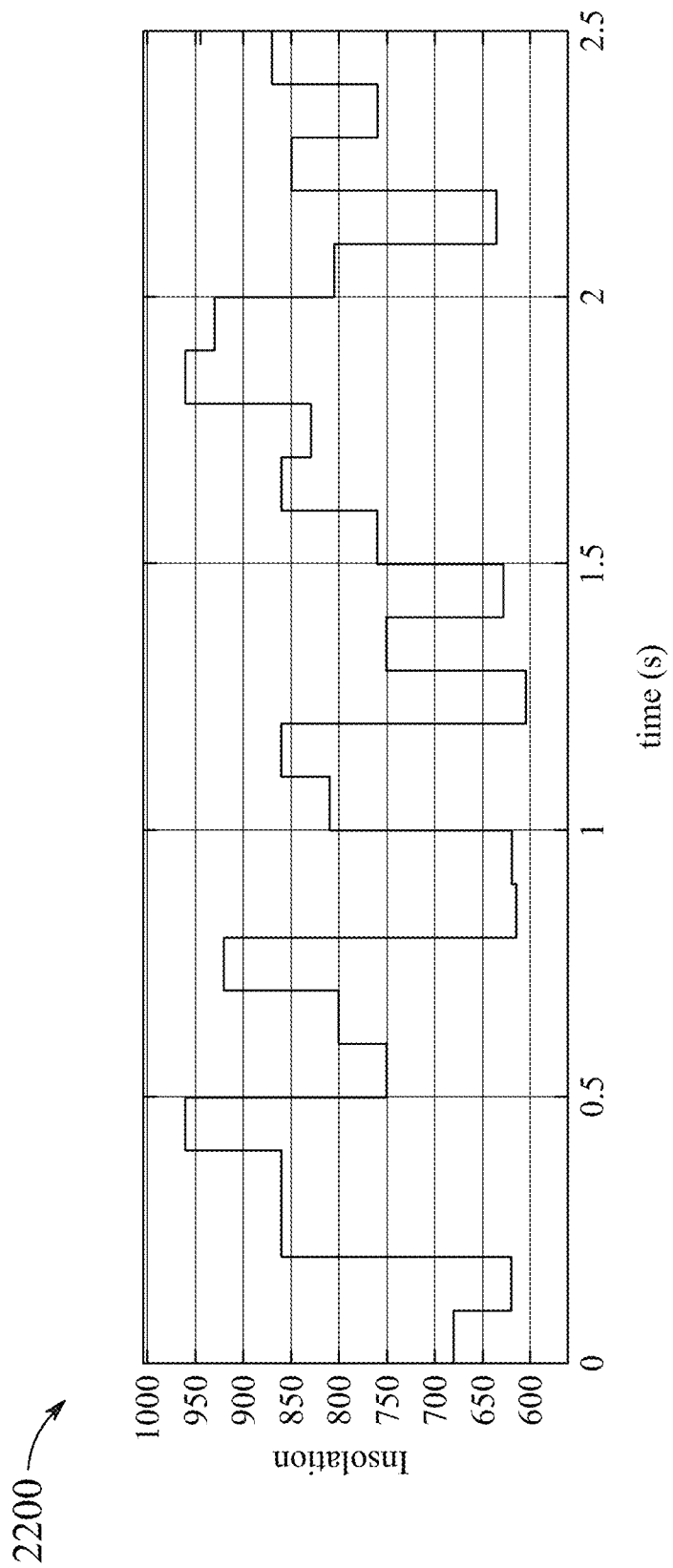
FIG. 22 shows the robustness of the FTSMC during at random temperatures, according to certain embodiments.
Figure 23:
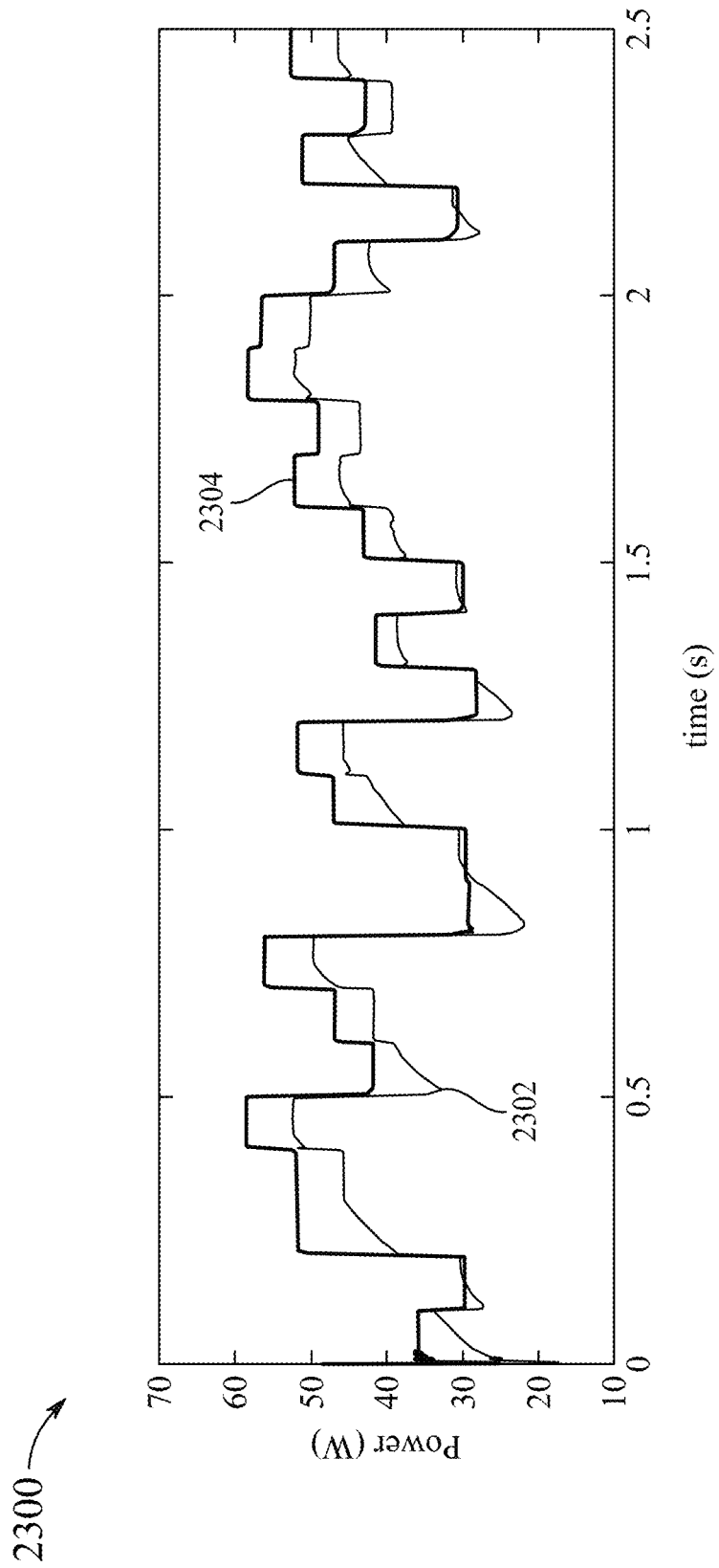
FIG. 23 shows the robustness of the FTSMC during at a fixed insolation and varying temperature, according to certain embodiments.
Figure 24:
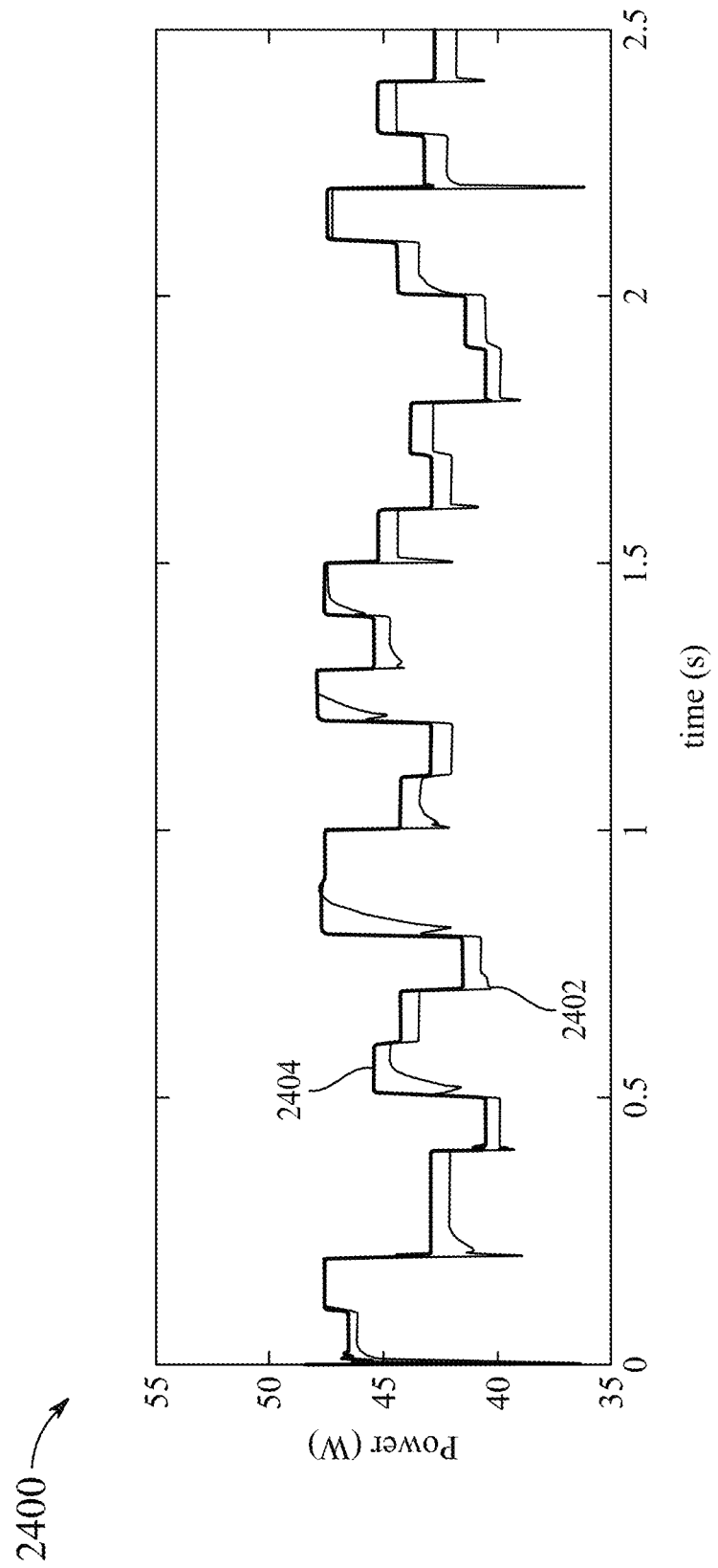
FIG. 24 shows the robustness of the FTSMC during at fixed temperature and varying insolation, according to certain embodiments.
Figure 25:
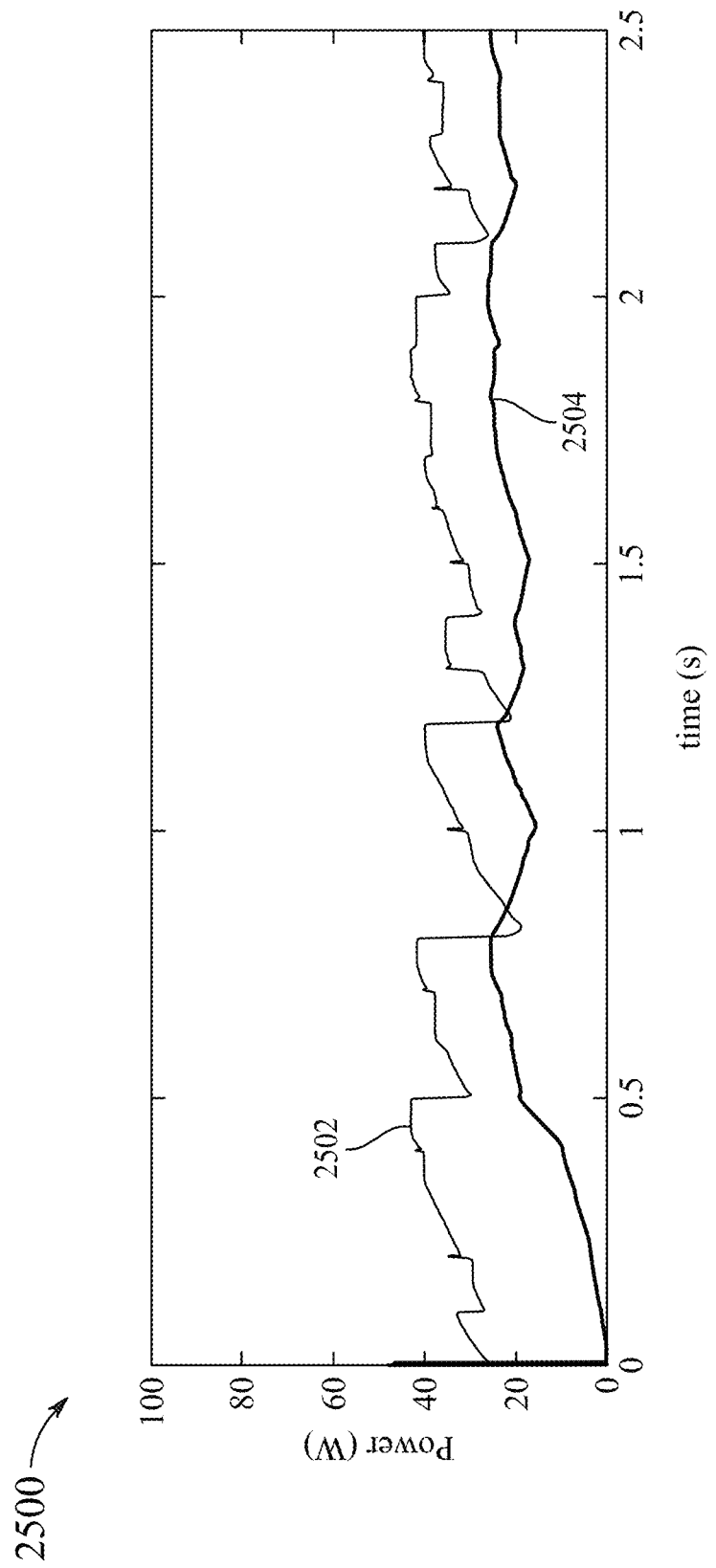
FIG. 25 shows the robustness of the FTSMC during at varying temperature and varying insolation, according to certain embodiments.

The robustness of the controller was tested by varying the temperature (FIG. 19A) or insolation level (FIG. 19B) individually. Variation can also be performed by varying the temperature and insolation level. (a) The irradiance level was varied with the temperature kept constant at about 25°. (b) Variation in temperature with fixed irradiance level of 800 W/m². (c) Variation in both temperature as well as irradiance level. FIG. 24 (curve 2402 represents the P&O, while curve 2404 represents the PSO) and FIG. 23 (curve 2302 represents the P&O, while curve 2304 represents the PSO) shows the results obtained by the FTSMC with the variation of temperature (at fixed irradiance) and irradiance (at fixed temperature) respectively. FIGS. 21 and FIG. 22 shows the abrupt change in temperature and insolation at the same time. In addition, a comparison analysis was performed with a conventional P&O MPPT in FIG. 20. FIG. 25 shows robustness test varying insolation where temperature curve 2502 represents the P&O, while curve 2504 represents the PSO. The FTSMC depicts a variable step size which reflects notable advancement in an interval of settling time relative to settling time when varying weather conditions. The FTSMC shows precise tracking around the MPP point. Test results show:
 1. Beneficial return to steady state following an overshoot or ripple.
 2. Advanced response time.
 3. Matches the maximum power point under a change in atmospheric condition.
 4. Depletion in power loss.

Comparison of PSO based FTSMC control of the present disclosure with other existing controls:

The PSO-based sliding mode controller was examined under rapidly changing atmospheric conditions. A bio-inspired PSO algorithm was used to define a design of the SMC that drives the variable step size of the MPPT algorithm, initially in offline mode. Online testing was then conducted on the optimized SMC. The PSO-SMC variable step size P&O MPPT-based algorithm, as well as the conventional fixed step size P&O MPPT algorithm, were simulated using the Matlab/Simulink model, in which different parameters have been implemented. The simulation results demonstrated that the PSOSMC variable step size P&O MPPT algorithm outperforms the conventional P&O MPPT algorithm in terms of accuracy, rapidity, ripple, and overshoot. There were two types of simulation results: standard tests and robustness tests. A variety of insolation variations were used for the standard tests to obtain results. A comparison was made between the output results of the algorithm and the output results of the P&O algorithm with a fixed step size. A set of parameters was used to extract the data, which is listed in Table 1-Table 5. The results were obtained as shown in Table 6 which summarizes the improvements in both transient and steady-state responses confirming that the controller of the present disclosure outperforms the conventional P&O MPPT regarding all considered performance metrics (response time: <54 ms instead of 39-234 ms; overshoot: <0.29 W instead of 3.72-11.73 W; a ripple of 0 instead of 0.06-0.17 W). In order to demonstrate the robustness and reliability of the control system of the present disclosure, the ability to track the MPP point was tested under changing atmospheric conditions: insolation of 800 W per square meter at random temperature (FIG. 24); random insolation at a fixed temperature 25° (FIG. 23); variation in both insolation and temperature at random (FIG. 19-20). As illustrated in FIG. 21-FIG. 22, the control system of the present disclosure shows comparable results to P&O MPPT. The PSO-SMC variable step size P&O control exhibited a significant improvement in the time interval corresponding to rapidly changing atmospheric conditions, significantly reducing oscillations around the maximum power point. According to the results of the standard and robustness tests, the FTSMC control system of the present disclosure has a faster converging speed, less overshoot, no oscillation around the MPP under steady-state conditions, and no divergence from the MPP under fast varying atmospheric conditions, resulting in an overall reduction in energy losses.

The PSO and finite time sliding mode for mitigating the effect of fast varying weather conditions on renewable-based grids was described. Various modes of analysis are available for the controller, both online and offline. A MATLAB/Simulink model was used to simulate the FTSMC and the classical controller in order to illustrate their comparative efficacy. A comparative analysis was performed using standard and robustness tests. The standard test consisted of hard, middle, and soft insolation. For the robustness test, random changes in weather conditions were taken into account. In this test, the performance of the controller was evaluated based on overshoot and oscillation around the maximum power point. Observations of steady state and transient responses confirmed the outperformances on response time, overshoot, accuracy, and swiftness. The results compiled in the table reflected that response time of the FTSMC reduced to around 52 milliseconds rather than 38-234 millisecond of a conventional MPPT controller. During abrupt atmospheric changes, the controller of the present disclosure exhibited less overshoot with convergence speed and no divergence around MPP. A reduction in energy losses was also achieved. Hardware-in-loop validation on an experimental platform validated PSO-FTSMC.

The first embodiment is illustrated with respect to FIG. 1A-FIG. 22. A finite-time sliding mode maximum power point tracking (MPPT) control system for a photovoltaic (PV) array is disclosed. The finite-time sliding mode MPPT control system includes a PV array 202 having a positive terminal and a negative terminal, wherein the photovoltaic array is configured to generate a current $I_{pv}$ at the positive terminal, a boost converter 204 including a first capacitor 252 in parallel with the PV array 202 and an inductor having a first end connected to the positive terminal, a metal oxide silicon field effect transistor (MOSFET 206) having a source terminal connected to a second end of the inductor and a drain terminal connected to the negative terminal, wherein a body terminal of the MOSFET 206 is configured to generate a DC voltage $V_{dc}$ when the MOSFET 206 is switched ON, a pulse width modulator (PWM) 208 connected to receive the current $I_{PV}$ and a voltage across the first capacitor 252 at a set of PWM input terminals, wherein the PWM includes a PWM processor configured to execute a perturb and observe (P&O) algorithm and generate a maximum power point signal at a PWM output terminal, wherein the PWM output terminal is connected to a gate of the MOSFET 206, wherein the a maximum power point signal is configured to modulate the DC voltage $V_{dc}$ according to a duty cycle D defined by the P&O algorithm, a second capacitor 210 in parallel with the MOSFET 206, wherein the second capacitor 210 is configured to charge during a positive phase of the duty cycle D to the voltage $V_{dc}$ and discharge during a negative phase of the duty cycle D, an inverter 212 in parallel with the second capacitor 210, wherein the inverter 212 is configured to generate three phase voltage signals, a point of common coupling (PCC 214) connected to the inverter 212 to receive the three phase voltage signals, an electrical grid 216 connected to the PCC 214, wherein the electrical grid 216 is configured to convert the three phase voltage signals to three phase current signals and calculate three phase voltage error signals by subtracting a grid voltage at each phase from a reference voltage signal, a first direct to quadrature transformer 218 configured to receive the three phase current signals and convert the three phase current signals to direct current signals and quadrature current signals, a second direct to quadrature transformer 218 configured to receive the three phase voltage error signals and convert the three phase voltage error signals to direct voltage error signals and quadrature voltage error signals, a DC voltage controller 222 configured to receive the direct current signals, the quadrature current signals, the direct voltage error signals and the quadrature voltage error signals and generate a direct power control signal $U_d$, a finite time sliding mode controller (FTSMC 226) having at a set of FTSMC 226 input terminals configured to receive the current $I_{PV}$ and a voltage across the second capacitor 210 and generate a reactive power control signal $U_q$, wherein the FTSMC 226 includes a memory having program instructions for performing a particle swarm optimization and at least one FTSMC processor configured to execute the particle swarm optimization to determine optimum gain parameters of the FTSMC 226 during an offline mode 650 of the FTSMC 226 and to apply the optimum gain parameters to the FTSMC 226 to generate the reactive power control 224 signal $U_q$ during an online mode 660, and a voltage source controller 227 configured to receive the reactive power control signal $U_q$ and the direct power control signal $U_d$ and generate a set of timing signals configured to operate the inverter, The finite-time sliding mode MPPT control system is configured to minimize the voltage error signals for each phase.

In one aspect, the inverter includes a first NPN bipolar transistor 230 connected at a collector terminal to the positive terminal of the second capacitor 210 and at an emitter terminal to a collector terminal of a second NPN bipolar transistor 228, wherein an emitter terminal of the second NPN bipolar transistor 228 is connected to the negative terminal, wherein a base terminal of the first NPN bipolar transistor 230 and a base terminal of the second NPN bipolar transistor 228 are connected to receive a first timing signal of the set of timing signals, a third NPN bipolar transistor 234 connected at a collector terminal to a positive terminal of the second capacitor 210 and at an emitter terminal to a collector terminal of a fourth NPN bipolar transistor 232, wherein an emitter terminal of the fourth NPN bipolar transistor 232 is connected to the negative terminal, wherein a base terminal of the third NPN bipolar transistor 234 and a base terminal of the fourth NPN bipolar transistor 232 are connected to receive a second timing signal of the set of timing signals, and a fifth NPN bipolar transistor 238 connected at a collector terminal to the positive terminal of the second capacitor 210 and at an emitter terminal to a collector terminal of a sixth NPN bipolar transistor 236, wherein an emitter terminal of the sixth NPN bipolar transistor 236 is connected to the negative terminal, wherein a base terminal of the fifth NPN bipolar transistor 238 and a base terminal of the sixth NPN bipolar transistor 236 are connected to receive a third timing signal of the set of timing signals, wherein each of the first NPN bipolar transistor 230, the second NPN bipolar transistor 228, the third NPN bipolar transistor 234, the fourth NPN bipolar transistor 232, the fifth NPN bipolar transistor 238 and the sixth NPN bipolar transistor 236 includes a reverse biased diode connected between its collector terminal and emitter terminal.

In one aspect, the finite-time sliding mode MPPT control system includes a first phase inverter output transmission line 242 including a first output inductor in series with a first output resistor, wherein the first phase inverter output transmission line 242 is connected between the emitter terminal of the first NPN bipolar transistor 230 and the collector terminal of the second NPN bipolar transistor 228, wherein the first phase inverter output transmission line 242 is connected to a first phase port of the PCC, a second phase inverter output transmission line 240 including a second output inductor in series with a second output resistor, wherein the second phase inverter output transmission line 240 is connected between the emitter terminal of the third NPN bipolar transistor 234 and the collector terminal of the fourth NPN bipolar transistor 232, wherein the second phase inverter output transmission line 240 is connected to a second phase port of the PCC 214, and a third phase inverter output transmission line 244 including a third output inductor with a third output resistor, wherein the third phase inverter output transmission line 244 is connected between the emitter terminal of the fifth NPN bipolar transistor 238 and the collector terminal of the sixth NPN bipolar transistor 236, wherein the third phase inverter output transmission line 244 is connected to a third phase port of the PCC.

In one aspect, the electrical grid 216 further includes a first phase grid transmission line 246 connected to the first phase port of the PCC, wherein the first phase grid transmission line 246 includes a first grid inductor in series with a first grid resistor, wherein the first phase grid voltage is a voltage across the first grid resistor, a second phase grid transmission line 248 connected to the second phase port of the PCC 214, wherein the second phase grid transmission line 248 includes a second grid inductor in series with a second grid resistor, wherein the second phase grid voltage is a voltage across the second grid resistor, and a third phase grid transmission line 250 connected to the third phase port of the PCC 214, wherein the third phase grid transmission line 250 includes a third grid inductor in series with a third grid resistor, wherein the third phase grid voltage is a voltage across the third grid resistor.

In one aspect, the FTSMC 226 is configured in offline mode to generate a plurality of potential sets of gain parameters of the FTSMC 226, initialize the plurality of sets of potential gain parameters as a population of the particle swarm optimization algorithm, optimize each of the sets of potential gain parameters using the particle swarm optimization algorithm, evaluate an integrated absolute error (IAE) function for each optimized set of potential gain parameters based on the difference between the voltage across the second capacitor 210 and the grid voltage, determine the optimized set of potential gain parameters which generates the smallest IAE, and store, in the memory of the FTSMC 226, the optimized set of potential gain parameters which generates the smallest IAE as the optimized gain parameters of the FTSMC 226.

In one aspect, the optimized gain parameters are characterized as the set $\{K_a, K_b, K_c, K_d, K_e\}$, where $K_a$ equals the gain of a discrepancy in the current, $K_b$ equals the gain of a discrepancy in the voltage, $K_c$ equals a gain of a perturbation of the current $I_{pv}$ output by the PV array 202, $K_d$ equals a gain of a sliding surface x, and $K_e$ equals a gain of a sign of a first order sliding mode control o.

In one aspect, the sliding mode surface x is defined by: $x=K_a \cdot dI+K_b \cdot dV+K_c \cdot perturbation$.

In one aspect, the first order sliding mode control σ is characterized by: $\sigma=dx/dt+K_d \cdot x$.

In one aspect, the duty cycle D is characterized by: $D=K_e \cdot sgn(\sigma)$.

In one aspect, the FTSMC 226 is configured in online mode to update the gain parameters of the FTSMC 226 with the optimized gain parameters.

In one aspect, the PWM processor is configured to modulate the duty cycle D with a variable step size defined by the P&O algorithm.

The second embodiment is illustrated with respect to FIG. 1-FIG. 22. A finite-time sliding mode maximum power point tracking (MPPT) control method for a photovoltaic (PV) array is described. The method includes generating, by a PV array 202 having a positive terminal and a negative terminal, a current $I_{pv}$ at the positive terminal, connecting a first capacitor 252 in parallel with the PV array 202, connecting an inductor having a first end to the positive terminal, generating, by a body terminal of a metal oxide silicon field effect transistor (MOSFET) having a source terminal connected to a second end of the inductor and a drain terminal connected to the negative terminal, a DC voltage $V_{dc}$ when the MOSFET 206 is switched ON, receiving, at a set of PWM input terminals of a pulse width modulator (PWM), the current $I_{PV}$ and a voltage across the first capacitor 252, executing, by a PWM processor of the PWM, a perturb and observe (P&O) algorithm and generating a maximum power point signal at a PWM output terminal, connecting the PWM output terminal to a gate of the MOSFET 206, modulating, by the maximum power point signal, the DC voltage $V_{dc}$ according to a duty cycle D defined by the P&O algorithm, connecting a second capacitor 210 in parallel with the MOSFET 206, wherein the second capacitor 210 is configured to charge during a positive phase of the duty cycle D to the voltage $V_{dc}$ and discharge during a negative phase of the duty cycle D, generating three phase voltage signals by connecting an inverter 212 in parallel with the second capacitor 210, receiving, at a point of common coupling (PCC 214) connected to the inverter 212, the three phase voltage signals, converting, by an electrical grid 216 connected to the PCC 214, the three phase voltage signals to three phase current signals, calculating, by the electrical grid 216, three phase voltage error signals by subtracting a grid voltage at each phase from a reference voltage signal, converting, by a first direct to quadrature transformer 218 configured to receive the three phase current signals, the three phase current signals to direct current signals and the quadrature current signals, converting, by a second direct to quadrature transformer 218 configured to receive the three phase voltage error signals, the three phase voltage error signals to direct voltage error signals and quadrature voltage error signals, generating, by a DC voltage controller 222 configured to receive the direct current signals, the quadrature current signals, the direct voltage error signals and the quadrature voltage error signals, a direct power control signal $U_d$, receiving, by a finite time sliding mode controller (FTSMC 226), the current $I_{PV}$ and a voltage across the second capacitor 210, the FTSMC 226 including a memory having program instructions for performing a particle swarm optimization and at least one FTSMC 226 configured to execute the particle swarm optimization, determining, by executing the particle swarm optimization, optimum gain parameters of the FTSMC 226 during an offline mode 650 of the FTSMC 226 and applying the optimum gain parameters to the FTSMC 226 to generate the reactive power control signal $U_q$ during an online mode 660, generating, by the FTSMC 226, a reactive power control 224 signal $U_q$, and receiving, by a voltage source controller 227, the reactive power control 224 signal $U_q$ and the direct power control signal $U_d$, generating, by the voltage source controller 227, a set of timing signals configured to operate the inverter 212, and minimizing, by the finite-time sliding mode MPPT control system the voltage error signals for each phase.

In one aspect, the method includes connecting, in the inverter, a collector terminal of a first NPN bipolar transistor 230 to the positive terminal of the second capacitor 210, connecting an emitter terminal of the first NPN bipolar transistor 230 to a collector terminal of a second NPN bipolar transistor 228, connecting an emitter terminal of the second NPN bipolar transistor 228 to the negative terminal, connecting a base terminal of the first NPN bipolar transistor 230 and a base terminal of the second NPN bipolar transistor 228 to receive a first timing signal of the set of timing signals, connecting a collector terminal of a third NPN bipolar transistor 234 to the positive terminal of the second capacitor 210, connecting an emitter terminal of the third NPN bipolar transistor 234 to a collector terminal of a fourth NPN bipolar transistor 232, connecting an emitter terminal of the fourth NPN bipolar transistor 232 to the negative terminal, connecting a base terminal of the third NPN bipolar transistor 234 and a base terminal of the fourth NPN bipolar transistor 232 to receive a second timing signal of the set of timing signals, connecting a collector terminal of a fifth NPN bipolar transistor 238 to the positive terminal of the second capacitor 210, connecting an emitter terminal of the fifth NPN bipolar transistor 238 to a collector terminal of a sixth NPN bipolar transistor 236, connecting an emitter terminal of the sixth NPN bipolar transistor 236 to the negative terminal, and connecting a base terminal of the fifth NPN bipolar transistor 238 and a base terminal of the sixth NPN bipolar transistor 236 to receive a third timing signal of the set of timing signals, wherein each of the first NPN bipolar transistor 230, the second NPN bipolar transistor 228, the third NPN bipolar transistor 234, the fourth NPN bipolar transistor 232, the fifth NPN bipolar transistor 238 and the sixth NPN bipolar transistor 236 includes a reverse biased diode connected between its collector terminal and emitter terminal.

In one aspect, the method includes connecting an input terminal of a first phase inverter output transmission line 242 including a first output inductor in series with a first output resistor between the emitter terminal of the first NPN bipolar transistor 230 and the collector terminal of the second NPN bipolar transistor 228, connecting an output terminal of the first phase inverter output transmission line 242 to a first phase port of the PCC 214, connecting an input terminal of a second phase inverter output transmission line 240 including a second output inductor in series with a second output resistor between the emitter terminal of the third NPN bipolar transistor 234 and the collector terminal of the fourth NPN bipolar transistor 232, connecting an output terminal of a second phase inverter output transmission line 240 to a second phase port of the PCC 214, connecting an input terminal of a third phase inverter output transmission line 244 including a third output inductor in series with a third output resistor between the emitter terminal of the fifth NPN bipolar transistor 238 and the collector terminal of the sixth NPN bipolar transistor 236, and connecting an output terminal of the third phase inverter output transmission line 244 to a third phase port of the PCC 214.

In one aspect, the method includes connecting a first phase grid transmission line 246 to the first phase port of the PCC 214, the first phase grid transmission line 246 including a first grid inductor in series with a first grid resistor, wherein the first phase grid voltage is a voltage across the first grid resistor, connecting a second phase grid transmission line 248 to the second phase port of the PCC 214, the second phase grid transmission line 248 including a second grid inductor in series with a second grid resistor, wherein the second phase grid voltage is a voltage across the second grid resistor, and connecting a third phase grid transmission line 250 to the third phase port of the PCC 214, the third phase grid transmission line 250 including a third grid inductor in series with a third grid resistor, wherein the third phase grid voltage is a voltage across the third grid resistor.

In one aspect, the method includes configuring the FTSMC 226 in offline mode to perform the steps of generating a plurality of potential sets of gain parameters of the FTSMC 226 initializing the plurality of sets of potential gain parameters as a population of the particle swarm optimization algorithm, optimizing each of the sets of potential gain parameters using the particle swarm optimization algorithm, evaluating an integrated absolute error (IAE) function for each optimized set of potential gain parameters based on the difference between the voltage across the second capacitor 210 and the grid voltage, determining the optimized set of potential gain parameters which generates the smallest IAE, and storing, in the memory of the FTSMC 226, the optimized set of potential gain parameters which generates the smallest IAE as the optimized gain parameters of the FTSMC 226.

In one aspect, the method includes defining a sliding mode surface x by $x=K_a \cdot dI + K_b \cdot dV + K_c \cdot$ perturbation, where $K_a$ equals the gain of a discrepancy in the current, $K_b$ equals the gain of a discrepancy in the voltage, and $K_c$ equals a gain of a perturbation of the current $I_{pv}$ output by the PV array.

In one aspect, the method includes defining a first order sliding mode control σ by $\sigma = dx/dt + K_d \cdot x$, where $K_d$ equals a gain of the sliding mode surface x.

In one aspect, the method includes defining the duty cycle D by $D = K_e \cdot sgn(\sigma)$, wherein $K_e$ equals a gain of a sign of the first order sliding mode control σ.

The third embodiment is illustrated with respect to FIG. 1A-FIG. 22. A non-transitory computer readable medium having instructions stored therein that, when executed by one or more processors, cause the one or more processors to perform a method for controlling an output of a photovoltaic (PV) array is described. The method includes generating, by the PV array 202 having a positive terminal and a negative terminal, a current $I_{pv}$ at the positive terminal, connecting a first capacitor 252 in parallel with the PV array 202, connecting an inductor having a first end to the positive terminal, generating, by a body terminal of a metal oxide silicon field effect transistor (MOSFET) 206 having a source terminal connected to a second end of the inductor and a drain terminal connected to the negative terminal, a DC voltage $V_{dc}$ when the MOSFET 206 is switched ON, receiving, at a set of PWM input terminals of a pulse width modulator (PWM), the current $I_{PV}$ and a voltage across the first capacitor 252, executing a perturb and observe (P&O) algorithm and generating a maximum power point signal at a PWM output terminal, connecting the PWM output terminal to a gate of the MOSFET 206, modulating, by the maximum power point signal, the DC voltage $V_{dc}$ according to a duty cycle D defined by the P&O algorithm, connecting a second capacitor 210 in parallel with the MOSFET 206, wherein the second capacitor 210 is configured to charge during a positive phase of the duty cycle D to the voltage $V_{dc}$ and discharge during a negative phase of the duty cycle D, generating three phase voltage signals by connecting an inverter 212 in parallel with the second capacitor 210, receiving, at a point of common coupling (PCC 214) connected to the inverter 212, the three phase voltage signals, converting, by an electrical grid 216 connected to the PCC 214, the three phase voltage signals to three phase current signals, calculating, by the electrical grid 216, three phase voltage error signals by subtracting a grid voltage at each phase from a reference voltage signal, converting, by a first direct to quadrature transformer 218 configured to receive the three phase current signals, the three phase current signals to direct current signals and the quadrature current signals, converting, by a second direct to quadrature transformer 218 configured to receive the three phase voltage error signals, the three phase voltage error signals to direct voltage error signals and quadrature voltage error signals, generating, by a DC voltage controller 222 configured to receive the direct current signals, the quadrature current signals, the direct voltage error signals and the quadrature voltage error signals, a direct power control signal $U_d$, receiving, by a finite time sliding mode controller (FTSMC 226), the current $I_{PV}$ and a voltage across the second capacitor 210, performing a particle swarm optimization, determining, by executing the particle swarm optimization, optimum gain parameters of the FTSMC 226 during an offline mode of the FTSMC 226 and applying the optimum gain parameters to the FTSMC 226 to generate the reactive power control signal $U_q$ during an online mode, generating, by the FTSMC 226, a reactive power control 224 signal $U_q$, receiving, by a voltage source controller 227, the reactive power control 224 signal $U_q$ and the direct power control signal $U_d$, generating, by the voltage source controller 227, a set of timing signals configured to operate the inverter 212, and minimizing, by the finite-time sliding mode MPPT control system the voltage error signals for each phase.

Figure 26:
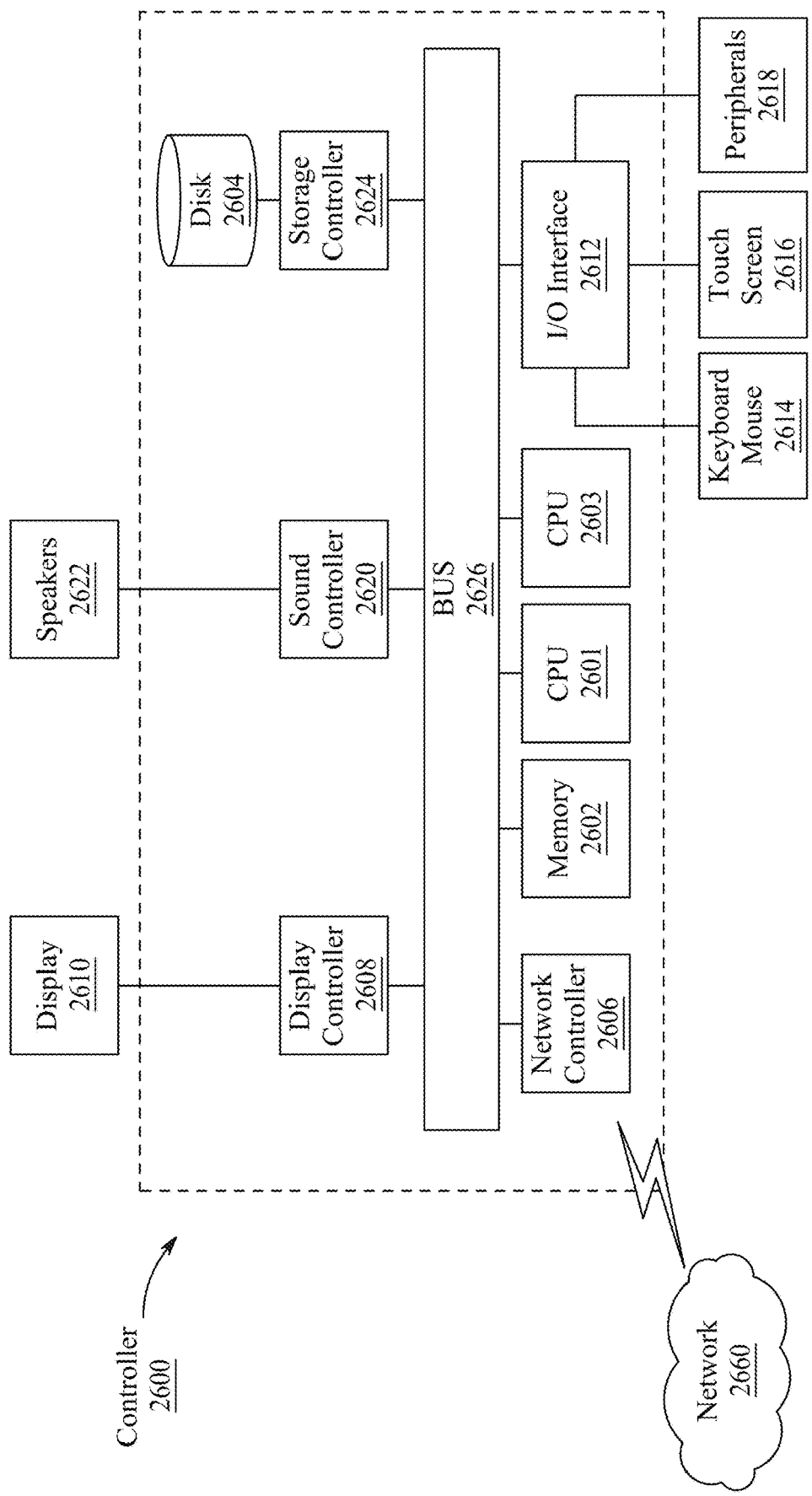
FIG. 26 is an illustration of a non-limiting example of details of computing hardware used in the computing system, according to certain embodiments.

Next, further details of the hardware description of the computing environment according to exemplary embodiments is described with reference to FIG. 26. In FIG. 26, a controller 2600 is described is representative of the system 200 of FIG. 2 in which the controller is a computing device which includes a CPU 2601 which performs the processes described above/below. The process data and instructions may be stored in memory 2602. These processes and instructions may also be stored on a storage medium disk 2604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2601, 2603 and an operating system such as Microsoft Windows 26, Microsoft Windows 29, Microsoft Windows 11,UNIX, Solaris, LINUX, Apple MAC-OS and other systems known to those skilled in the art.

The hardware elements in order to achieve the computing device may be realized by various circuitry elements, known to those skilled in the art. For example, CPU 2601 or CPU 2603 may be a Xenon or Core processor from Intel of America or an Opteron processor from AMD of America, or may be other processor types that would be recognized by one of ordinary skill in the art. Alternatively, the CPU 2601, 2603 may be implemented on an FPGA, ASIC, PLD or using discrete logic circuits, as one of ordinary skill in the art would recognize. Further, CPU 2601, 2603 may be implemented as multiple processors cooperatively working in parallel to perform the instructions of the inventive processes described above.

The computing device in FIG. 26 also includes a network controller 2606, such as an Intel Ethernet PRO network interface card from Intel Corporation of America, for interfacing with network 2660. As can be appreciated, the network 2660 can be a public network, such as the Internet, or a private network such as an LAN or WAN network, or any combination thereof and can also include PSTN or ISDN sub-networks. The network 2660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2608, such as a NVIDIA Geforce GTX or Quadro graphics adaptor from NVIDIA Corporation of America for interfacing with display 2610, such as a Hewlett Packard HPL2445 w LCD monitor. A general purpose I/O interface 2612 interfaces with a keyboard and/or mouse 2614 as well as a touch screen panel 2616 on or separate from display 2610. General purpose I/O interface also connects to a variety of peripherals 2618 including printers and scanners, such as an OfficeJet or DeskJet from Hewlett Packard.

A sound controller 2620 is also provided in the computing device such as Sound Blaster X-Fi Titanium from Creative, to interface with speakers/microphone 2622 thereby providing sounds and/or music.

The general purpose storage controller 2624 connects the storage medium disk 2604 with communication bus 2626, which may be an ISA, EISA, VESA, PCI, or similar, for interconnecting all of the components of the computing device. A description of the general features and functionality of the display 2610, keyboard and/or mouse 2614, as well as the display controller 2608, storage controller 2624, network controller 2606, sound controller 2620, and general purpose I/O interface 2612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 27.

Figure 27:
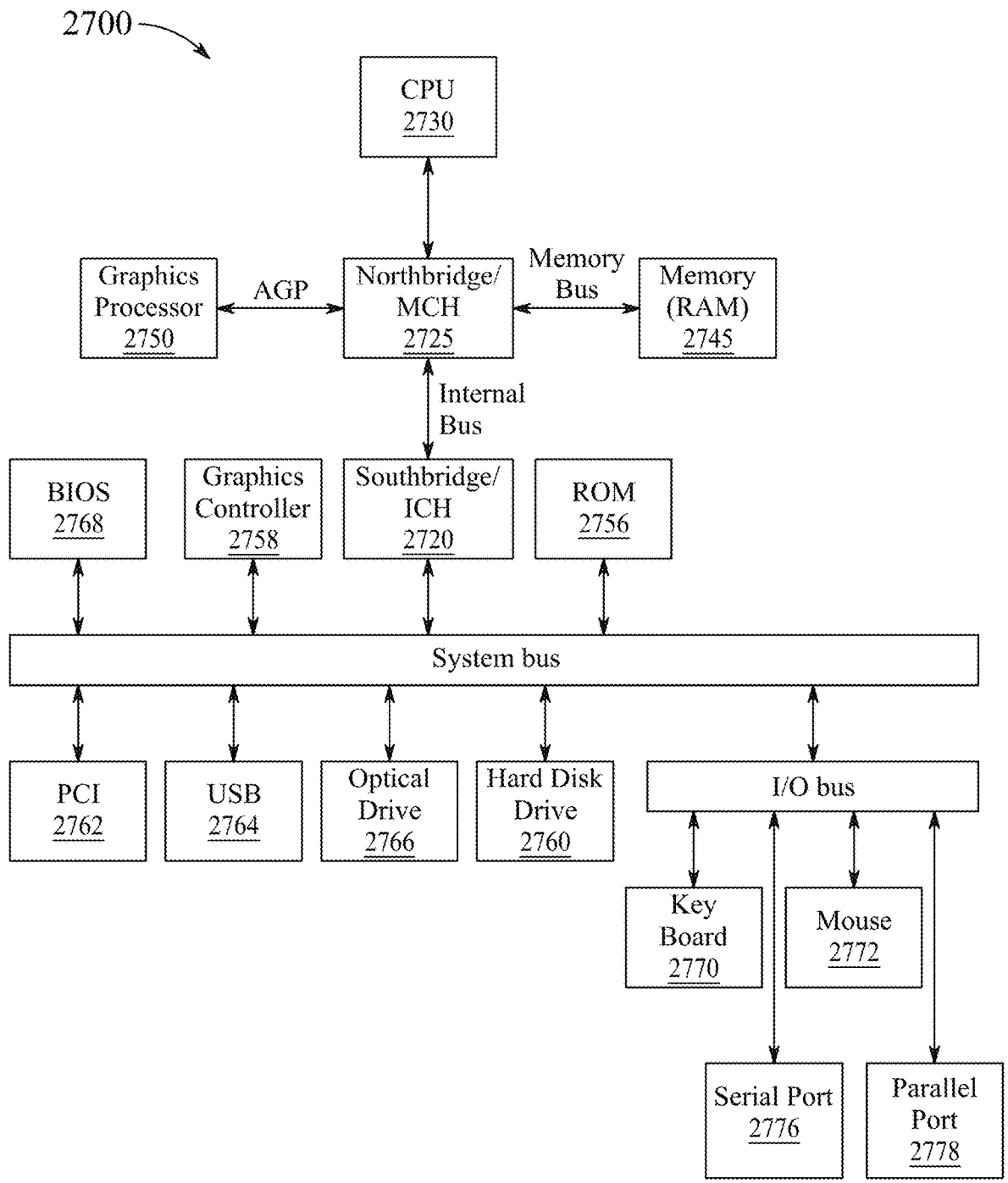
FIG. 27 is an exemplary schematic diagram of a data processing system used within the computing system, according to certain embodiments.

FIG. 27 shows a schematic diagram of a data processing system, according to certain embodiments, for performing the functions of the exemplary embodiments. The data processing system is an example of a computer in which code or instructions implementing the processes of the illustrative embodiments may be located.

In FIG. 27, data processing system 2700 employs a hub architecture including a north bridge and memory controller hub (NB/MCH) 2725 and a south bridge and input/output (I/O) controller hub (SB/ICH) 2720. The central processing unit (CPU) 2730 is connected to NB/MCH 2725. The NB/MCH 2725 also connects to the memory 2745 via a memory bus, and connects to the graphics processor 2750 via an accelerated graphics port (AGP). The NB/MCH 2725 also connects to the SB/ICH 2720 via an internal bus (e.g., a unified media interface or a direct media interface). The CPU Processing unit 2730 may contain one or more processors and even may be implemented using one or more heterogeneous processor systems.

Figure 28:
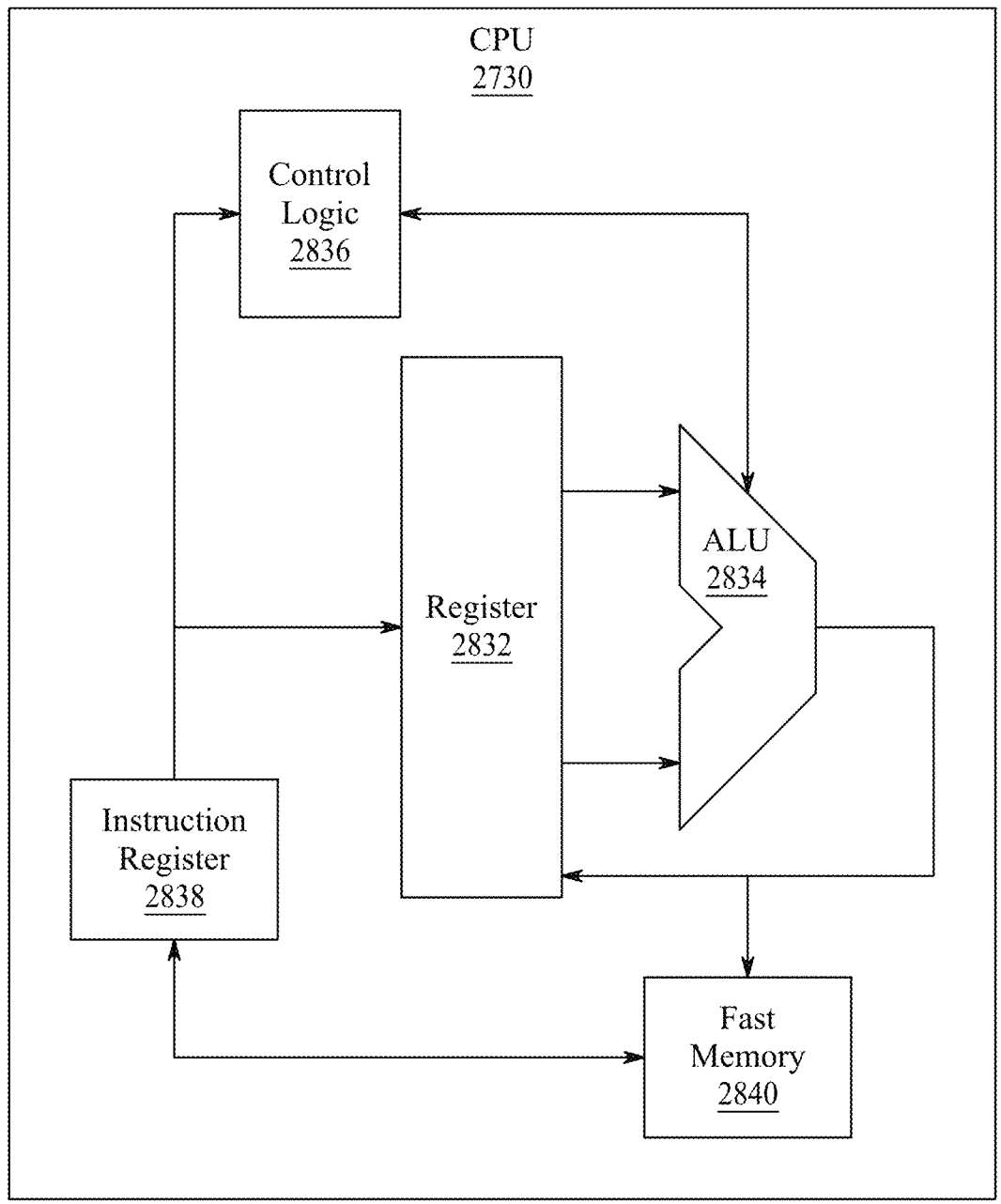
FIG. 28 is an exemplary schematic diagram of a processor used with the computing system, according to certain embodiments.

For example, FIG. 28 shows one implementation of CPU 2730. In one implementation, the instruction register 2838 retrieves instructions from the fast memory 2840. At least part of these instructions are fetched from the instruction register 2838 by the control logic 2836 and interpreted according to the instruction set architecture of the CPU 2730. Part of the instructions can also be directed to the register 2832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 2834 that loads values from the register 2832 and performs logical and mathematical operations on the loaded values according to the instructions. The results from these operations can be feedback into the register and/or stored in the fast memory 2840. According to certain implementations, the instruction set architecture of the CPU 2730 can use a reduced instruction set architecture, a complex instruction set architecture, a vector processor architecture, a very large instruction word architecture. Furthermore, the CPU 2730 can be based on the Von Neuman model or the Harvard model. The CPU 2730 can be a digital signal processor, an FPGA, an ASIC, a PLA, a PLD, or a CPLD. Further, the CPU 2730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 27, the data processing system 2700 can include that the SB/ICH 2720 is coupled through a system bus to an I/O Bus, a read only memory (ROM) 2756, universal serial bus (USB) port 2764, a flash binary input/output system (BIOS) 2768, and a graphics controller 2758. PCI/PCIe devices can also be coupled to SB/ICH 2788 through a PCI bus 2762.

The PCI devices may include, for example, Ethernet adapters, add-in cards, and PC cards for notebook computers. The Hard disk drive 2760 and CD-ROM 2766 can use, for example, an integrated drive electronics (IDE) or serial advanced technology attachment (SATA) interface. In one implementation the I/O bus can include a super I/O (SIO) device.

Further, the hard disk drive (HDD) 2760 and optical drive 2766 can also be coupled to the SB/ICH 2720 through a system bus. In one implementation, a keyboard 2770, a mouse 2772, a parallel port 2778, and a serial port 2776 can be connected to the system bus through the I/O bus. Other peripherals and devices that can be connected to the SB/ICH 2720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 29:
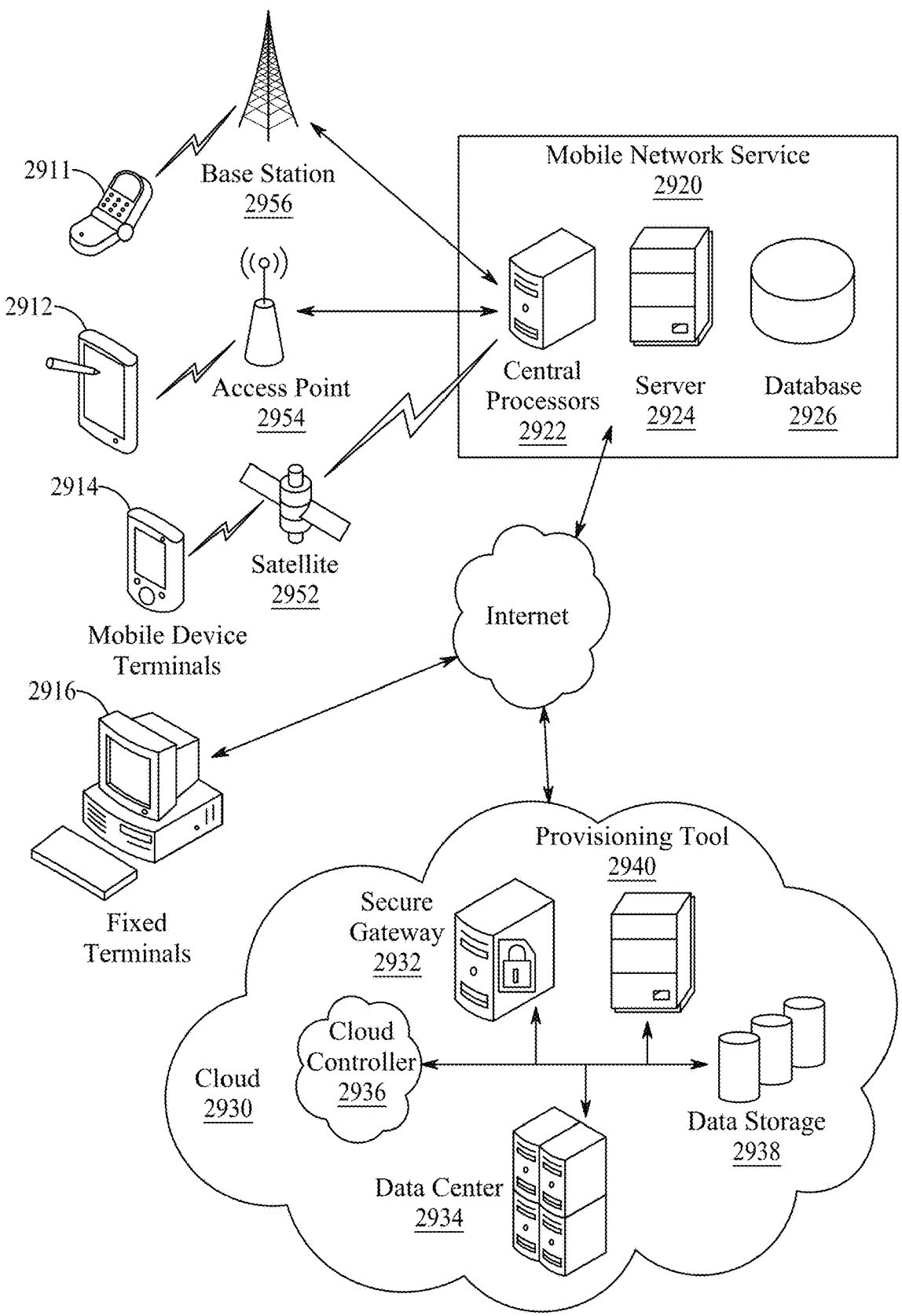
FIG. 29 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 29, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A finite-time sliding mode maximum power point tracking (MPPT) control system for a photovoltaic (PV) array, comprising:
    a PV array having a positive terminal and a negative terminal, wherein the photovoltaic array is configured to generate a current $I_{pv}$ at the positive terminal;
    a boost converter including a first capacitor in parallel with the PV array and an inductor having a first end connected to the positive terminal;
    a metal oxide silicon field effect transistor (MOSFET) having a source terminal connected to a second end of the inductor and a drain terminal connected to the negative terminal, wherein a body terminal of the MOSFET is configured to generate a DC voltage $V_{dc}$ when the MOSFET is switched ON;
    a pulse width modulator (PWM) connected to receive the current $I_{PV}$ and a voltage across the first capacitor at a set of PWM input terminals, wherein the PWM includes a PWM processor configured to execute a perturb and observe (P&O) algorithm and generate a maximum power point signal at a PWM output terminal, wherein the PWM output terminal is connected to a gate of the MOSFET, wherein the a maximum power point signal is configured to modulate the DC voltage $V_{dc}$ according to a duty cycle D defined by the P&O algorithm;
    a second capacitor in parallel with the MOSFET, wherein the second capacitor is configured to charge during a positive phase of the duty cycle D to the voltage $V_{dc}$ and discharge during a negative phase of the duty cycle D;
    an inverter in parallel with the second capacitor, wherein the inverter is configured to generate three phase voltage signals;
    a point of common coupling (PCC) connected to the inverter to receive the three phase voltage signals;
    an electrical grid connected to the PCC, wherein the electrical grid is configured to convert the three phase voltage signals to three phase current signals and calculate three phase voltage error signals by subtracting a grid voltage at each phase from a reference voltage signal;

a first direct to quadrature transformer configured to receive the three phase current signals and convert the three phase current signals to direct current signals and quadrature current signals;

a second direct to quadrature transformer configured to receive the three phase voltage error signals and convert the three phase voltage error signals to direct voltage error signals and quadrature voltage error signals;

a DC voltage controller configured to receive the direct current signals, the quadrature current signals, the direct voltage error signals and the quadrature voltage error signals and generate a direct power control signal $U_d$;

a finite time sliding mode controller (FTSMC) having at a set of FTSMC input terminals configured to receive the current $I_{PV}$ and a voltage across the second capacitor and generate a reactive power control signal $U_q$, wherein the FTSMC includes a memory having program instructions for performing a particle swarm optimization and at least one FTSMC processor configured to execute the particle swarm optimization to determine optimum gain parameters of the FTSMC during an offline mode of the FTSMC and to apply the optimum gain parameters to the FTSMC to generate the reactive power control signal $U_q$ during an online mode; and a voltage source controller configured to receive the reactive power control signal $U_q$ and the direct power control signal $U_d$ and generate a set of timing signals configured to operate the inverter, wherein the finite-time sliding mode MPPT control system is configured to minimize the voltage error signals for each phase.

2. The finite-time sliding mode MPPT control system of claim 1, wherein the inverter comprises:

a first NPN bipolar transistor connected at a collector terminal to the positive terminal of the second capacitor and at an emitter terminal to a collector terminal of a second NPN bipolar transistor, wherein an emitter terminal of the second NPN bipolar transistor is connected to the negative terminal, wherein a base terminal of the first NPN bipolar transistor and a base terminal of the second NPN bipolar transistor are connected to receive a first timing signal of the set of timing signals;

a third NPN bipolar transistor connected at a collector terminal to a positive terminal of the second capacitor and at an emitter terminal to a collector terminal of a fourth NPN bipolar transistor, wherein an emitter terminal of the fourth NPN bipolar transistor is connected to the negative terminal, wherein a base terminal of the third NPN bipolar transistor and a base terminal of the fourth NPN bipolar transistor are connected to receive a second timing signal of the set of timing signals; and a fifth NPN bipolar transistor connected at a collector terminal to the positive terminal of the second capacitor and at an emitter terminal to a collector terminal of a sixth NPN bipolar transistor, wherein an emitter terminal of the sixth NPN bipolar transistor is connected to the negative terminal, wherein a base terminal of the fifth NPN bipolar transistor and a base terminal of the sixth NPN bipolar transistor are connected to receive a third timing signal of the set of timing signals, wherein each of the first NPN bipolar transistor, the second NPN bipolar transistor, the third NPN bipolar transistor, the fourth NPN bipolar transistor, the fifth NPN bipolar transistor and the sixth NPN bipolar transistor includes a reverse biased diode connected between its collector terminal and emitter terminal.

3. The finite-time sliding mode MPPT control system of claim 2, further comprising:

a first phase inverter output transmission line including a first output inductor in series with a first output resistor, wherein the first phase inverter output transmission line is connected between the emitter terminal of the first NPN bipolar transistor and the collector terminal of the second NPN bipolar transistor, wherein the first phase inverter output transmission line is connected to a first phase port of the PCC;

a second phase inverter output transmission line including a second output inductor in series with a second output resistor, wherein the second phase inverter output transmission line is connected between the emitter terminal of the third NPN bipolar transistor and the collector terminal of the fourth NPN bipolar transistor, wherein the second phase inverter output transmission line is connected to a second phase port of the PCC; and a third phase inverter output transmission line including a third output inductor with a third output resistor, wherein the third phase inverter output transmission line is connected between the emitter terminal of the fifth NPN bipolar transistor and the collector terminal of the sixth NPN bipolar transistor, wherein the third phase inverter output transmission line is connected to a third phase port of the PCC.

4. The finite-time sliding mode MPPT control system of claim 3, wherein the electrical grid further comprises:

a first phase grid transmission line connected to the first phase port of the PCC, wherein the first phase grid transmission line includes a first grid inductor in series with a first grid resistor, wherein the first phase grid voltage is a voltage across the first grid resistor;

a second phase grid transmission line connected to the second phase port of the PCC, wherein the second phase grid transmission line includes a second grid inductor in series with a second grid resistor, wherein the second phase grid voltage is a voltage across the second grid resistor; and a third phase grid transmission line connected to the third phase port of the PCC, wherein the third phase grid transmission line includes a third grid inductor in series with a third grid resistor, wherein the third phase grid voltage is a voltage across the third grid resistor.

5. The finite-time sliding mode MPPT control system of claim 1, wherein the FTSMC processor is configured in offline mode to:

generate a plurality of potential sets of gain parameters of the FTSMC controller;

initialize the plurality of sets of potential gain parameters as a population of the particle swarm optimization algorithm;

optimize each of the sets of potential gain parameters using the particle swarm optimization algorithm;

evaluate an integrated absolute error (IAE) function for each optimized set of potential gain parameters based on the difference between the voltage across the second capacitor and the grid voltage;

determine the optimized set of potential gain parameters which generates the smallest IAE; and store, in the memory of the FTSMC controller, the optimized set of potential gain parameters which generates the smallest IAE as the optimized gain parameters of the FTSMC controller.

6. The finite-time sliding mode MPPT control system of claim 5, wherein the optimized gain parameters are characterized as the set $\{K_a, K_b, K_c, K_d, K_e\}$, wherein:
$K_a$ equals the gain of a discrepancy in the current,
$K_b$ equals the gain of a discrepancy in the voltage,
$K_c$ equals a gain of a perturbation of the current $I_{pv}$ output by the PV array,
$K_d$ equals a gain of a sliding surface x, and
$K_e$ equals a gain of a sign of a first order sliding mode control o.

7. The finite-time sliding mode MPPT control system of claim 6, wherein the sliding mode surface x is defined by:

$$x = K_a \cdot dI + K_b \cdot dV + K_c \cdot \text{perturbation.}$$

8. The finite-time sliding mode MPPT control system of claim 7, wherein the first order sliding mode control σ is characterized by:

$$\sigma = dx/dt + K_d \cdot x.$$

9. The finite-time sliding mode MPPT control system of claim 6, wherein the duty cycle D is characterized by:

$$D = K_e \cdot \text{sign}(\sigma).$$

10. The finite-time sliding mode MPPT control system of claim 6, wherein the FTSMC processor is configured in online mode to:
update the gain parameters of the FTSMC controller with the optimized gain parameters.

11. The finite-time sliding mode MPPT control system of claim 1, wherein the PWM processor is configured to modulate the duty cycle D with a variable step size defined by the P&O algorithm.

12. A finite-time sliding mode maximum power point tracking (MPPT) control method for a photovoltaic (PV) array, comprising:
generating, by a PV array having a positive terminal and a negative terminal, a current $I_{pv}$ at the positive terminal;
connecting a first capacitor in parallel with the PV array;
connecting an inductor having a first end to the positive terminal;
generating, by a body terminal of a metal oxide silicon field effect transistor (MOSFET) having a source terminal connected to a second end of the inductor and a drain terminal connected to the negative terminal, a DC voltage $V_{dc}$ when the MOSFET is switched ON;
receiving, at a set of PWM input terminals of a pulse width modulator (PWM), the current $I_{PV}$ and a voltage across the first capacitor;
executing, by a PWM processor of the PWM, a perturb and observe (P&O) algorithm and generating a maximum power point signal at a PWM output terminal;
connecting the PWM output terminal to a gate of the MOSFET;
modulating, by the maximum power point signal, the DC voltage $V_{dc}$ according to a duty cycle D defined by the P&O algorithm;
connecting a second capacitor in parallel with the MOSFET, wherein the second capacitor is configured to charge during a positive phase of the duty cycle D to the voltage $V_{dc}$ and discharge during a negative phase of the duty cycle D;
generating three phase voltage signals by connecting an inverter in parallel with the second capacitor;
receiving, at a point of common coupling (PCC) connected to the inverter, the three phase voltage signals;
converting, by an electrical grid connected to the PCC, the three phase voltage signals to three phase current signals;
calculating, by the electrical grid, three phase voltage error signals by subtracting a grid voltage at each phase from a reference voltage signal;
converting, by a first direct to quadrature transformer configured to receive the three phase current signals, the three phase current signals to direct current signals and the quadrature current signals;
converting, by a second direct to quadrature transformer configured to receive the three phase voltage error signals, the three phase voltage error signals to direct voltage error signals and quadrature voltage error signals;
generating, by a DC voltage controller configured to receive the direct current signals, the quadrature current signals, the direct voltage error signals and the quadrature voltage error signals, a direct power control signal $U_d$;
receiving, by a finite time sliding mode controller (FTSMC), the current $I_{PV}$ and a voltage across the second capacitor, the FTSMC including a memory having program instructions for performing a particle swarm optimization and at least one FTSMC processor configured to execute the particle swarm optimization;
determining, by executing the particle swarm optimization, optimum gain parameters of the FTSMC during an offline mode of the FTSMC and applying the optimum gain parameters to the FTSMC to generate the reactive power control signal $U_q$ during an online mode;
generating, by the FTSMC, a reactive power control signal $U_q$; and
receiving, by a voltage source controller, the reactive power control signal $U_q$ and the direct power control signal $U_d$;
generating, by the voltage source controller, a set of timing signals configured to operate the inverter; and
minimizing, by the finite-time sliding mode MPPT control system the voltage error signals for each phase.

13. The finite-time sliding mode maximum power point tracking (MPPT) control method of claim 12, further comprising:
connecting, in the inverter, a collector terminal of a first NPN bipolar transistor to the positive terminal of the second capacitor;
connecting an emitter terminal of the first NPN bipolar transistor to a collector terminal of a second NPN bipolar transistor;
connecting an emitter terminal of the second NPN bipolar transistor to the negative terminal;

connecting a base terminal of the first NPN bipolar transistor and a base terminal of the second NPN bipolar transistor to receive a first timing signal of the set of timing signals;
connecting a collector terminal of a third NPN bipolar transistor to the positive terminal of the second capacitor;
connecting an emitter terminal of the third NPN bipolar transistor to a collector terminal of a fourth NPN bipolar transistor;
connecting an emitter terminal of the fourth NPN bipolar transistor to the negative terminal;
connecting a base terminal of the third NPN bipolar transistor and a base terminal of the fourth NPN bipolar transistor to receive a second timing signal of the set of timing signals;
connecting a collector terminal of a fifth NPN bipolar transistor to the positive terminal of the second capacitor;
connecting an emitter terminal of the fifth NPN bipolar transistor to a collector terminal of a sixth NPN bipolar transistor;
connecting an emitter terminal of the sixth NPN bipolar transistor to the negative terminal; and
connecting a base terminal of the fifth NPN bipolar transistor and a base terminal of the sixth NPN bipolar transistor to receive a third timing signal of the set of timing signals,
wherein each of the first NPN bipolar transistor, the second NPN bipolar transistor, the third NPN bipolar transistor, the fourth NPN bipolar transistor, the fifth NPN bipolar transistor and the sixth NPN bipolar transistor includes a reverse biased diode connected between its collector terminal and emitter terminal.

14. The finite-time sliding mode MPPT control method of claim 13, further comprising:
connecting an input terminal of a first phase inverter output transmission line including a first output inductor in series with a first output resistor between the emitter terminal of the first NPN bipolar transistor and the collector terminal of the second NPN bipolar transistor;
connecting an output terminal of the first phase inverter output transmission line to a first phase port of the PCC;
connecting an input terminal of a second phase inverter output transmission line including a second output inductor in series with a second output resistor between the emitter terminal of the third NPN bipolar transistor and the collector terminal of the fourth NPN bipolar transistor;
connecting an output terminal of a second phase inverter output transmission line to a second phase port of the PCC;
connecting an input terminal of a third phase inverter output transmission line including a third output inductor in series with a third output resistor between the emitter terminal of the fifth NPN bipolar transistor and the collector terminal of the sixth NPN bipolar transistor; and
connecting an output terminal of the third phase inverter output transmission line to a third phase port of the PCC.

15. The finite-time sliding mode MPPT control method of claim 14, further comprising:
connecting a first phase grid transmission line to the first phase port of the PCC, the first phase grid transmission line including a first grid inductor in series with a first grid resistor, wherein the first phase grid voltage is a voltage across the first grid resistor;
connecting a second phase grid transmission line to the second phase port of the PCC, the second phase grid transmission line including a second grid inductor in series with a second grid resistor, wherein the second phase grid voltage is a voltage across the second grid resistor; and
connecting a third phase grid transmission line to the third phase port of the PCC, the third phase grid transmission line including a third grid inductor in series with a third grid resistor, wherein the third phase grid voltage is a voltage across the third grid resistor.

16. The finite-time sliding mode MPPT control method of claim 12, further comprising:
configuring the FTSMC processor in offline mode to perform the steps of:
generating a plurality of potential sets of gain parameters of the FTSMC controller;
initializing the plurality of sets of potential gain parameters as a population of the particle swarm optimization algorithm;
optimizing each of the sets of potential gain parameters using the particle swarm optimization algorithm;
evaluating an integrated absolute error (IAE) function for each optimized set of potential gain parameters based on the difference between the voltage across the second capacitor and the grid voltage;
determining the optimized set of potential gain parameters which generates the smallest IAE; and
storing, in the memory of the FTSMC controller, the optimized set of potential gain parameters which generates the smallest IAE as the optimized gain parameters of the FTSMC controller.

17. The finite-time sliding mode MPPT control method of claim 12, further comprising:
defining a sliding mode surface x by $x=K_a \cdot dI+K_b \cdot dV+K_c \cdot$perturbation, where $K_a$ equals the gain of a discrepancy in the current, $K_b$ equals the gain of a discrepancy in the voltage, and $K_c$ equals a gain of a perturbation of the current $I_{pv}$ output by the PV array.

18. The finite-time sliding mode MPPT control method of claim 17, further comprising:
defining a first order sliding mode control $\sigma$ by $\sigma=dx/dt+K_d \cdot x$, where $K_d$ equals a gain of the sliding mode surface x.

19. The finite-time sliding mode MPPT control method of claim 18, further comprising:
defining the duty cycle D by $D=K_e \cdot \text{sgn}(\sigma)$, wherein $K_e$ equals a gain of a sign of the first order sliding mode control $\sigma$.

20. A non-transitory computer readable medium having instructions stored therein that, when executed by one or more processors, cause the one or more processors to perform a method for controlling an output of a photovoltaic (PV) array, comprising:
generating, by the PV array having a positive terminal and a negative terminal, a current $I_{pv}$ at the positive terminal;
connecting a first capacitor in parallel with the PV array;
connecting an inductor having a first end to the positive terminal;
generating, by a body terminal of a metal oxide silicon field effect transistor (MOSFET) having a source terminal connected to a second end of the inductor and a drain terminal connected to the negative terminal, a DC voltage $V_{dc}$ when the MOSFET is switched ON;

receiving, at a set of PWM input terminals of a pulse width modulator (PWM), the current $I_{PV}$ and a voltage across the first capacitor;

executing a perturb and observe (P&O) algorithm and generating a maximum power point signal at a PWM output terminal;

connecting the PWM output terminal to a gate of the MOSFET;

modulating, by the maximum power point signal, the DC voltage $V_{dc}$ according to a duty cycle D defined by the P&O algorithm;

connecting a second capacitor in parallel with the MOSFET, wherein the second capacitor is configured to charge during a positive phase of the duty cycle D to the voltage $V_{dc}$ and discharge during a negative phase of the duty cycle D;

generating three phase voltage signals by connecting an inverter in parallel with the second capacitor;

receiving, at a point of common coupling (PCC) connected to the inverter, the three phase voltage signals;

converting, by an electrical grid connected to the PCC, the three phase voltage signals to three phase current signals;

calculating, by the electrical grid, three phase voltage error signals by subtracting a grid voltage at each phase from a reference voltage signal;

converting, by a first direct to quadrature transformer configured to receive the three phase current signals, the three phase current signals to direct current signals and the quadrature current signals;

converting, by a second direct to quadrature transformer configured to receive the three phase voltage error signals, the three phase voltage error signals to direct voltage error signals and quadrature voltage error signals;

generating, by a DC voltage controller configured to receive the direct current signals, the quadrature current signals, the direct voltage error signals and the quadrature voltage error signals, a direct power control signal $U_d$;

receiving, by a finite time sliding mode controller (FTSMC), the current $I_{PV}$ and a voltage across the second capacitor;

performing a particle swarm optimization;

determining, by executing the particle swarm optimization, optimum gain parameters of the FTSMC during an offline mode of the FTSMC and applying the optimum gain parameters to the FTSMC to generate the reactive power control signal $U_q$ during an online mode;

generating, by the FTSMC, a reactive power control signal $U_q$; and receiving, by a voltage source controller, the reactive power control signal $U_q$ and the direct power control signal $U_d$;

generating, by the voltage source controller, a set of timing signals configured to operate the inverter; and minimizing, by the finite-time sliding mode MPPT control system the voltage error signals for each phase.

\* \* \* \* \*